(12) United States Patent
Ben-Ezra

(10) Patent No.: US 7,325,497 B2
(45) Date of Patent: Feb. 5, 2008

(54) AUTOMATED AIRPORT LUGGAGE SYSTEM

(76) Inventor: Elishah Ben-Ezra, 24/2 Even Shmuel Street, Ramot 02, 97230 (IL)

( * ) Notice: Subject to any disclaimer, the term of this patent is extended or adjusted under 35 U.S.C. 154(b) by 198 days.

(21) Appl. No.: 10/496,621

(22) PCT Filed: Nov. 27, 2001

(86) PCT No.: PCT/IL01/01089

§ 371 (c)(1),
(2), (4) Date: May 25, 2004

(87) PCT Pub. No.: WO03/054688

PCT Pub. Date: Jul. 3, 2003

(65) Prior Publication Data

US 2005/0192701 A1    Sep. 1, 2005

(51) Int. Cl.
*B61J 3/00* (2006.01)
(52) U.S. Cl. ................................. 104/88.01
(58) Field of Classification Search ............. 104/88.01, 104/88.02, 88.03, 88.04
See application file for complete search history.

(56) References Cited

U.S. PATENT DOCUMENTS

| | | | |
|---|---|---|---|
| 4,227,607 A | 10/1980 | Malavenda | |
| 4,416,435 A | 11/1983 | Szendrodi et al. | |
| 5,056,647 A | 10/1991 | Rosenbaum | |
| 5,689,239 A | 11/1997 | Turner et al. | |
| 5,793,639 A | 8/1998 | Yamazaki | |
| 6,002,344 A | 12/1999 | Bandy et al. | |
| 6,044,353 A | 3/2000 | Pugliese, III | |
| 6,683,262 B2 * | 1/2004 | Scott | 177/145 |

* cited by examiner

*Primary Examiner*—S. Joseph Morano
*Assistant Examiner*—Robert J. McCarry, Jr.
(74) *Attorney, Agent, or Firm*—Thomas, Kayden, Horstemeyer & Risley, LLP

(57) ABSTRACT

An airport terminal (100) has a department area (200) which includes at least one, and preferably a plurality of check-in counters (202), at least one, and preferably a plurality of airplane-loading zones (204), and a track system (110), arranged for the movement of wagons (10). Wagon (10) is for automatically transporting and sorting luggage, responsive to commands from a computerized management system (80). The wagon (10) includes a rigid frame for containing the luggage. The frame includes four sides and a double bottom having an upper plate, a lower plate, and an internal compartment.

16 Claims, 61 Drawing Sheets

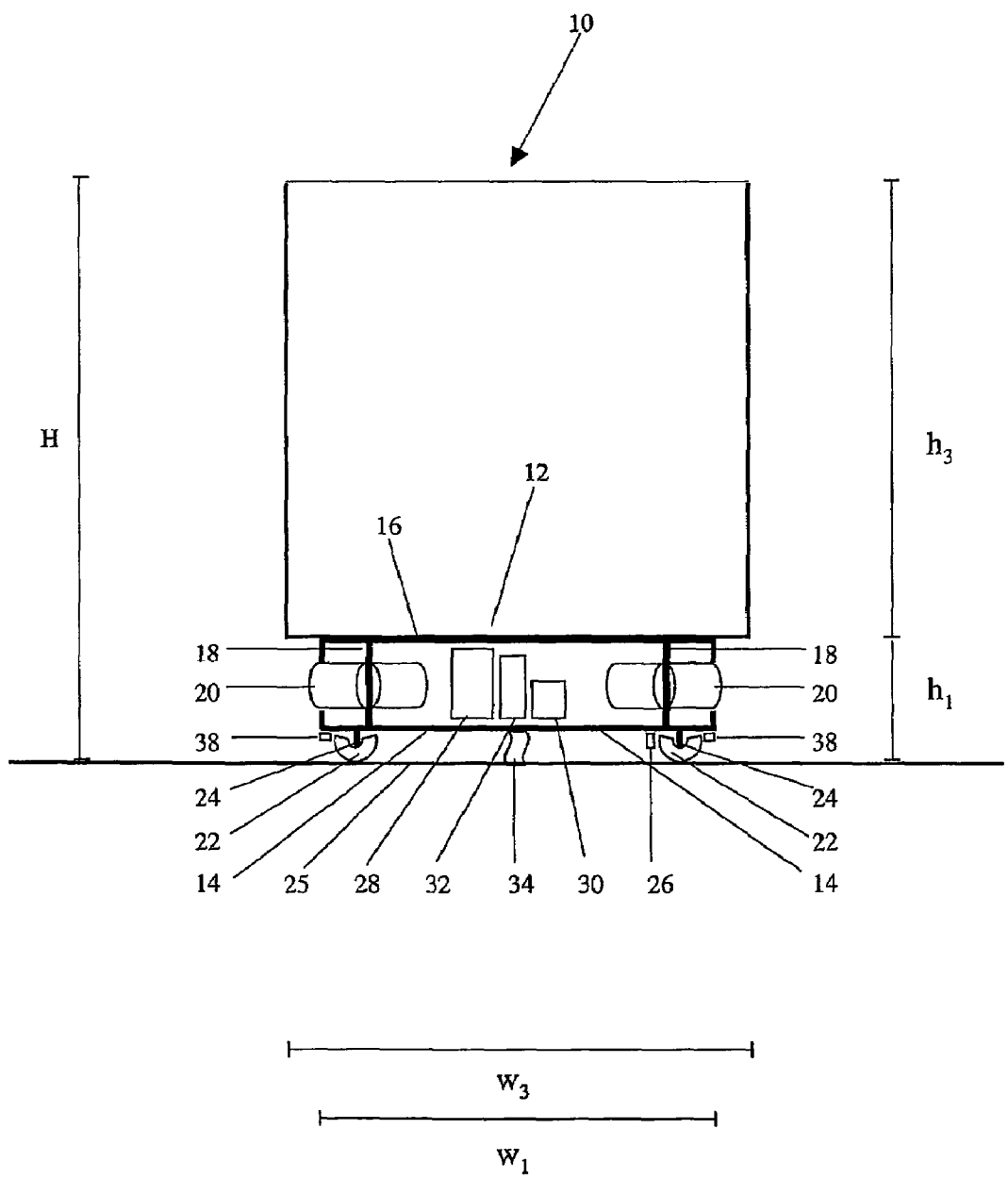

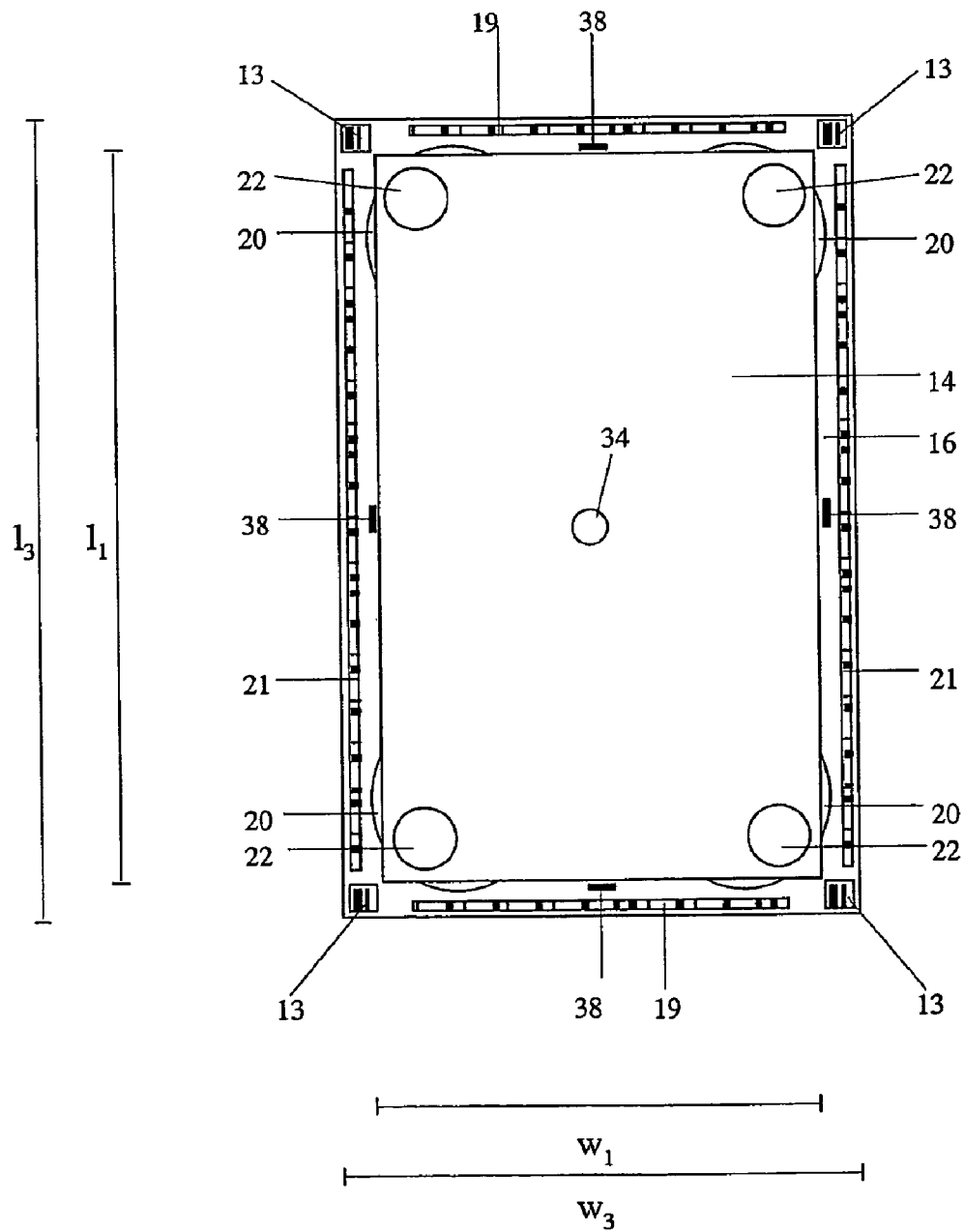

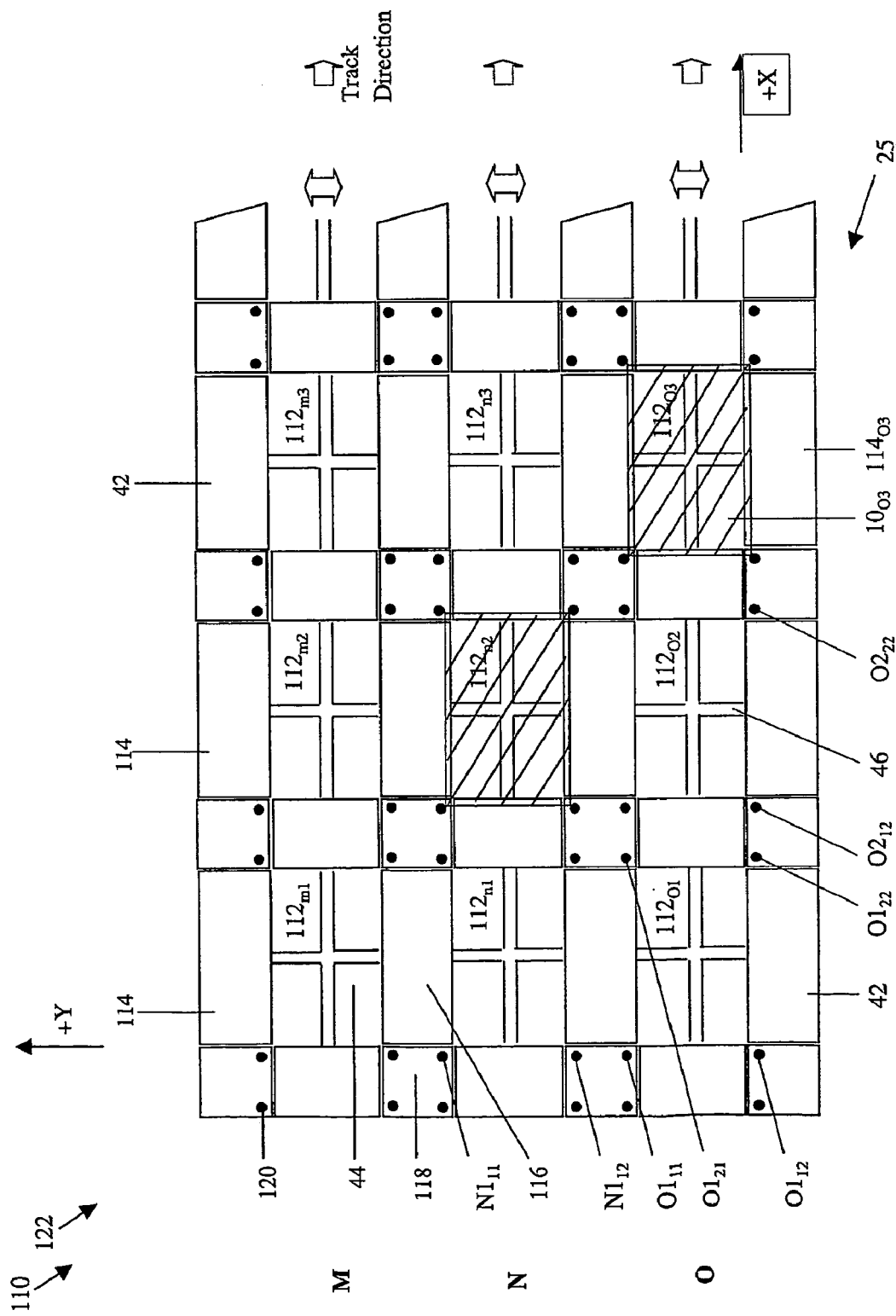

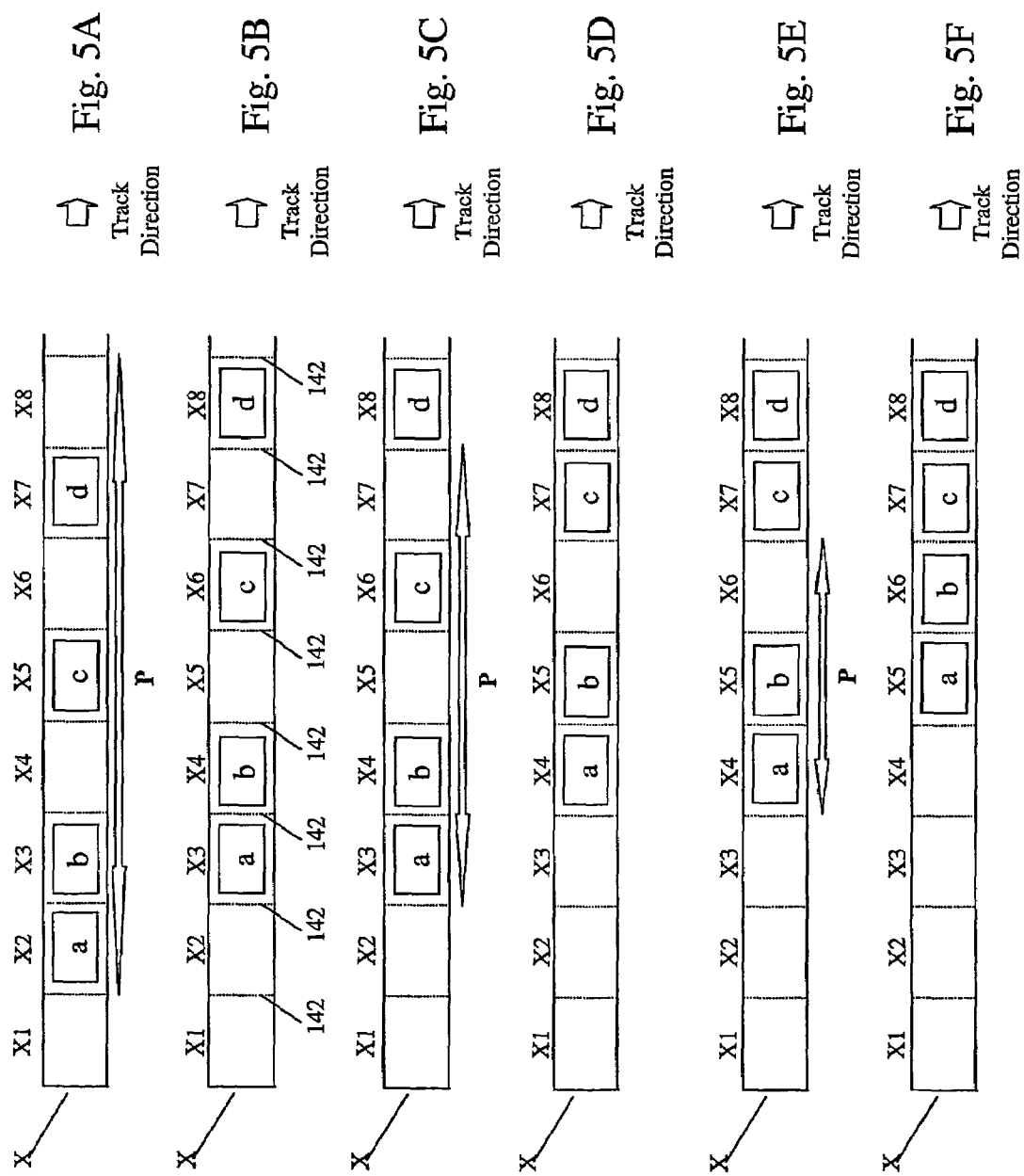

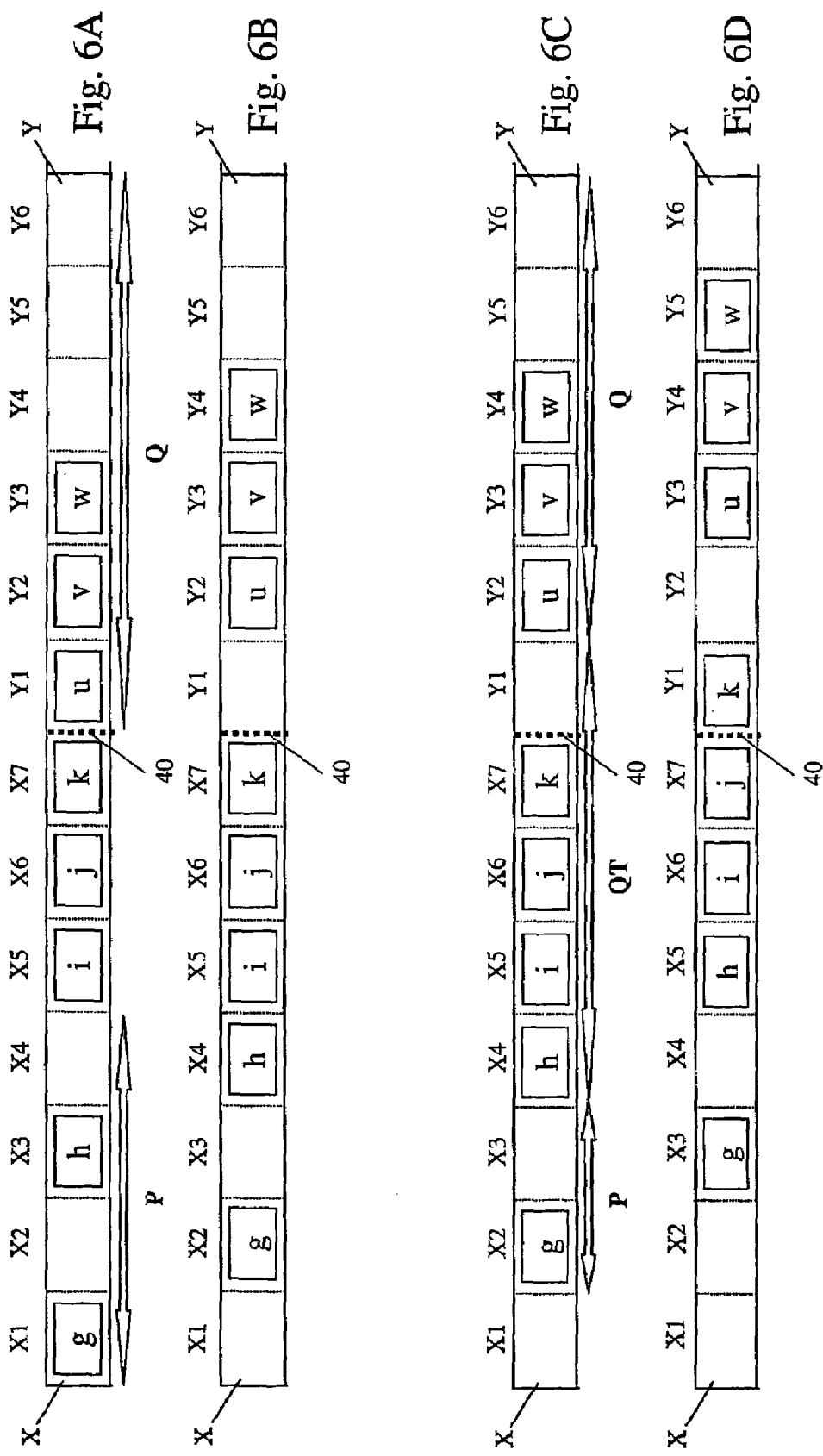

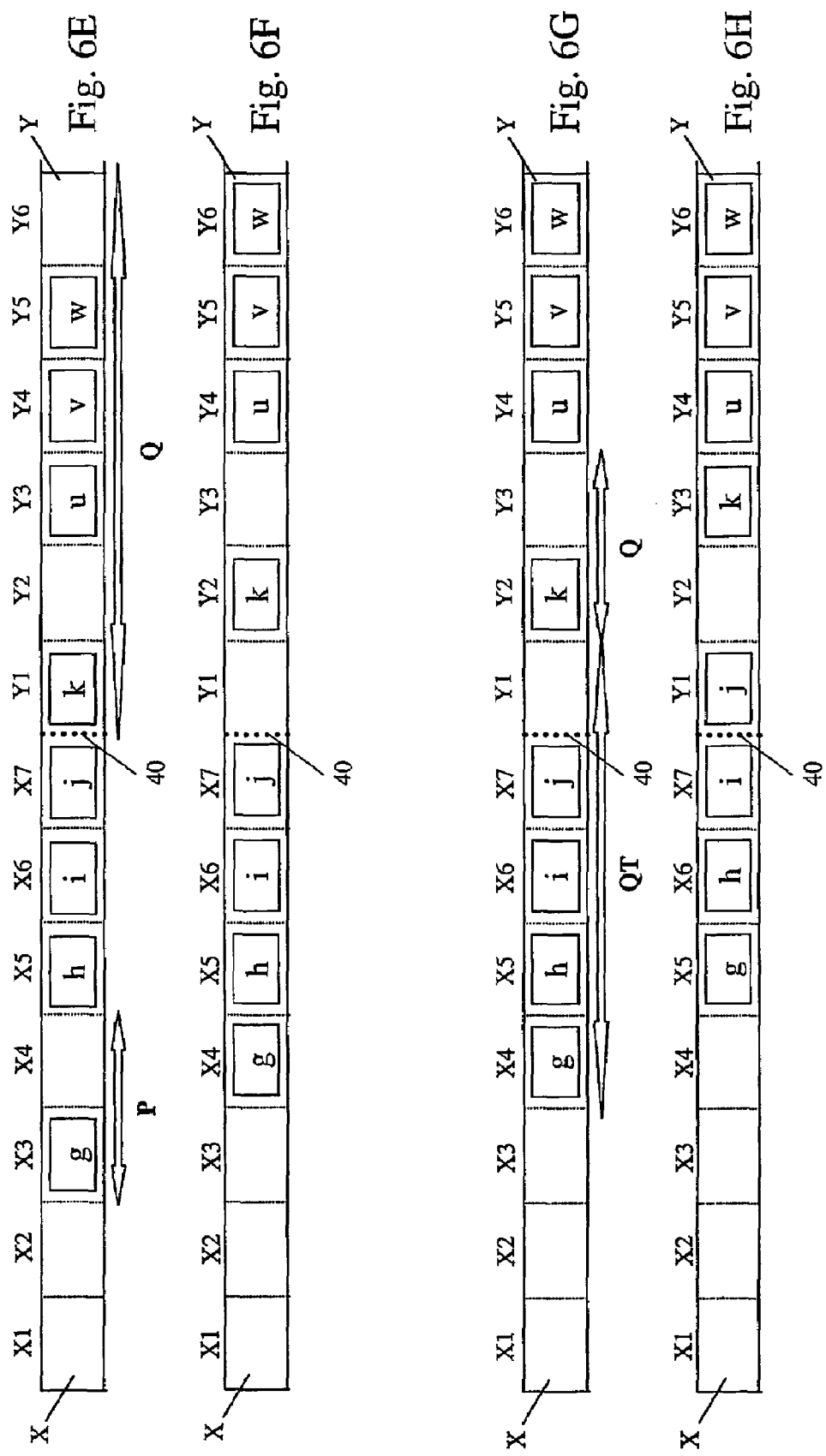

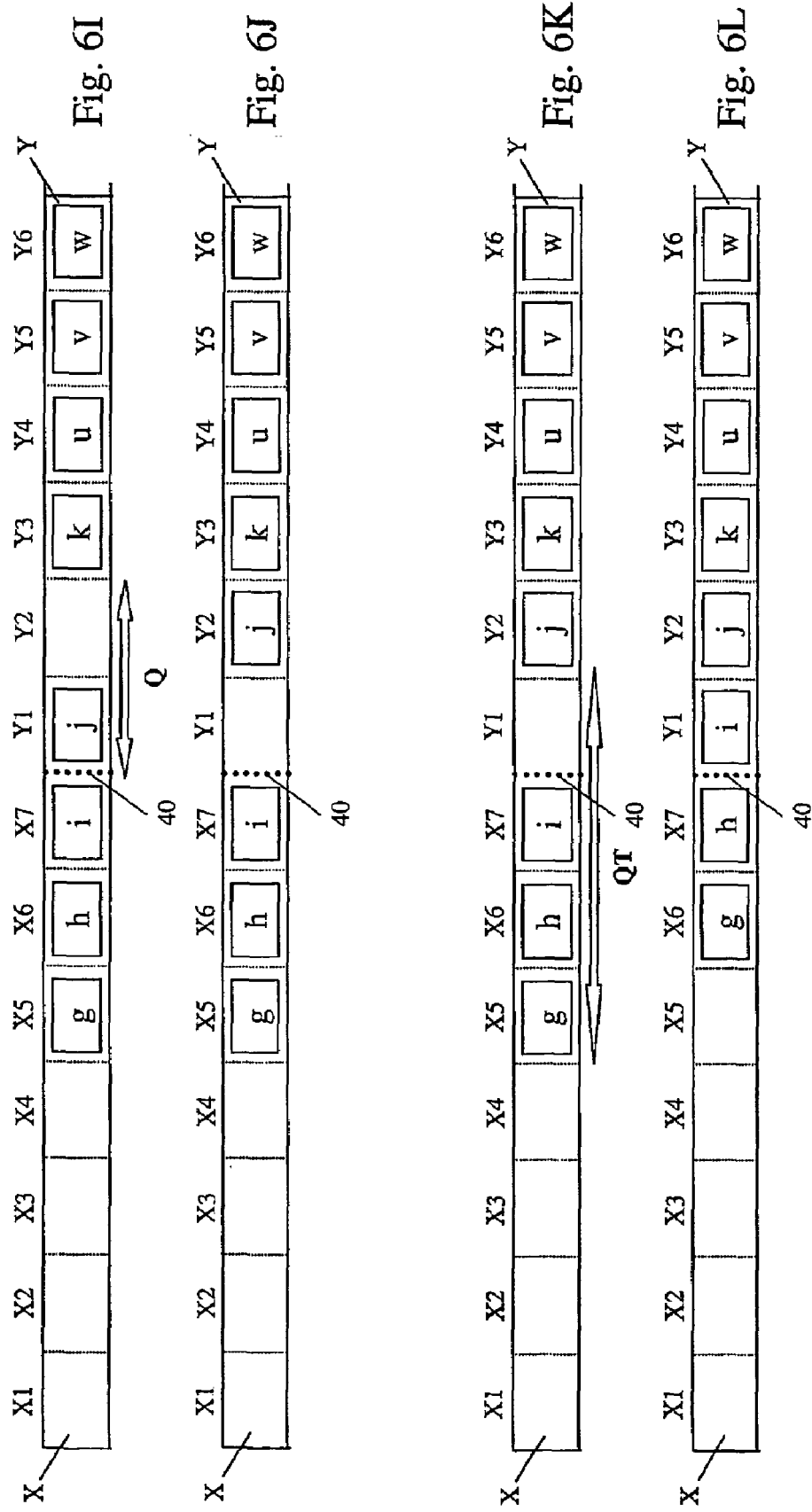

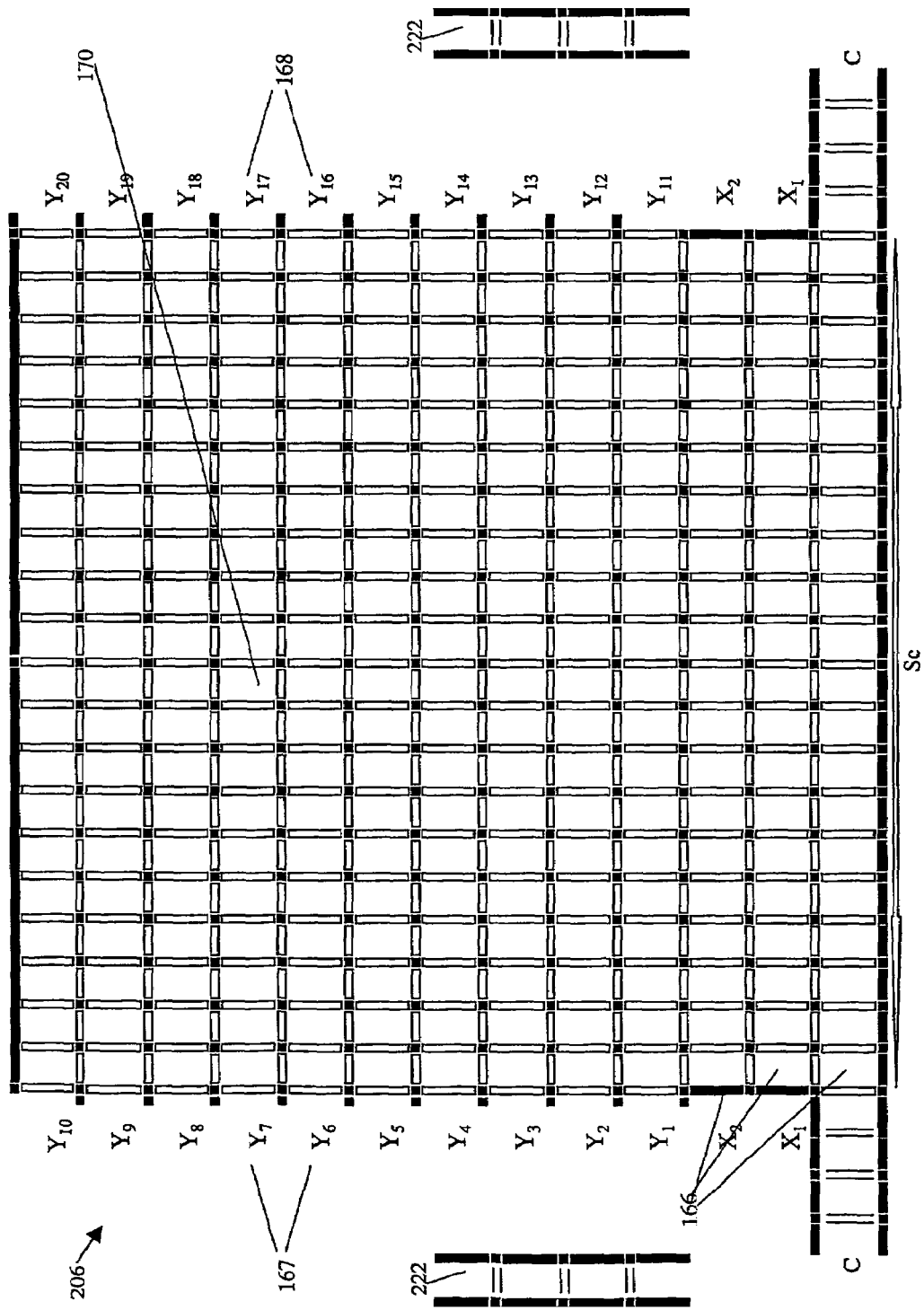

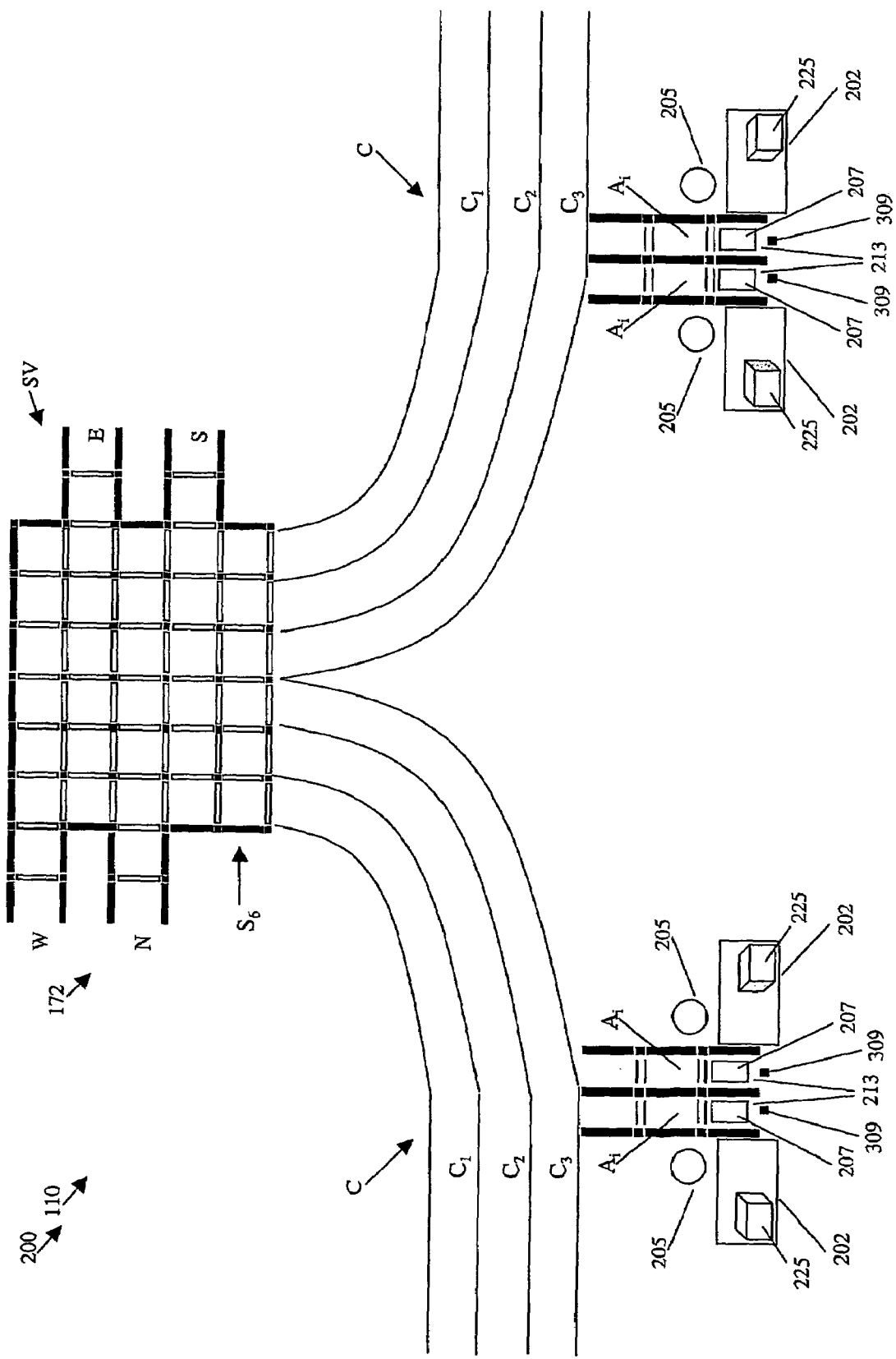

Fig. 14

450 — Passenger Dan arrives at airport departure area 200 with three pieces of luggage: $404_1$, $404_2$, and $404_3$, by a ground vehicle such a car, a train or a bus.

452 — Passenger Dan walks over to wagon pick-up area 221, takes wagon 10, with sac 406 in it and reviews the operational instructions provided on wagon 10.

454 — Passenger Dan places luggage $404_1$, $404_2$, and $404_3$ in sac 406 and proceeds towards security check station 201.

456 — After the security check, passenger Dan proceeds with wagon 10 towards check-in station 202.

458 — At check-in station 202, passenger Dan mounts wagon 10 on track system 110, using switch 54 (Figs. 3C and 3D). Alternatively, sensor 309 (Fig. 10A) senses the approach of wagon 10 and starts the operation of motor 28.

460 — Check-in attendant 205 weighs the luggage and attaches to sac 406 a luggage code 99, which preferably includes the number of pieces of luggage. Additionally, check-in attendant 205 may attach code 99 also to individual pieces $404_1$, $404_2$, and $404_3$, as a measure of safety, in case sac 406 is damaged.

462 — Check-in attendant 205 records passenger Dan's information and luggage code 99 into computer terminal 225, which is connected to $CMS_{departure}$ 82. Passenger Dan's information may include, for example, name, address, telephone number, cellular phone number, flight number, airline, destination, stopovers, departure date and time, estimated arrival time, and luggage code 99, preferably including the number of pieces of luggage.

464 — Check-in attendant 205 preferably issues passenger Dan an electromagnetic card or a similar device, which may also include a beeper, and which corresponds to his passenger's information and luggage code 99. Attendant 205 completes the handling of that wagon 10 and he notifies $CMS_{departure}$ 82 by a key stroke of computer terminal 225.

466 — $CMS_{departure}$ 82 correlates the passenger Dan's information with luggage code 99 and code 13 of wagon 10, as read by track sensor 120 on track $A_1$. Thus wagon 10 becomes wagon $10_{Dan}$.

468 — $CMS_{departure}$ 82 directs wagon 10 with luggage $404_1$, $404_2$, and $404_3$, in sac 406 to the proper airplane loading zone 204, of airplane 209, based on the passenger Dan's information.

470 — Porters close sac 406 tightly and load it onto a platform, which is loaded onto airplane 209.

472 — Passenger Dan walks over to the boarding gate for airplane 209.

Fig. 15

510 — At check-in station 202, as passenger Dan mounts wagon 10 on track $A_i$ of track system 110, track sensor 120 reports to $CMS_{departure}$ 82 the position of wagon 10, which contains passenger Dan's luggage, and code 13 of that wagon 10.

512 — Check-in attendant 205 weighs luggage $404_1$, $404_2$, and $404_3$, provides the luggage with code 99, and enters into terminal 225 of $CMS_{departure}$ 82 relevant passenger Dan's information, including the flight number and luggage code 99, preferably including the number of pieces of luggage. Attendant 205 completes the handling of that wagon 10, and he notifies $CMS_{departure}$ 82 by a key stroke of computer terminal 225.

514 — $CMS_{departure}$ 82 correlates code 13 of wagon 10 on track $A_i$ to the information received from terminal 225 associated with the particular track $A_i$, and designates wagon 10 as wagon $10_{Dan}$.

516 — $CMS_{departure}$ 82 determines for wagon $10_{Dan}$ a track path along track system 110 delineated by tracks and track sorting junctions from proximal end 213 of track $A_i$ to loading zone 204 of airplane 209.

518 — $CMS_{departure}$ 82 informs all servers and sub servers associated with movements of wagons along track system 110 of departure area 200 of the specific track path of wagon $10_{Dan}$.

520 — Servers and sub servers associated with movements of wagons along track system 110 of departure area 200 will move wagon $10_{Dan}$ motion step by motion step in accordance with its track path, from proximal end 213 of track $A_i$ to loading zone 204 of airplane 209.

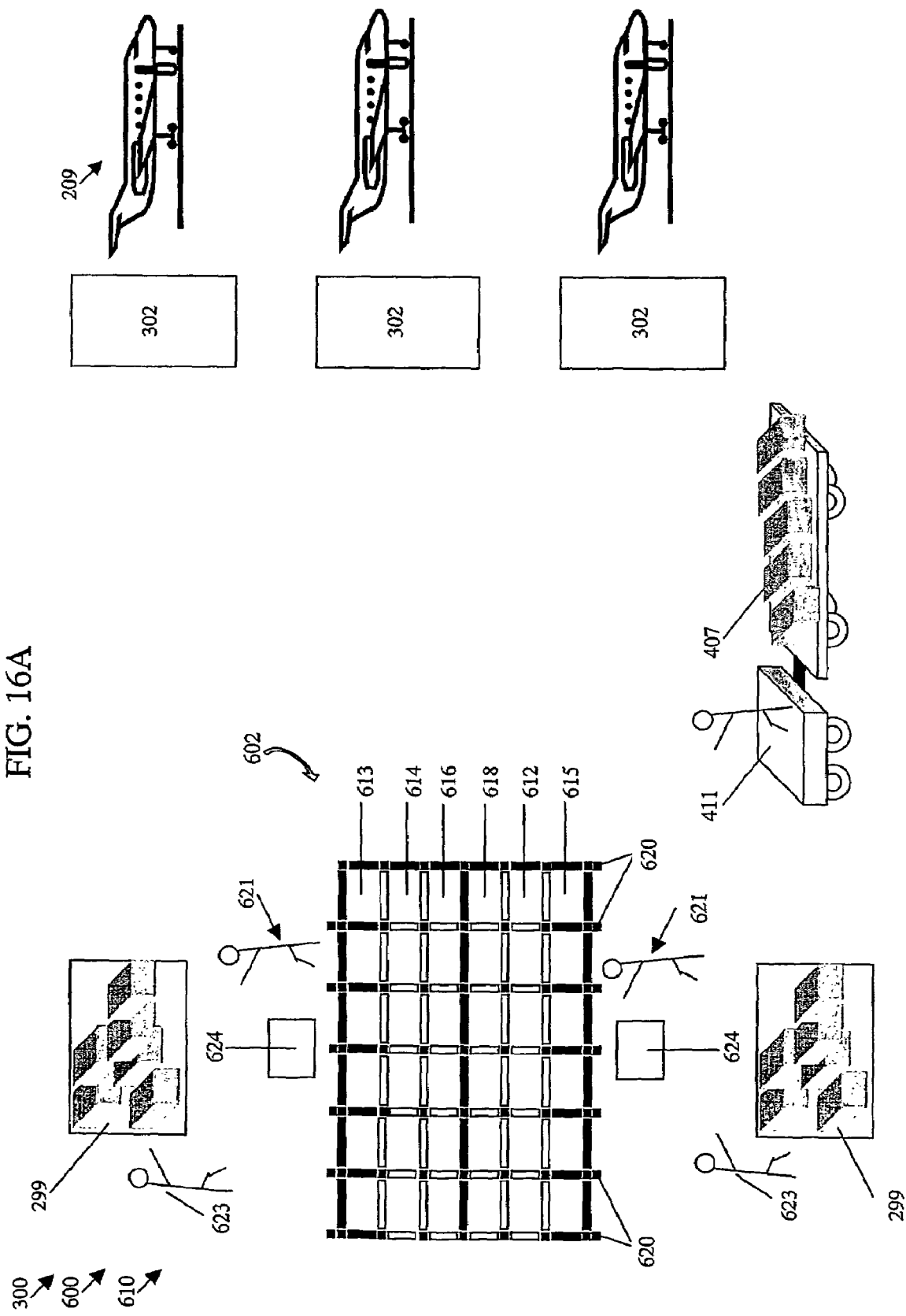

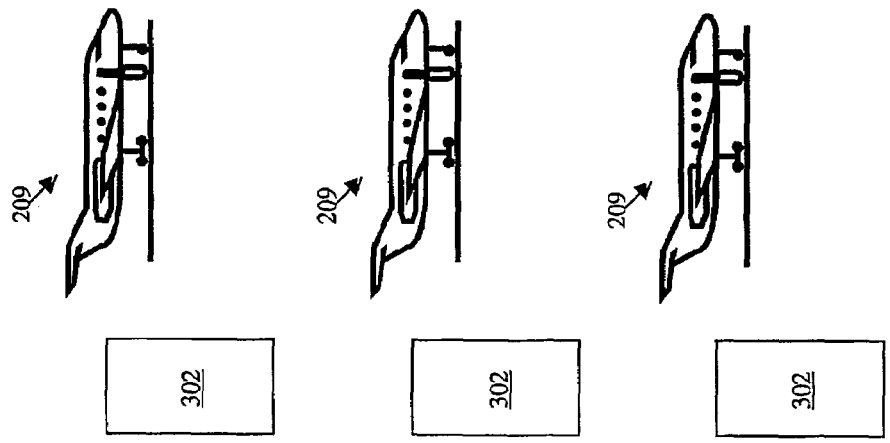
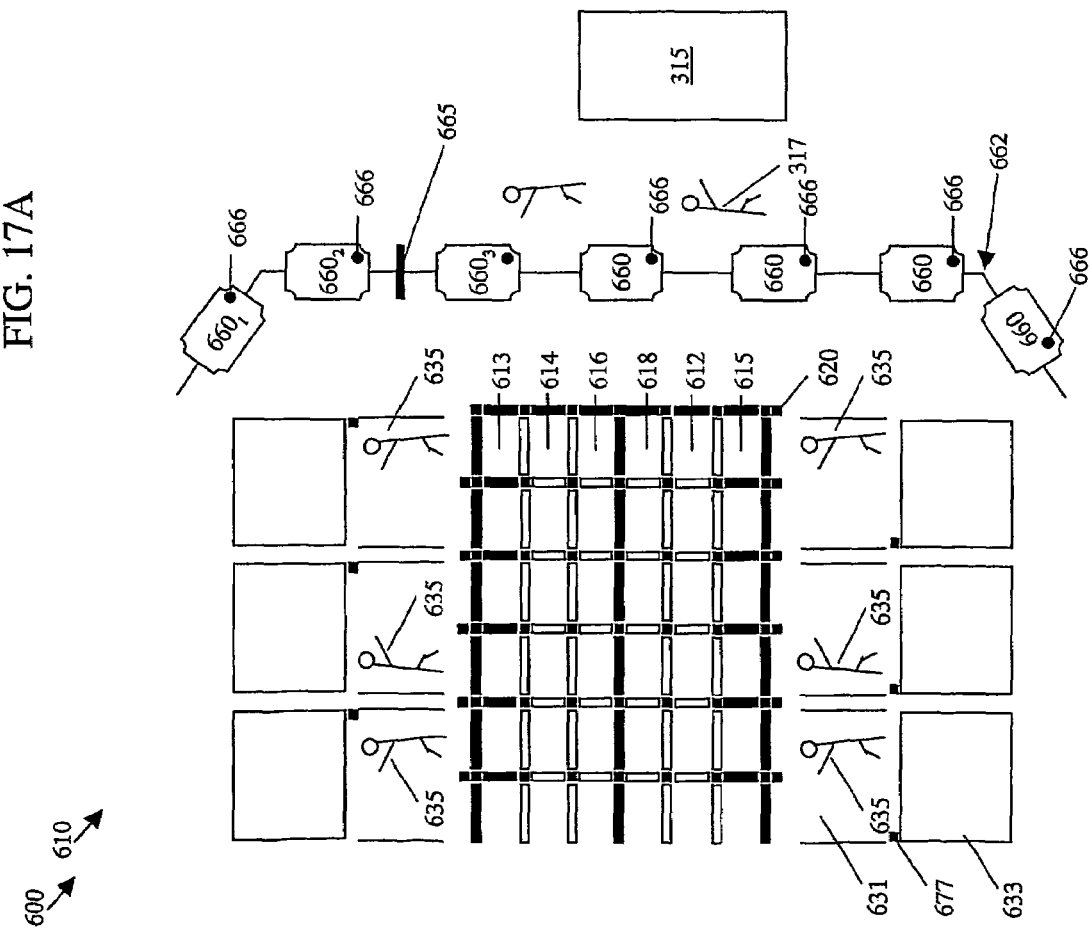
FIG. 17A

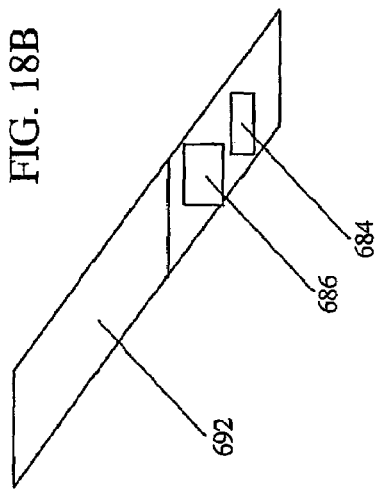
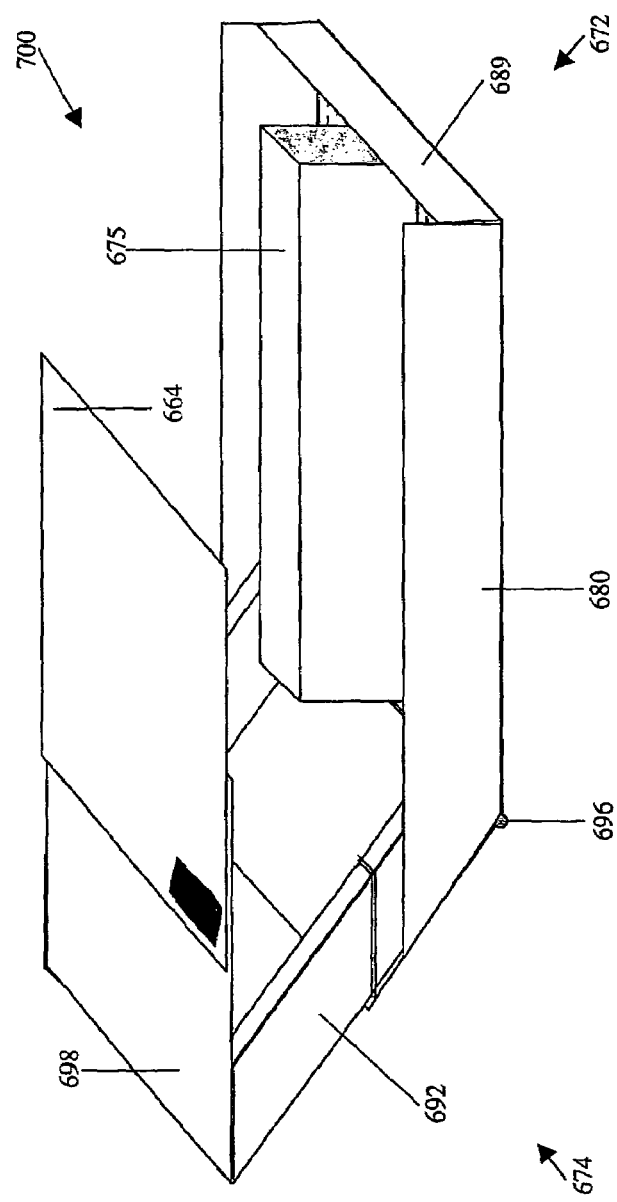

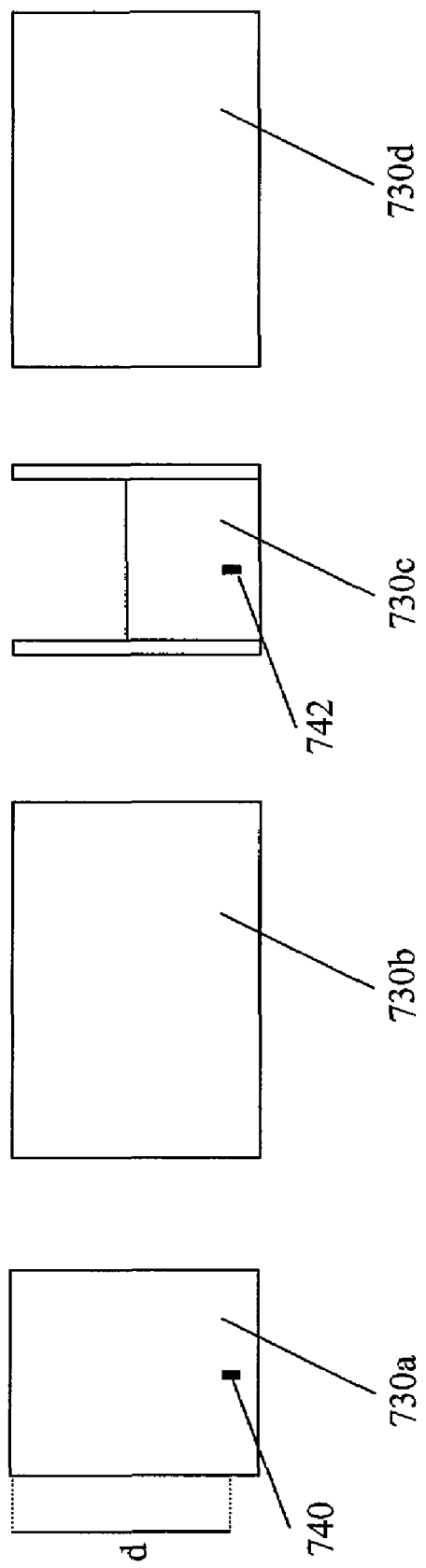

FIG. 20C
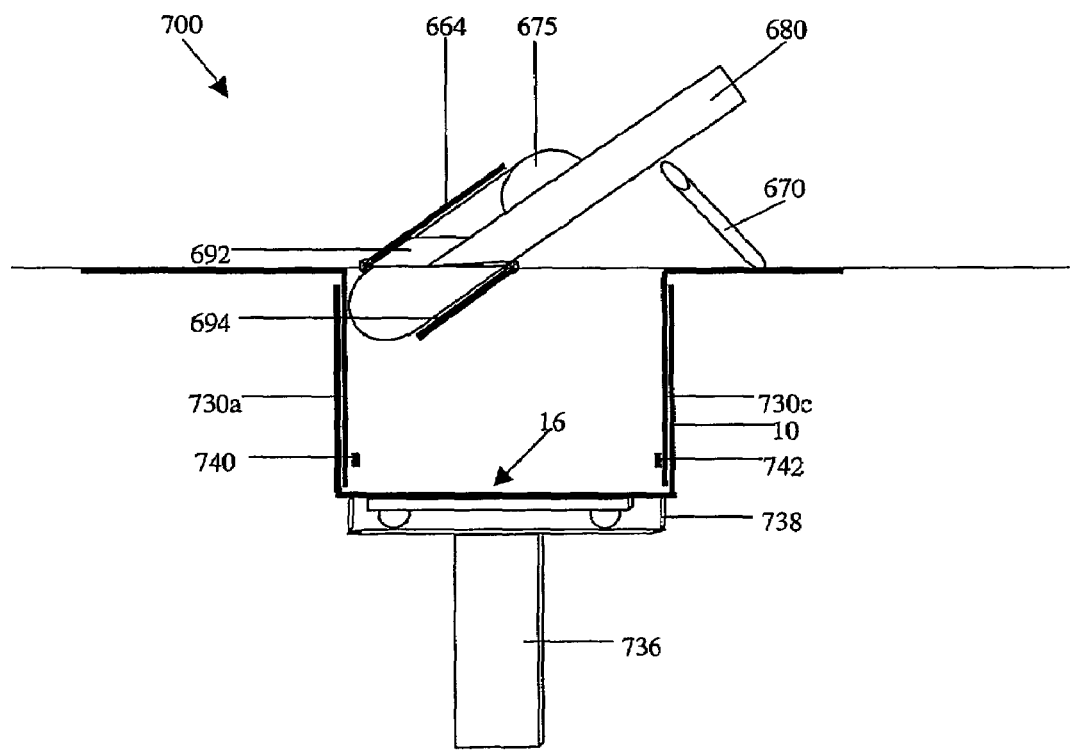
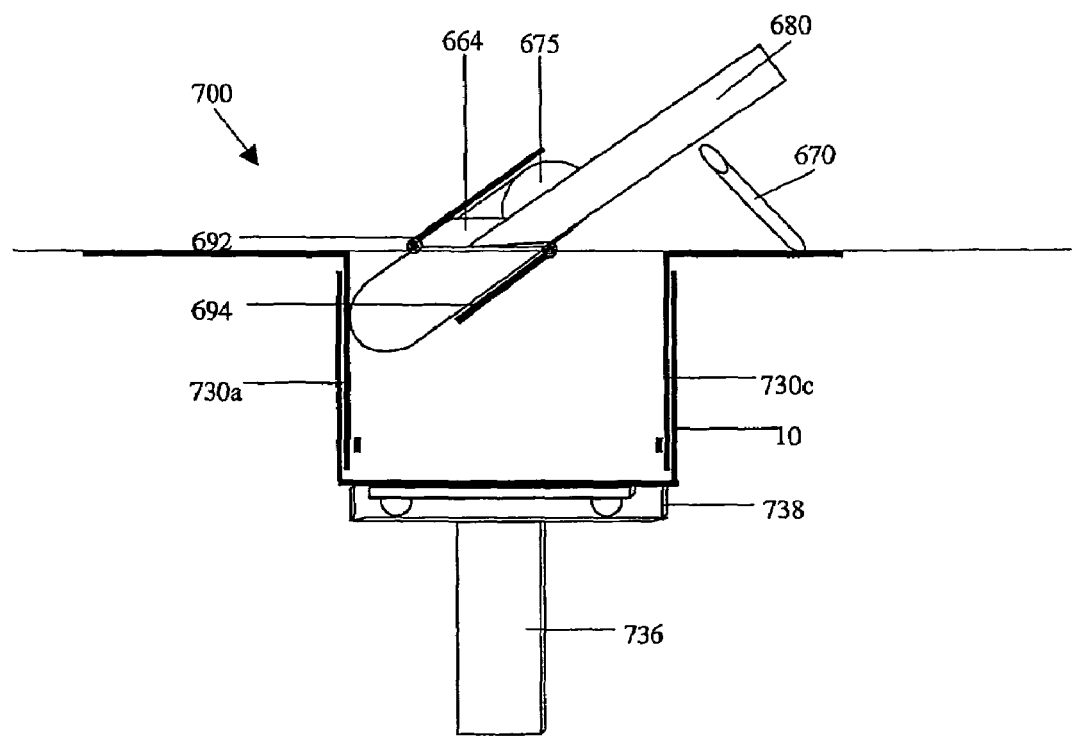

FIG. 20D
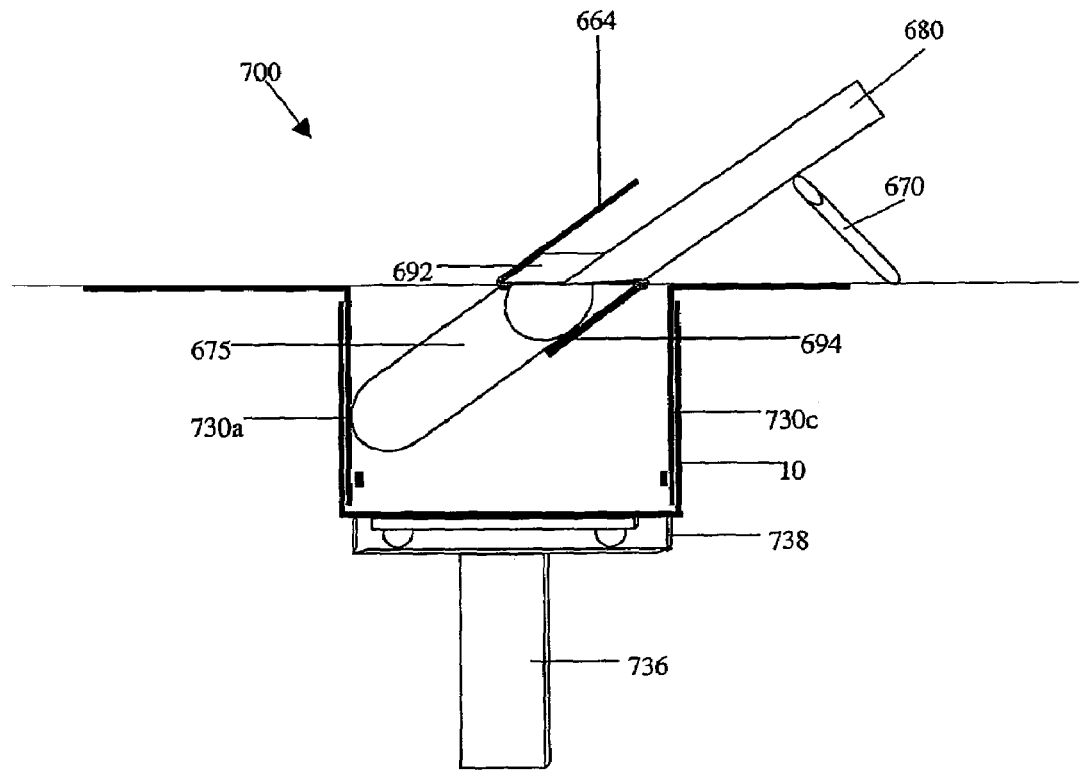
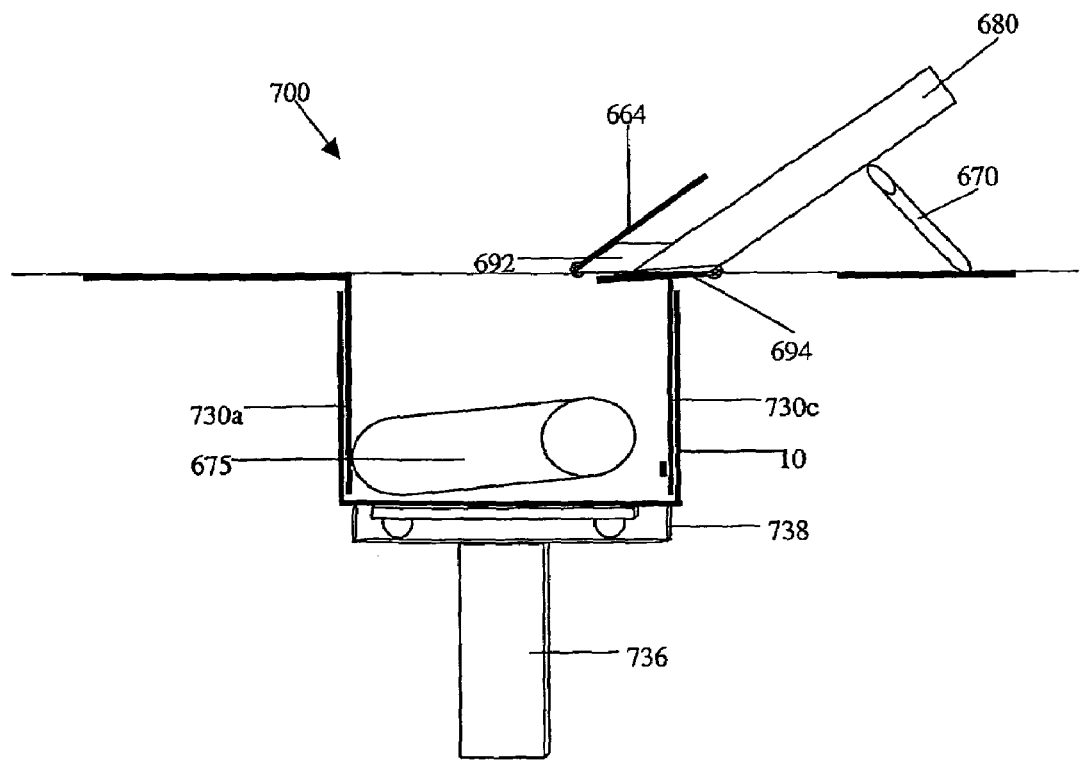

FIG. 20E
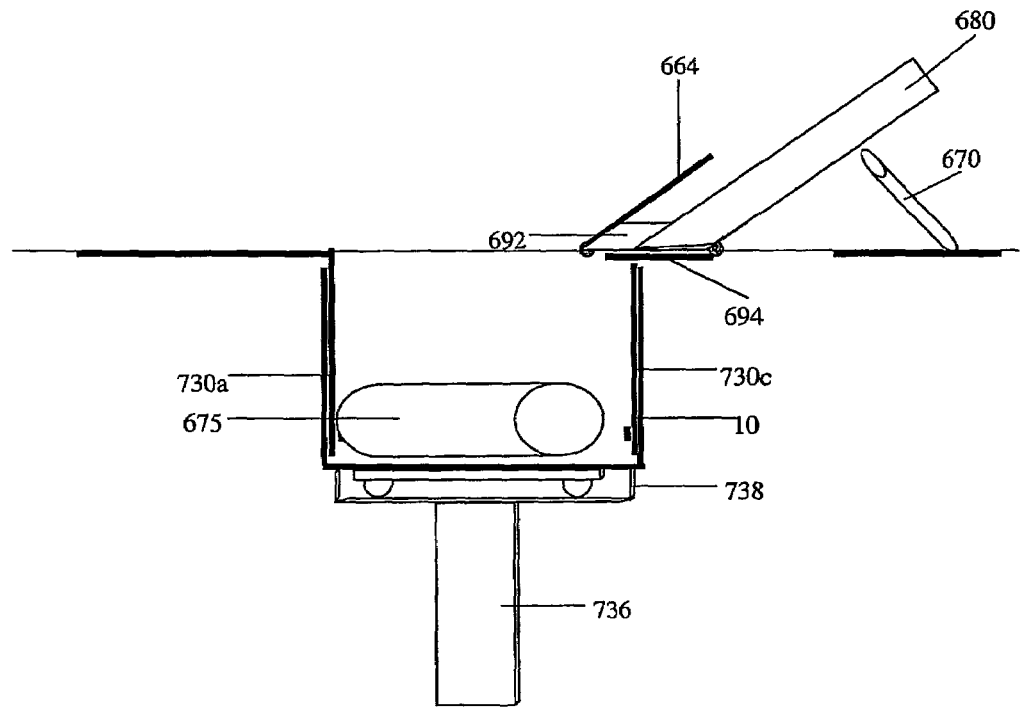
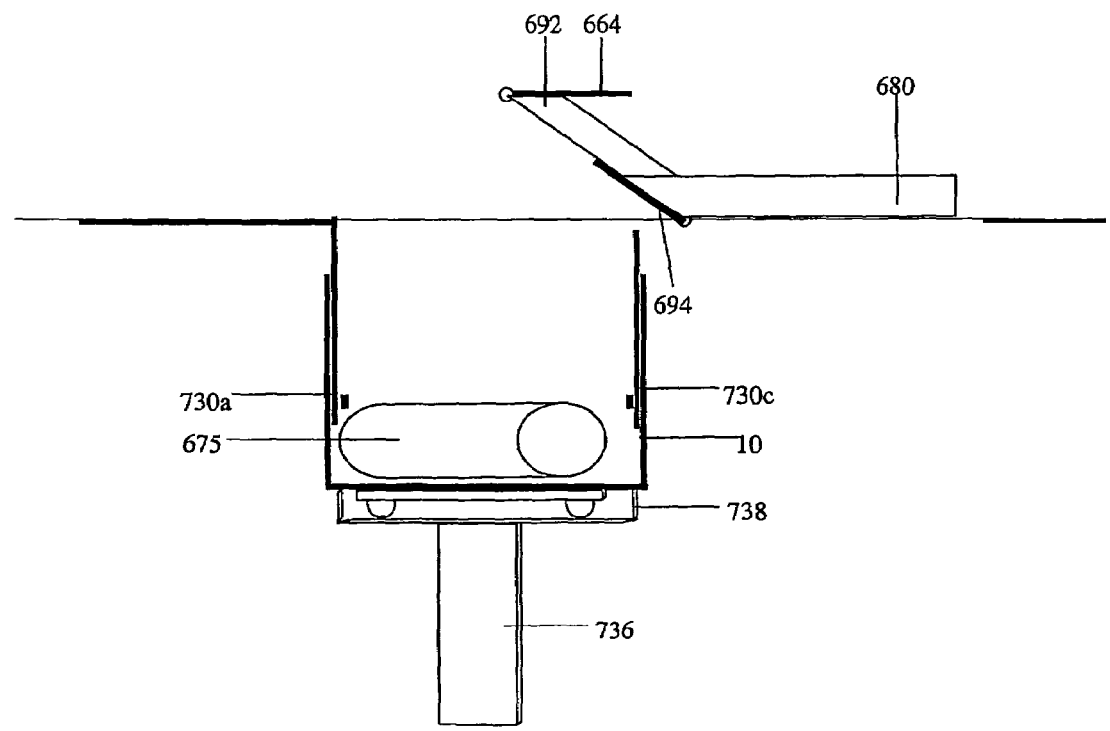

Thread-P-Q-QT

FIG. 22A
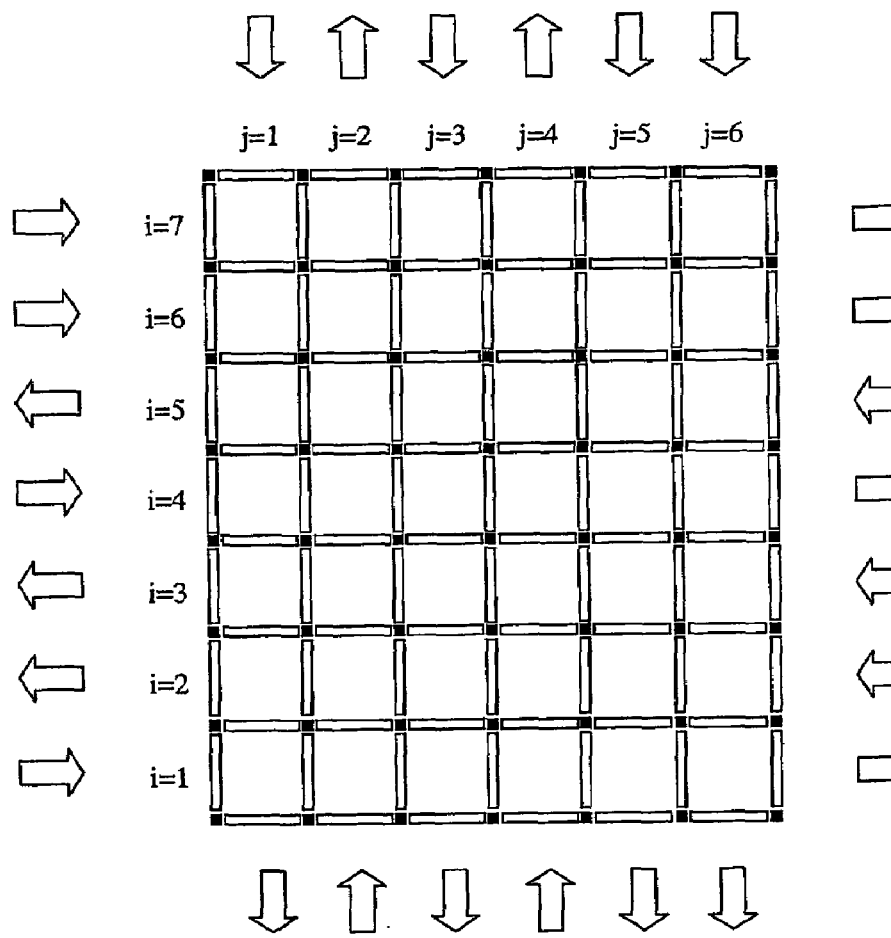
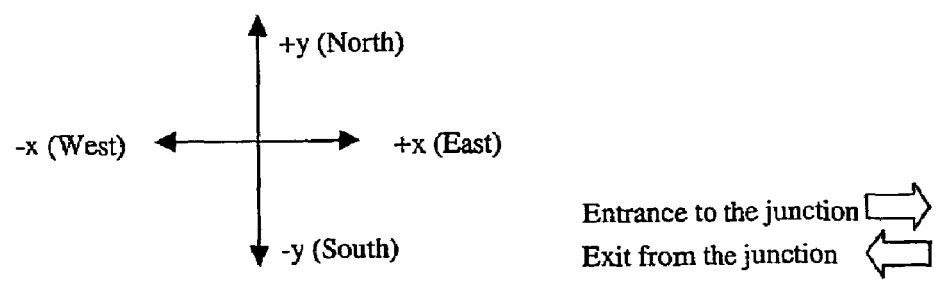

FIG. 22B
*Examples of paths*
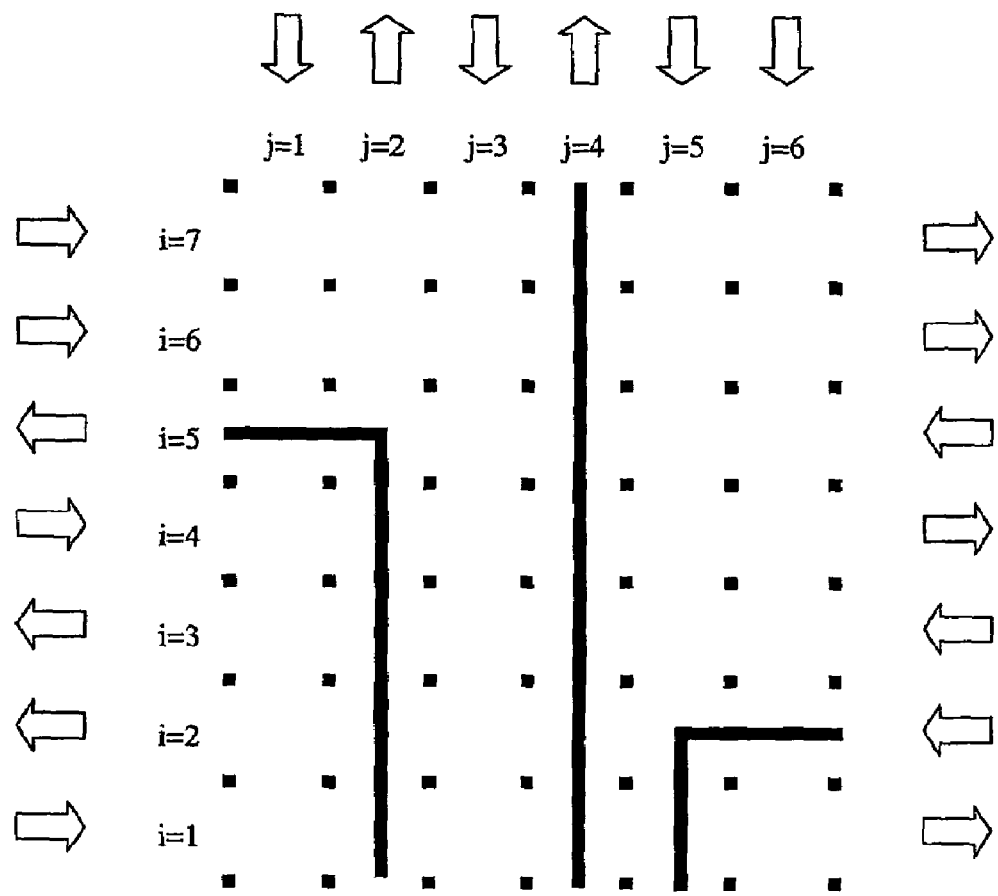
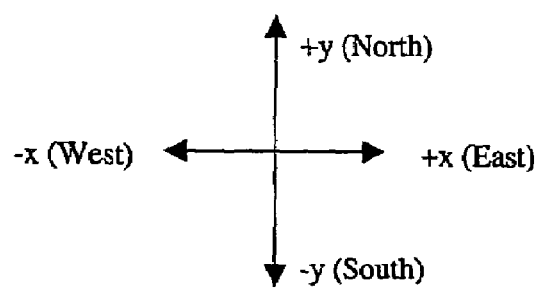

Vertical part of the path

Perpendicular part of the path

FIG. 24A
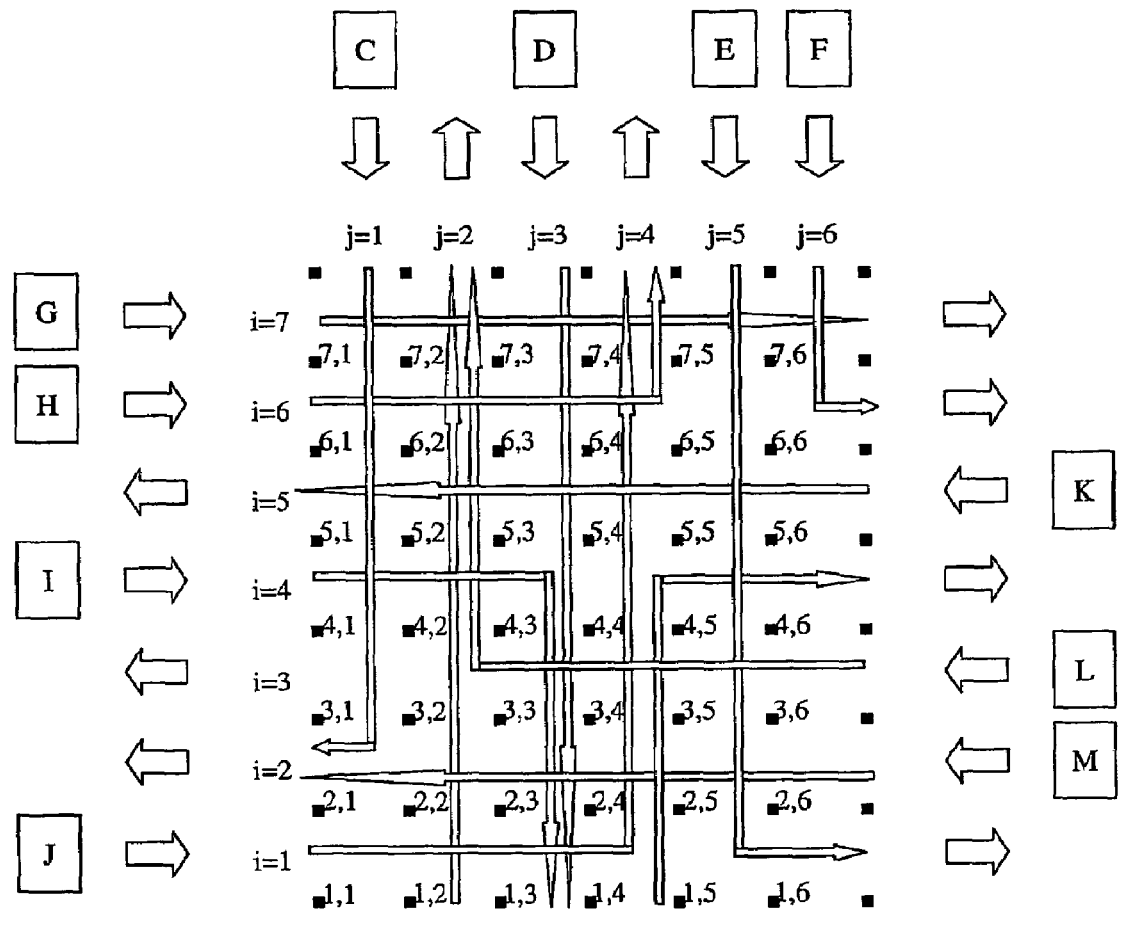
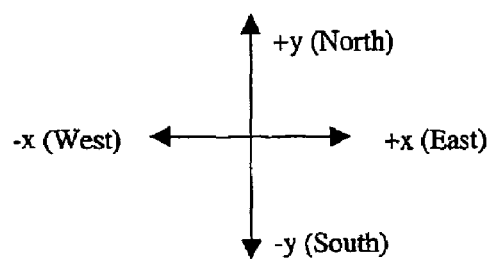

FIG. 24C
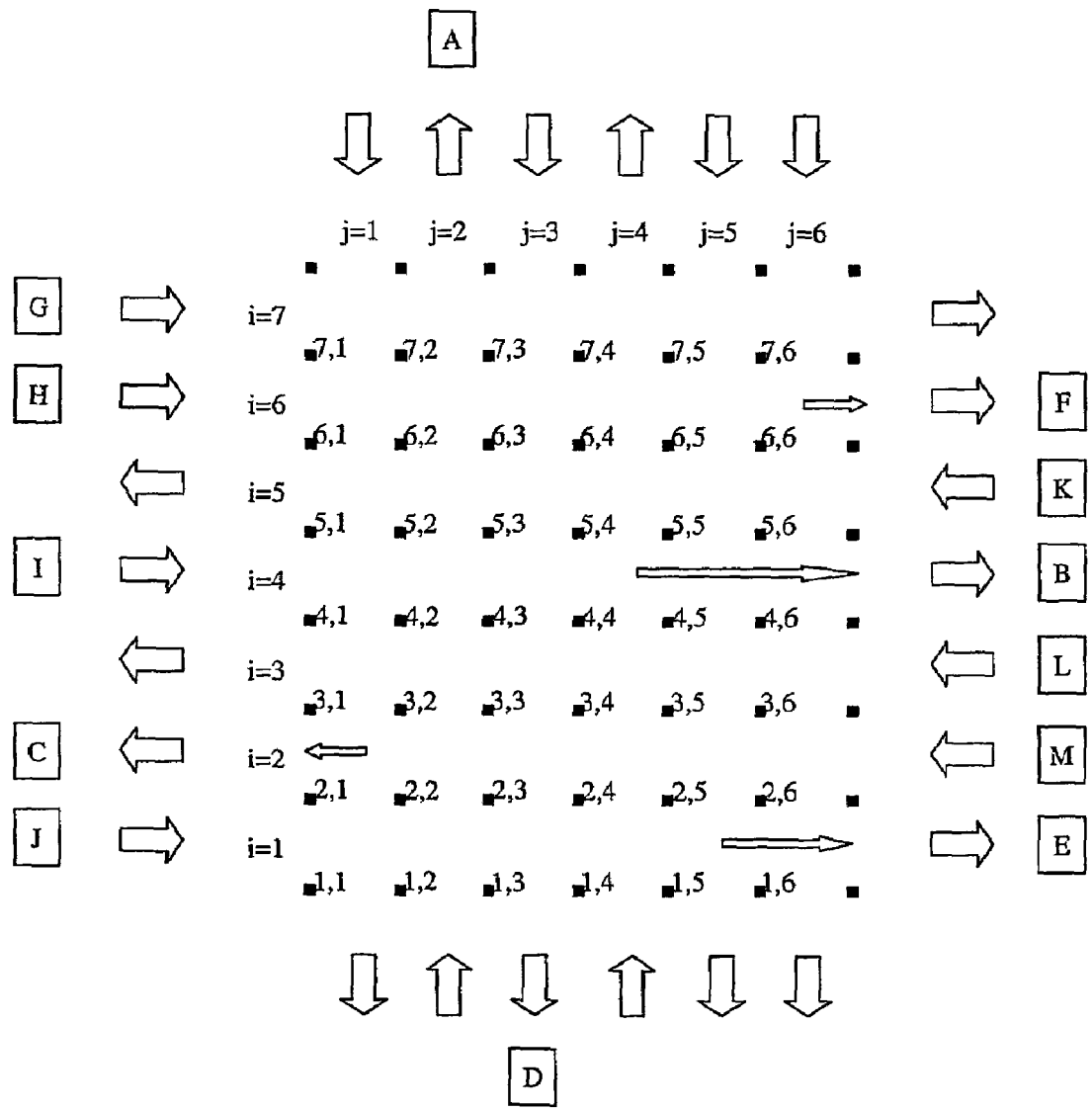
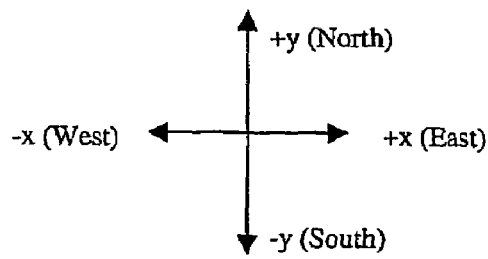

FIG. 24D
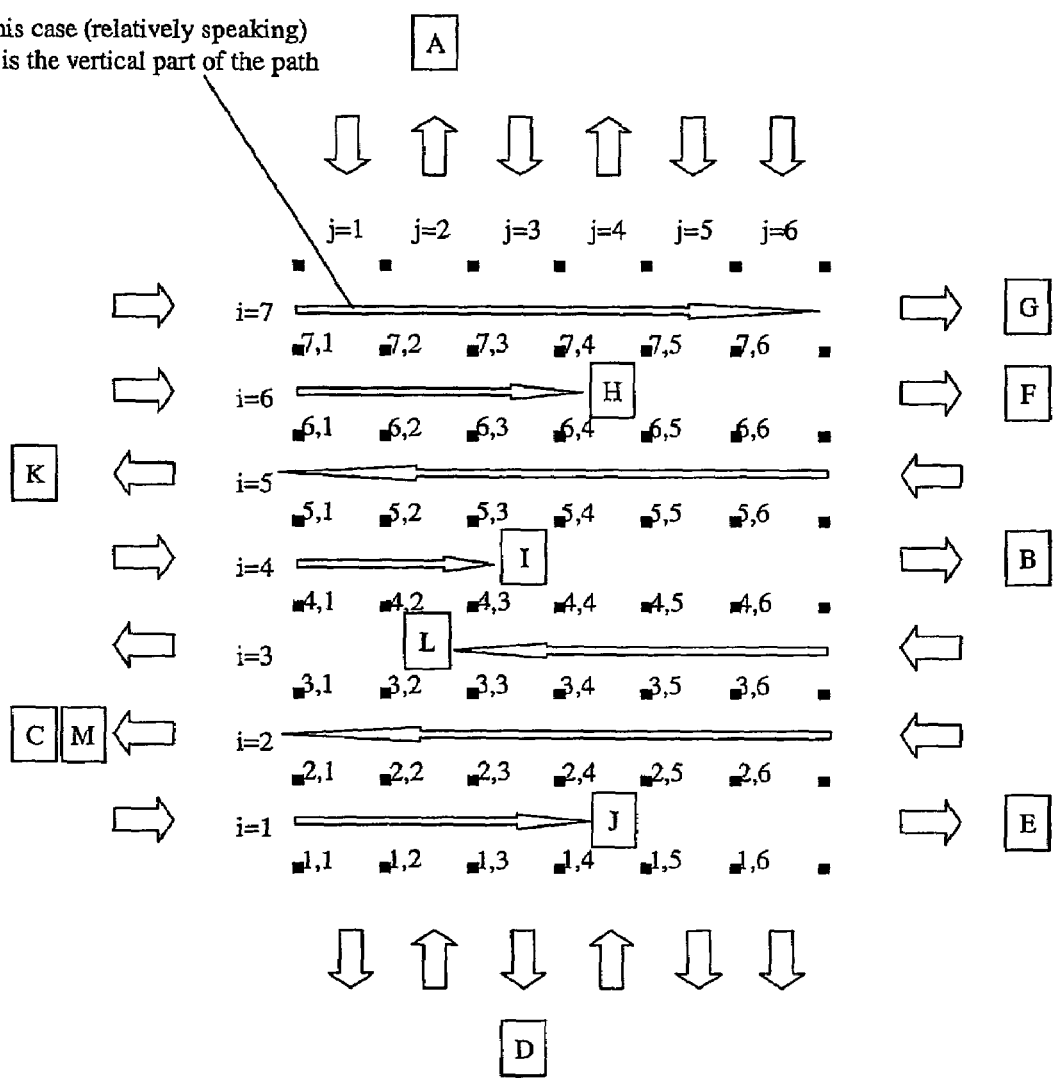
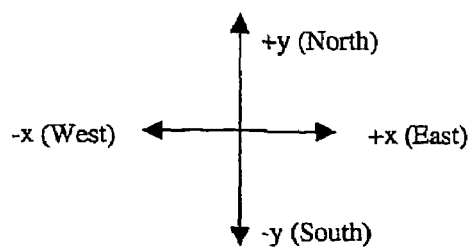

FIG. 27A
*Th-304₁*
*This flowchart describes how wagons are brought from 630₁ to 304₁ and from 630ᵢⱼ to 304₁.*
*Th-304₆ is similar to Th-304₁*
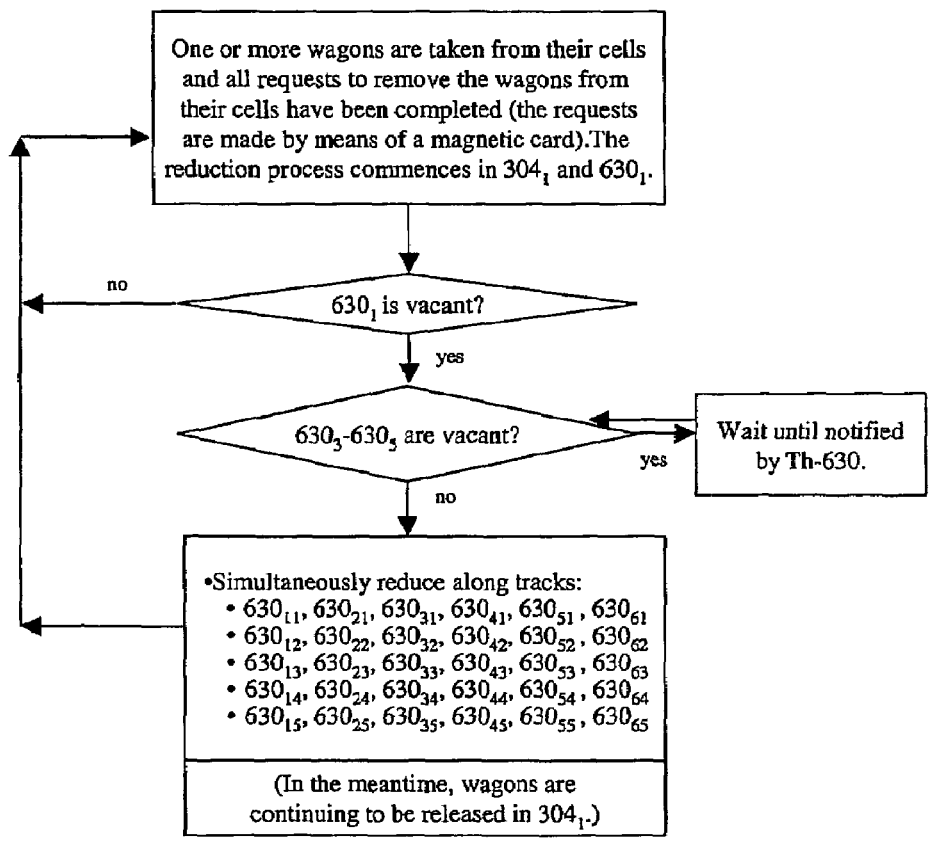
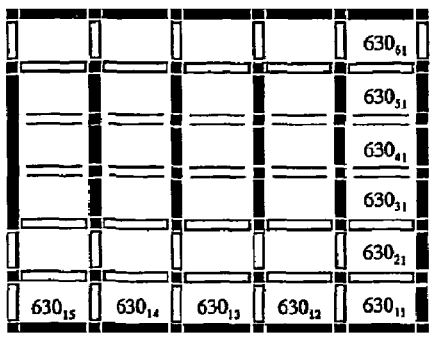

FIG. 27B
*Th-304$_2$*
*This flowchart describes how carts are brought from 630$_2$ to 304$_2$ and from 630$_{ij}$ to 304$_2$.*
*Th-304$_5$ is similar to Th-304$_2$*
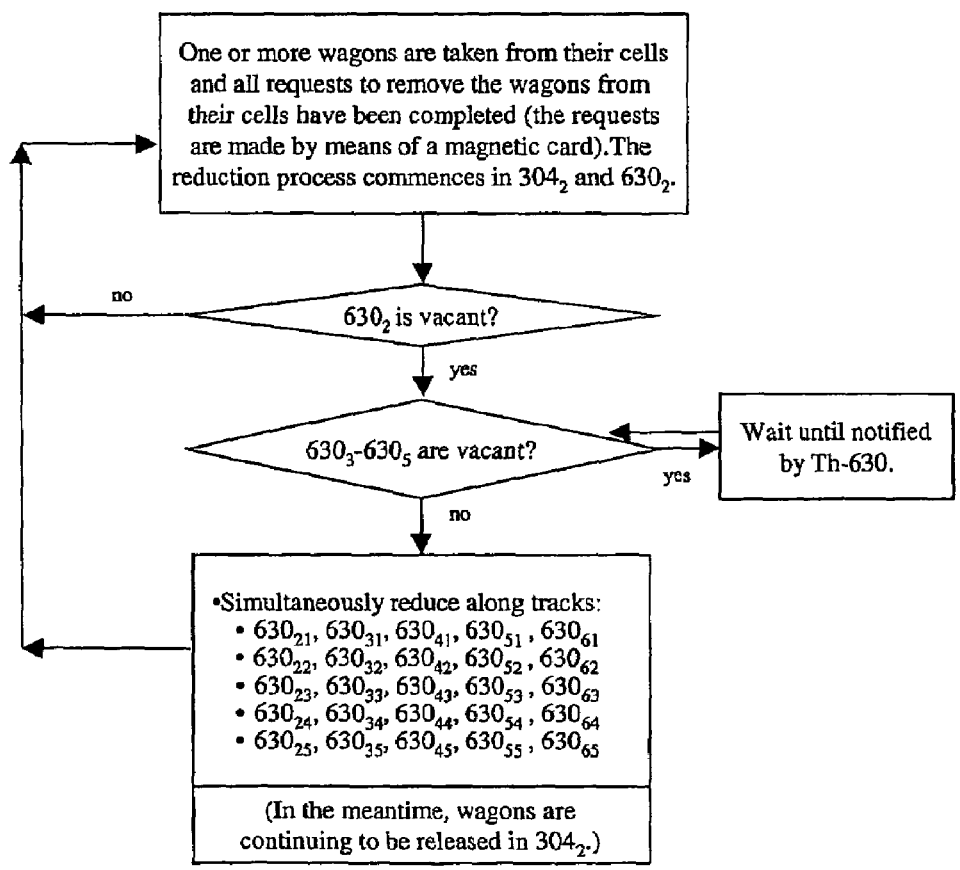
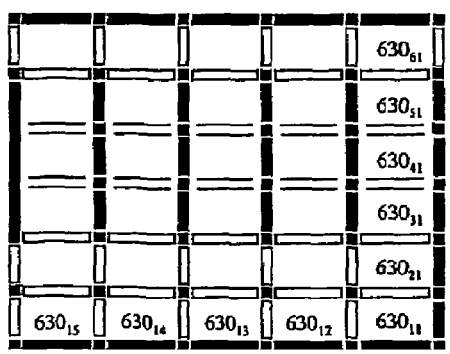

FIG. 27C
*Th-304₃*
*This flowchart describes how carts are brought from $630_6$ and 618 to $304_3$.*
*Th-$304_4$ is similar to Th-$304_3$*
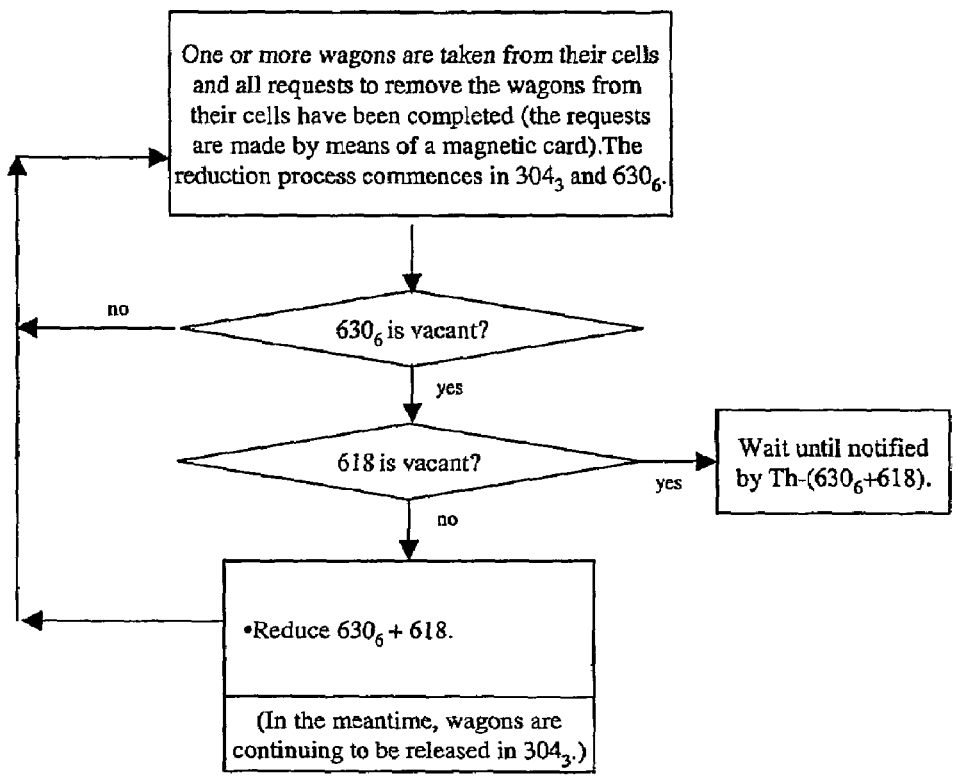
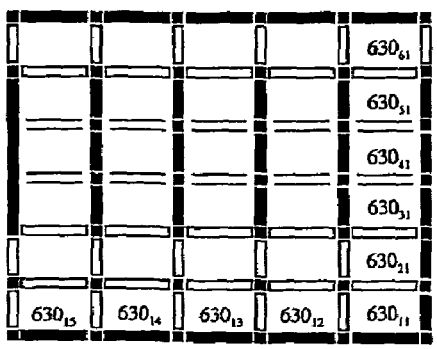

*Th-630*

*This flowchart shows how loaded carts are brought from 618 track to tracks $630_3$, $630_4$ and $630_5$. Th-632 is similar to Th-630*

*Flow Diagram - Arrival Area - A*

(1) - Sub Server 1
(2) - Sub Server 2

US 7,325,497 B2

AUTOMATED AIRPORT LUGGAGE SYSTEM

FIELD OF THE INVENTION

The present invention relates generally to systems for transporting luggage and in particular to an automated airport luggage system.

BACKGROUND OF THE INVENTION

Many people are familiar with luggage-related difficulties that are associated with air travel. Carriages may be hard to find, or they may not be large enough for the luggage. At luggage pick-up zones, passengers crowd around conveyer belts, blocking each other's view, and interfering with each other's attempt to retrieve their belongings. Most annoying, sometimes a passenger may be flying to one destination, while his or her piece of luggage is sent to another.

U.S. Pat. No. 5,793,639 to Yamazaki, "Baggage Receiving and Handling Method in Airport, and Baggage Automatic Handling Apparatus," 1998, describes an airport baggage receiving, identifying and handling method. The method includes providing identification information of the passenger and the baggage separately and with respect to each other when the passenger checks in. The method further includes storing a result of a baggage security check, retrieving the baggage security check results, conveying the baggage security check result to the passenger, and forwarding the baggage after the baggage security check is satisfied. As a result, only baggage that has satisfied the security check is forwarded to a storing section. However, a disadvantage of this system is that it provides a baggage handling method only for part of the baggage route, from the point of check-in to the storing section at the arrival terminal.

U.S. Pat. No. 5,689,239 to Turner et al., "Identification and Telemetry System," 1997, describes a method of automatically identifying articles such as baggage or carrier cargo by electronically coded labels to aid in the sorting and handling operations. However, this method does not reduce the hardship of the passengers, in handling their baggage in the airport.

U.S. Pat. No. 4,227,607 to Malavenda, "High Volume Method and System for Dynamically Storing Articles for Sorting and Routing," 1980, describes a method and system for transporting, coding and dynamically storing articles between a check-in station and a coding station. It also describes a dynamic storage method for automatically storing articles on a conveyor system. As in the previous patents, this patent does not offer a solution to the whole baggage route and to baggage handling at the destination airport.

U.S. Pat. No. 4,416,435 to Szendrödi "Baggage-Handling System for Airport," 1983 describes a baggage-transportation system for airports, having a plurality of check-in stations and a plurality of arrival stations and a network of conveyers and tracks. The system includes a network of conveyors or tracks which have paths parallel to one another, generally in the direction of passengers and baggage movement, as well as transverse tracks or paths. The passengers meet with the system after preflight inspection, document check and weight determination at a check-in station.

SUMMARY OF THE INVENTION

It is an aim of the present invention to provide an overall system of luggage logistics, for handling passenger luggage from the moment of the passenger's arriving at a point-of-origin terminal to the moment of the passenger's leaving the destination terminal.

There is thus provided, in accordance with a preferred embodiment of the present invention, a wagon for automatically transporting and sorting luggage, responsive to commands from a computerized management system, which includes:

a rigid frame, for containing the luggage, the frame including:

four sides; and a double bottom having an upper plate, a lower plate, and an internal compartment;

at least one axle, perpendicular to and located within the double bottom, between the upper and lower plates;

at least one wheel, mounted on the axle, for providing the wagon with linear motion against a vertical track wall;

at least two ball-bearing sockets, attached to the lower plate, for transferring motion to the frame;

at least two ball bearings, located within the sockets, arranged for rolling motion in any direction, for providing the wagon with both linear and spinning motion on pavements and floors;

a break mechanism, in communication with at least one of the ball bearings, for selectably stopping the motion of the wagon on pavements and floors;

an electric motor, in communication with the at least one axle, for providing motion to the at least one wheel;

a controller for controlling the operation of the motor;

a wireless communication system, for providing communication between the controller and the computerized management system; and a battery for powering any of the motor, the controller and the wireless communication system.

Further in accordance with a preferred embodiment of the present invention, a side of the wagon may be opened by sliding it along a rail between a top-end-of-travel point and a bottom-end-of-travel point.

Additionally, in accordance with a preferred embodiment of the present invention, any of the four sides can be a leading edge.

Further in accordance with a preferred embodiment of the present invention, the at least two ball-bearing sockets include four ball-bearing sockets, wherein the at least two ball bearings include four ball bearings.

Additionally, in accordance with a preferred embodiment of the present invention, the wagon includes a break mechanism associated with at least one ball bearing and operative to electronically stop the motion of the wagon when on pavements and floors.

Further in accordance with a preferred embodiment of the present invention, the at least one axle includes four axles, wherein the at least one wheel includes four wheels.

Additionally, in accordance with a preferred embodiment of the present invention, the electric motor is in communication with at least two adjacent axles of the four axles, for providing motion to at least two adjacent wheels.

Further in accordance with a preferred embodiment of the present invention, the wagon includes a clutch mechanism for alternating between providing motion to two adjacent wheels along an x-axis and two adjacent wheels along a y-axis.

Additionally, in accordance with a preferred embodiment of the present invention, the controller controls the operation of the clutch.

Further in accordance with a preferred embodiment of the present invention, the wagon includes a charging rod, extending from the lower plate to a power tunnel located on a track, for providing power to any of the motor and the battery.

Additionally, in accordance with a preferred embodiment of the present invention, the wagon includes a charging-rod switch, for selectably deploying and selectably retracting the charging rod.

Further in accordance with a preferred embodiment of the present invention, the wagon includes four sensors, located on the four sides, for sensing an obstacle along a track, wherein the sensors report to the controller, wherein the controller will stop the motor when the track is blocked, and wherein the controller will re-start the motor when the obstacle is removed.

Additionally, in accordance with a preferred embodiment of the present invention, the wagon includes a coded identification.

Further in accordance with a preferred embodiment of the present invention, the coded identification is arranged to be read by track sensors, wherein the track sensors report their readings to the computerized management system.

Additionally, in accordance with a preferred embodiment of the present invention, the wagon includes a strip of coded graduation marks, extending along the length of the wagon, indicative of the fractional length of any point along the strip with respect to the length of the wagon, the strip of coded graduation marks is further arranged to be read by the track sensor.

Further in accordance with a preferred embodiment of the present invention, the wagon includes a strip of coded graduation marks, extending along the width of the wagon, indicative of the fractional width of any point along the strip with respect to the width of the wagon, the strip of coded graduation marks is further arranged to be read by the track sensor.

Additionally, in accordance with a preferred embodiment of the present invention, the coded identification is visible to a person handling the wagon and arranged to be read by a hand scanner that is held by the person.

Further in accordance with a preferred embodiment of the present invention, the wagon includes a control panel which includes at least one of:

a first switch, for manually mounting the wagon onto the track and for manually removing the wagon from the track;

a second switch, for manually activating the break mechanism;

a warning signal, for indicating any of when the battery is low and when the wagon malfunctions; and a display panel for interactive communication with a user.

There is thus also provided, in accordance with a preferred embodiment of the present invention, a wagon and track system for automatically transporting and sorting luggage, responsive to commands from a computerized management system, which includes:

a plurality of wagons as has been described hereinabove;
a plurality of tracks wherein each track includes:
a horizontal track strip, defining an x-axis, along which each of the wagons travels; and vertical track walls against which the at least one wheel of each of the wagons rolls, for providing the wagon with linear motion along the x-axis, wherein the vertical track walls may include dividing-wall sections along the horizontal track strip and external wall sections, bounding the horizontal track strip,
wherein threads of the computerized management system control the movement of the wagon along the track by commanding the stopping and starting of the motor.

Further in accordance with a preferred embodiment of the invention, the wagon further includes a coded identification, and the track further includes a track sensor arranged to read the wagon coded identification and arranged to report its readings to the computerized management system.

Additionally, in accordance with a preferred embodiment of the present invention, the track includes junctions at which wagons may be distributed to different locations.

Further in accordance with a preferred embodiment of the present invention, the track includes merging junctions at which wagons may be collected from different locations. is Additionally, in accordance with a preferred embodiment of the present invention, the external-wall sections may be selectably lowered for allowing the wagon to be removed from the track, and for allowing the wagon to be mounted on the track.

Further in accordance with a preferred embodiment of the present invention, at least one track of the plurality of tracks is operable as a multi-lane track, having dividing-wall sections, along the x-axis, between lanes, and having dividing-wall sections, along a y-axis, across lanes, wherein the dividing-wall sections are arranged to be raised and lowered upon commands from the computerized management system, wherein when the dividing-wall sections along the x-axis are raised, and the dividing-wall sections along the y-axis are lowered, the wagons move in any of positive and negative x direction, and wherein when the dividing wall sections along the y-axis are raised, and the dividing wall sections along the x-axis are lowered, the wagons move in any of positive and negative y direction.

Additionally, in accordance with a preferred embodiment of the present invention, threads of the computerized management system control the movements of wagons within the track by commanding the stopping and starting of the motor and the raising and lowering of the dividing-wall sections along the x-axis and the y-axis.

Further in accordance with a preferred embodiment of the present invention, the multi-lane track includes at least one sorting junction at which the wagons may be automatically distributed to different locations.

Additionally, in accordance with a preferred embodiment of the present invention, the multi-lane track includes at least one merging junction at which wagons may be collected from different locations.

Further in accordance with a preferred embodiment of the present invention, the multi-lane track is operable as a sorting array for automatically sorting wagons onto different locations.

Additionally, in accordance with a preferred embodiment of the present invention, the wagon further includes a charging rod, wherein the track further includes a power tunnel, arranged for powering the charging rod.

Further in accordance with a preferred embodiment of the present invention, the track further includes an entry sensor, which lowers a single external-wall section, associated with the entry sensor, to facilitate the wagon's entry to the track, and which remotely activates the electric motor of the wagon, to facilitate the mounting of the wagon onto the track.

Further in accordance with a preferred embodiment of the present invention, the track further includes a light gate through which the wagon passes after its luggage is removed, for verification that no piece of luggage has remained on the wagon.

Additionally, in accordance with a preferred embodiment of the present invention, the wagon and track system includes, at the destination point, a tray means, for automatically sorting and loading luggage onto the wagons.
Further in accordance with a preferred embodiment of the present invention, the track system includes a departure area which includes:

at least one entry track, associated with a check-in counter, for mounting the wagons onto the track;

at least one collection track, for collecting the wagons from the at least one entry track;

a sorting system, for sorting wagons into different tracks.

Additionally, in accordance with a preferred embodiment of the present invention, the sorting system sorts wagon into different flights.

Further in accordance with a preferred embodiment of the present invention, the departure area includes a wagon return track.

Additionally, in accordance with a preferred embodiment of the present invention, the departure area includes an empty wagon pick-up station.

Further in accordance with a preferred embodiment of the present invention, the track system includes an arrival area which includes:

at least one wagon-loading track system, for loading luggage onto wagons;

at least one luggage pick-up track, for claiming luggage;

at least one loaded wagon transfer system, for transferring loaded wagons from the wagon-loading track system to the luggage pick-up track;

at least one empty-wagon collection track, for collecting wagons after their luggage has been claimed; and at least one empty wagon transfer system, for transferring empty wagons from the at least one empty-wagon collection track to the wagon loading track system.

Additionally, in accordance with a preferred embodiment of the present invention, the wagon-loading track system further includes:

at least one loading track, at which the wagon is loaded;

at least one empty wagon track, through which empty wagons arrive at the loading track; and at least one loaded wagon track, through which loaded wagons are transferred towards the luggage pick-up track.

There is thus also provided, in accordance with a preferred embodiment of the present invention, a facile method of luggage handling at an airport departure terminal, which includes the steps of:

collecting a wagon from a wagon pick-up station;
loading the luggage onto the wagon;
rolling the wagon to a check-in station;
mounting the wagon on a track at the check-in station;
reading a wagon code at the check-in station;
marking the luggage with a luggage code;
informing the computerized management system of the luggage code and of the travel details associated with the luggage on the coded wagon; and
automatically directing the wagon along a track system to a particular travel route, based on the travel details and the wagon code.

Further in accordance with a preferred embodiment of the present invention, the method includes a step of weighing the wagon at the check-in station.

Additionally, in accordance with a preferred embodiment of the present invention, the step of loading further includes steps of:

placing the luggage in a sac;
closing the sac tightly over the luggage; and
loading the sac onto the wagon.

Alternatively, the step of loading further includes the steps of:

strapping the pieces of luggage together; and
loading the strapped luggage pieces onto the wagon.

Additionally, in accordance with a preferred embodiment of the present invention, the step of automatically directing the wagon along a track system to a particular flight further includes:

determining a track path for the wagon; and
directing the wagon along track junctions and sorting arrays, based on the track path that was determined.

There is thus also provided, in accordance with a preferred embodiment of the present invention, a facile method of luggage handling at an airport arrival terminal, which includes the steps of:

at the departure terminal:
marking the luggage with a luggage code; and
informing the computerized management system of the luggage code, the travel details, and the details of the passenger associated with the luggage; and
at the arrival terminal:
loading the coded luggage onto a coded wagon;
entering a wagon-and-luggage code pair into a computerized management system;
tracking by the computerized management system the coded wagon as it moves along a track system; and
notifying the passenger associated with the luggage when the coded luggage has arrived at a pick-up point.

Further in accordance with a preferred embodiment of the present invention, the step of notifying further includes providing the passenger with a beeper at the departure terminal, and beeping him at the arrival terminal, when the luggage has arrived at a pick-up point.

Additionally, in accordance with a preferred embodiment of the present invention, the step of marking the luggage with a luggage code further includes coding the luggage with the passenger's mobile phone number, at the departure terminal, wherein the step of notifying further includes calling the passenger's mobile phone number, at the arrival terminal, by the system's computer.

Further in accordance with a preferred embodiment of the present invention, the method includes the steps of:

at the arrival terminal:
employing a computer monitor in communication with the computerized management system;
providing a password to the computer monitor; and
viewing on the computer monitor the location of the coded luggage and coded wagon pair.

Additionally, in accordance with a preferred embodiment of the present invention, the step of providing a password further includes utilizing an electromagnetic card, coded with the luggage code.

Further in accordance with a preferred embodiment of the present invention, the step of loading further includes automatically loading pieces of luggage of the same luggage code to a single coded wagon.

There is thus also provided, in accordance with a preferred embodiment of the present invention, a method of sorting coded luggage into wagons, by passenger, at an arrival terminal, which includes the steps of:

unloading a container of coded luggage onto trays, placing a single piece of luggage on each tray;
scanning the codes of the coded luggage;
reporting each code to a computerized management system;
receiving knowledge from the computerized management system as to whether any other pieces of luggage of the same luggage code have already been unloaded onto any of the coded wagons;

where at least one piece of luggage of a the same luggage code has already been unloaded onto a particular coded wagon, unloading the piece of luggage on the tray onto that coded wagon, and where no other pieces of luggage of a the same luggage code have been unloaded onto a particular coded wagon, unloading the piece of luggage on the tray onto an empty coded wagon.

Further in accordance with a preferred embodiment of the present invention, the step of unloading a container of coded luggage includes unloading a container of no more than 50 pieces of coded luggage.

Additionally, in accordance with a preferred embodiment of the present invention, the step of unloading includes unloading automatically.

There is thus also provided, in accordance with a preferred embodiment of the present invention, a method of utilizing a thread to reduce wagons along a section of track, formed of cells, wherein each wagon occupies a cell, the method includes the steps of:

identifying a section of track that is free from the control of another thread;

controlling the section of track from the most proximal cell which is occupied by a wagon to the most distal vacant cell; and moving wagons along the section of track by one cell towards the distal end of the track section;

re-evaluating the control over the track and the location of wagons in its cells.

BRIEF DESCRIPTION OF THE DRAWINGS

The present invention will be more clearly understood from the accompanying detailed description and drawings, in which same number designations are maintained throughout the figures for similar elements and in which:

FIGS. 3A-3F together illustrate a wagon, designed for use on a track system and on pavements and floors, in accordance with a preferred embodiment of the present invention;

FIGS. 4A-4C schematically illustrate a section of a track system, in accordance with a preferred embodiment of the present invention;

FIGS. 5A-5F together illustrate an example of a process of reducing in a track, responsible for moving wagons in a track system, in accordance with a preferred embodiment of the present invention;

FIGS. 6A-6L together illustrate an example of a process of transferring wagons from one track to another, in accordance with a preferred embodiment of the present invention;

FIGS. 10A-10C together illustrate an arrangement of a track system in a departure area, in accordance with a preferred embodiment of the invention;

FIG. 11 schematically illustrates an. arrangement of a track system in a departure area, in accordance with an alternative embodiment of the invention;

FIG. 14 is a flowchart, which schematically describes a method of overall luggage logistics in a departure terminal, in accordance with an alternate embodiment of the present invention;

FIG. 15 is a flowchart which schematically describes a method of automatically directing a wagon, containing luggage, to a loading zone of an airplane, in accordance with a preferred embodiment of the present invention;

FIGS. 16A-16C together schematically illustrate a track of a track system, for moving wagons along it, in an arrival area, in accordance with a first embodiment of the present invention;

FIGS. 17A and 17B together schematically illustrate a track section, and a system of trays, arranged for sorting pieces of luggage, by passenger, into wagons, in accordance with a second embodiment of the present invention;

FIGS. 18A-18E together schematically illustrate a tray, arranged for automatically loading wagons in loading tracks, in accordance with a third embodiment of the present invention;

FIGS. 20A-20E together schematically illustrate the procedure of loading wagons by a conveyer belt system and trays, in accordance with the third embodiment of the present invention.

FIGS. 22A-25 are diagrammatic representations of junctions characterizations as described in Appendix A-2;

FIGS. 27A-28 are flow diagram representations of wagon movements in accordance with a non-limiting preferred embodiment of the present invention.

BRIEF DESCRIPTION OF THE APPENDICES

The following appendices describe non-limiting preferred embodiments of the present invention:

Appendix A-1 describes track characterization in accordance with a non-limiting preferred embodiment of the present invention;

Appendix A-2 describes junction characterization in accordance with a non-limiting preferred embodiment of the present invention;

Appendix A-3 describes a flow diagram of the threads in an arrival area in accordance with a non-limiting preferred embodiment of the present invention.

DETAILED DESCRIPTION OF THE PREFERRED EMBODIMENT

Figure 1A:
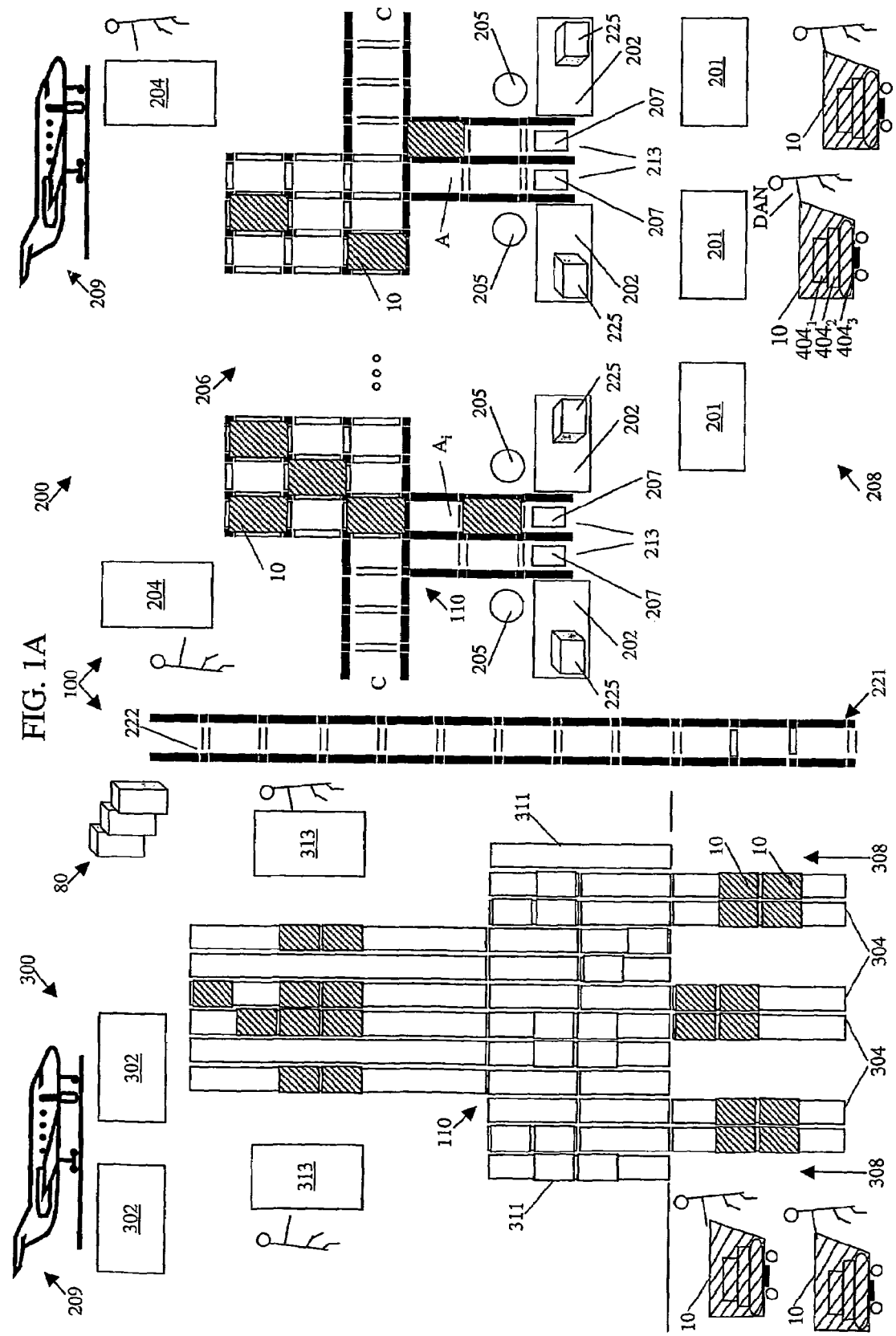
FIG. 1A schematically illustrates an airport terminal, arranged in accordance with a preferred embodiment of the present invention.

Reference is now made to FIG. 1A, which schematically illustrates an airport terminal 100, in accordance with a preferred embodiment of the present invention. Airport terminal 100 has a departure area 200, which includes at least one, and preferably a plurality of check-in counters 202, at least one, and preferably a plurality of airplane-loading zones 204, and a track system 110, arranged for the movement of wagons 10 thereon, and which connects check-in counters 202 and airplane-loading zones 204. Track system 110 includes at least one, and preferably a plurality of entry tracks $A_i$, for mounting wagons 10 containing passenger luggage onto track system 110, at least one collection track C, which collects wagons 10 from entry tracks $A_i$, and a departure-area sorting system 206, which sorts each wagon 10 and directs it from a particular check-in counter 202 to a proper airplane-loading zone 204, based on a desired destination of the luggage in each wagon 10. At check-in counters 202 there are check-in attendants 205 and computer terminals 225 which are connected to a computerized management system 80. Additionally, scales 207 are located at the most proximal cell of track system 110, next to check-in counters 202. Preferably, scales 207 are in communication with computerized management system 80. Departure area 200 further includes a departing passenger area 208, wherein a wagon pick-up station 221 and a security check area 201 are located. Wagons arrive at wagon pick-up station 221 via a wagon return track 222.

In accordance with an example of the present embodiment, departure area 200 also includes a passenger Dan, carrying 3 pieces of luggage, $404_1$, $404_2$, and $404_3$, intending to board an airplane 209. Naturally, other passengers may have fewer or more pieces of luggage.

Additionally, airport terminal 100 has an arrival area 300, which includes at least one, and preferably a plurality of airplane-unloading zones 302, and at least one, and preferably a plurality of wagon-loading zones 313. Additionally, airport terminal 100 has an arriving-passenger area 308, which includes at least one, and preferably a plurality of luggage pick-up tracks 304, and at least one, and preferably a plurality of empty-wagon transfer systems 311. Preferably, sections of track 110 connect between empty-wagon transfer systems 311, wagon-loading zones 313 and luggage pick-up tracks 304.

Further in accordance with a preferred embodiment of the present invention, airport terminal 100 includes a plurality of wagons 10, arranged for moving on track system 110. Track system 110 defines an x-y coordinate system, and wagons 10 are arranged for moving in the ±x and ±y directions. The movements of wagons 10 on track system 110 are controlled by computerized system 80, described further hereinbelow, in conjunction with FIG. 2. Each of plurality of wagons 10 includes a controller 30, which preferably includes a computerized embedded communication system, for communicating with computerized management system 80.

Additionally, in accordance with a preferred embodiment of the present invention, wagons 10 are arranged for moving also on pavements and floors, for example, in passenger areas 208 and 308.

Airport terminal 100 is described by way of example; a similar layout may be used for train terminals, warehouses, and other locations that handle the sorting and routing of parcels from at least one point-of-origin, check-in station, or a plurality of point-of-origin check-in stations to various destinations or various pick-up locations.

Figure 1B:
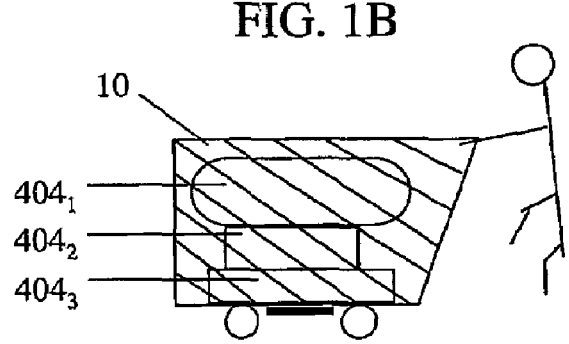
FIGS. 1B-1D schematically illustrate two methods of placing luggage in a wagon, in accordance with different embodiments of the present invention.
Figure 1C:
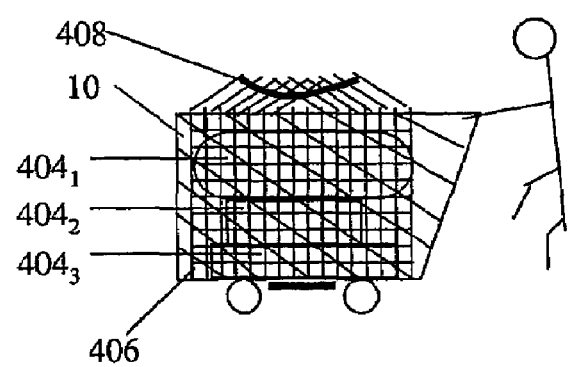
Figure 1D:
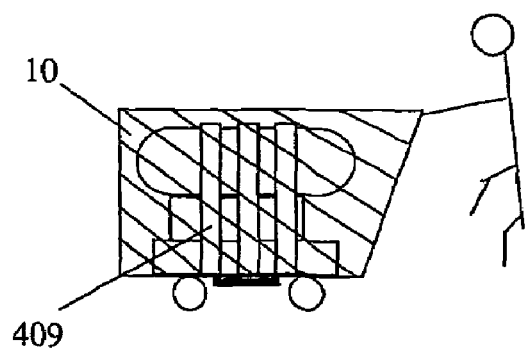

Reference is now made to FIGS. 1B, 1C, and 1D, which schematically illustrate two methods of placing luggage $404_1$, $404_2$, and $404_3$ in wagon 10, in accordance with different embodiments of the present invention. FIG. 1B illustrates a method of simply placing luggage $404_1$, $404_2$, and $404_3$ in wagon 10. FIG. 1C illustrates a method of placing a sac 406 in wagon 10, placing luggage $404_1$, $404_2$, and $404_3$ in the sac 406, and closing sac 406 tightly, by a tie-string 408, so that luggage $404_1$, $404_2$, and $404_3$ may not move about in sac 406. Alternatively, snaps, or other closing means may be used in place of tie-string 408. The advantage of sac 406 is that it converts three pieces of luggage $404_1$, $404_2$, and $404_3$ to one piece of luggage, making it easier to locate the luggage and preventing the possibility that small pieces of luggage will be lost or forgotten. Sacs 406 may be re-usable or disposable, and may be formed, for example, of a nylon mesh. Preferably they are provided with wagons 10 at wagon pick-up station 221.

FIG. 1D illustrates a method of placing luggage $404_1$, $404_2$, and $404_3$ in wagon 10 and strapping them tightly together with at least one, and preferably several straps 409. Straps 409, like sac 406 convert three pieces of luggage $404_1$, $404_2$, and $404_3$ to one piece of luggage. Straps 409 may be re-usable or disposable. Preferably they are provided with wagons 10 at wagon pick-up station 221.

Figure 2:
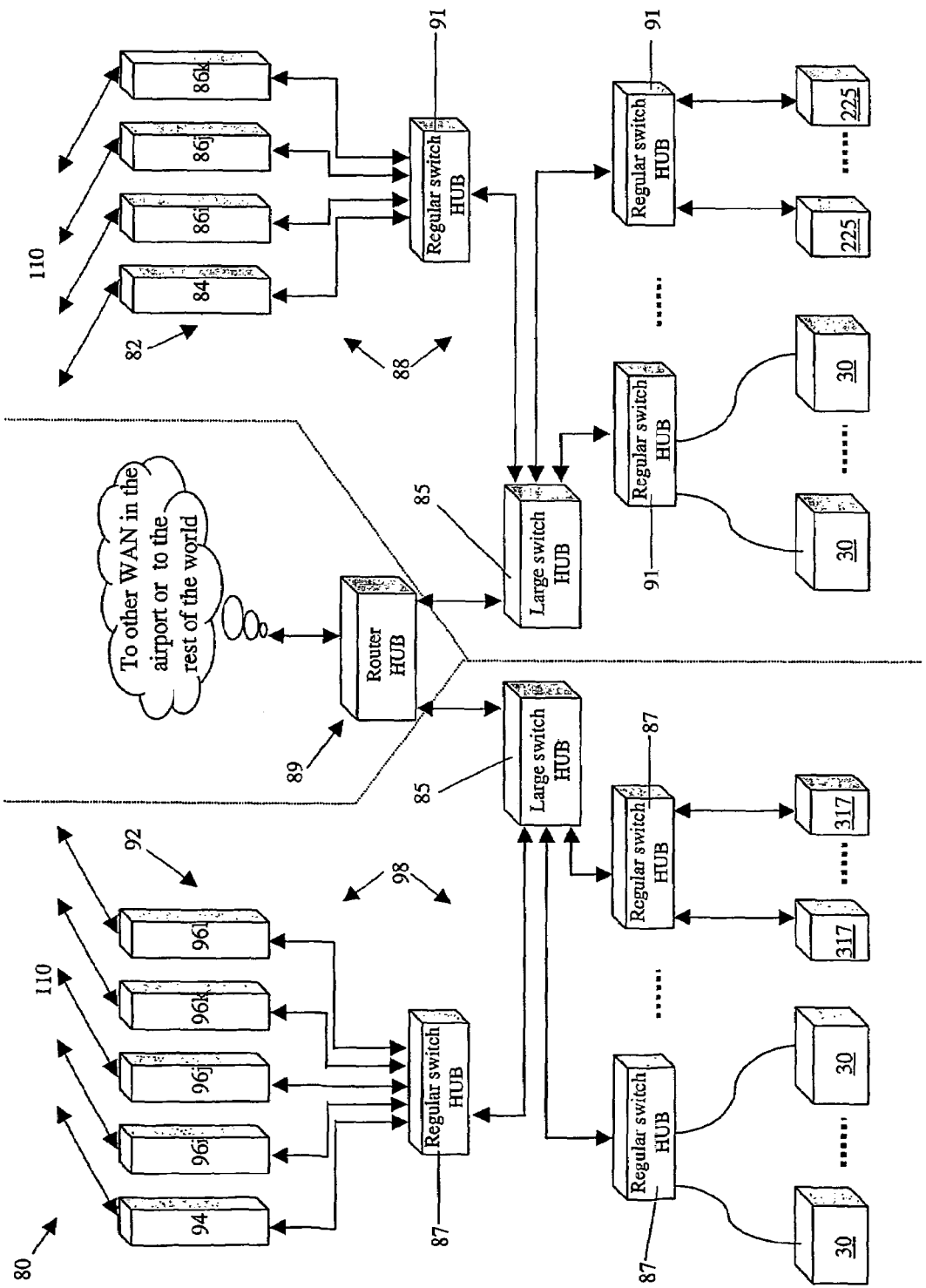
FIG. 2 schematically illustrates a computerized management system, in accordance with a preferred embodiment of the present invention.

Reference is now made to FIG. 2, which schematically illustrates computerized management system (CMS) 80, in accordance with a preferred embodiment of the present invention. Preferably, CMS 80 includes a point-of-origin computer system 82, for example, an airport-terminal-departure-area computer management system 82, or $CMS_{departure}$ 82, a destination computer management system 92, for example, an airport-terminal-arrival-area computer system 92, or $CMS_{arrival}$ 92. Both point-of-origin computer system 82 and destination computer system 92 may each include at least one main server, for providing central control over all activities. Additionally, both point-of-origin computer system 82 and destination computer system 92 may each include at least one and preferably several sub servers, for performing specific tasks. Preferably, the sub servers report to the main server through a Local Area Network (LAN), through a regular switch hub, or through another communication protocol. For example, $CMS_{departure}$ 82 may include a main server 84 and sub servers $86_i$, $86_j$, and $86_k$, which report to main server 84 through a LAN 88 and a regular switch hub 91. $CMS_{arrival}$ 92 may include a main server 94 and sub servers $96_i$, $96_j$, $96_k$, $96_l$, which report to main server 94, through a LAN 98 and a regular switch hub 87.

Preferably, $CMS_{departure}$ 82 and $CMS_{arrival}$ 92 communicate with each other through a router hub 89.

Preferably, sensors and drives of tracks 110 (FIG. 1A) are directly connected to $CMS_{departure}$ 82 and $CMS_{arrival}$ 92.

Terminals 225 (FIG. 1A) communicate with $CMS_{departure}$ 82 through regular switch hubs 91 or 87.

Preferably, controllers 30 of wagons 10 include computerized embedded communication systems for communicating with either CMS$_{departure}$ 82 or CMS$_{arrival}$ 92 through regular switch hubs 91 or 87, in a wireless manner.

Preferably, a large switch hub 85 is used to concentrate the plurality of regular switch hubs 91 of CMS$_{departure}$ 82 or 87 of CMS$_{arrival}$ 92, or other large switch hubs (not shown) and permits communication with other LANs through router hub 89.

Additionally, both CMS$_{departure}$ 82 and CMS$_{arrival}$ 92 communicate with other airports, receiving information about incoming passengers and luggage, and sending similar information, through router hub 89.

Preferably, CMS 80 includes a map of track system 110 and preferably also a map of wagons 10 on track system 110. These maps may also be included in specific sub servers and even in controllers 30 of wagons 10.

However, CMS 80 is generally tailor-fitted to particular point-of-origin and destination stations. The organization of CMS 80 depends on factors such as the size of the stations, the rates of routing and sorting of parcels and other factors. For example, in a case of an airport, the architecture of CMS 80 will depend on the number of incoming and outgoing flights, the number of airlines that fly to and from it, and the number of passengers and parcels that travel through it. In addition, the organization of CMS 80 depends also on the internal architecture of the main and the sub servers. For example, in place of several sub servers, a single sub server which includes several processors, preferably connected in parallel, may be used. In alternative embodiments of the invention, a single main server may be used for both the point-of-origin station and the destination station, wherein each station has its own group of sub servers. Alternatively, CMS 80 may include a single server, or a single point-of-origin server and a single destination server.

Reference is now made to FIGS. 3A-3E, which together illustrate wagon 10, designed for use on track system 110 and on pavements and floors such as in passenger areas 208 and 308, in accordance with a preferred embodiment of the present invention. Preferably, wagon 10 is designed for use in an airport terminal. Alternatively, wagon 10 may be designed for use in train terminals, warehouses, and other locations that handle the sorting and routing of parcels from at least one point-of-origin, check-in station, or a plurality of point-of-origin check-in stations to various destinations or various pick-up locations.

FIG. 3A schematically illustrates wagon 10, having a double-bottom 12. Preferably, double bottom 12 includes a lower plate 14 and an upper plate 16, wherein upper plate 16 is the floor of wagon 10. Preferably, four wheel axles 18 (of which only two are shown in FIG. 3A) are bolted or otherwise fixed onto both lower plate 14 and upper plate 16. Preferably, four lateral wheels 20 (of which only two are shown in FIG. 3A) are mounted on axles 18, for use on track system 110. Lateral wheels 20 are operable to rotate laterally, against a track wall, as will be described hereinbelow, in conjunction with FIGS. 3C and 3D.

Additionally, in accordance with a preferred embodiment of the present invention, wagon 10 includes a motor 28, for powering lateral wheels 20 when wagon 10 is in track system 110, and controller 30, for controlling motor 28, so as to start and stop lateral wheels 20. Motor 28 may be a step motor, and controller 30 may command motor 28 to perform a certain number of motor steps, in order to move wagon 10 a motion step in an x and a y direction, as will be described hereinbelow, in conjunction with FIGS. 5A-5F. Preferably, controller 30 includes a computerized embedded communication system, for communicating with CMS 80 (FIG. 2). Further in accordance with a preferred embodiment of the present invention, wagon 10 includes a battery 32, preferably rechargeable via a charging rod 34, which protrudes down from lower plate 14. Charging rod 34 may be arranged to selectably protrude from lower plate 14, upon a command from controller 30 or in response to a manual key, and may be charged by a power tunnel, as will be described hereinbelow, in conjunction with FIGS. 3C and 3D. Alternatively, wagon 10 may be placed in special recharging stations at regular intervals, for charging battery 32.

Additionally, in accordance with a preferred embodiment of the present invention, wagon 10 includes four ball bearings 22 (of which only two are shown in FIG. 3A), mounted on four axles 24, located at the four corners of lower plate 14, on its lower side. Ball bearings 22 are arranged for rotation in any direction and are operable to provide motion on a pavement 25, for example, in passenger areas 208 and 308. When wagon 10 is standing on ball bearings 22, upper plate 16 is at a height $h_1$ above pavement 25.

A break mechanism 26 is in communication with at least one of ball bearings 22. Break mechanism 26 may be operated by a foot paddle, a handle bar, a key, or another known way, for stopping wagon 10, when on pavements and floors. In an alternate embodiment of the present invention, break mechanism 26 is in communication with controller 30, and may be operable by a voice command.

Figure 3B:
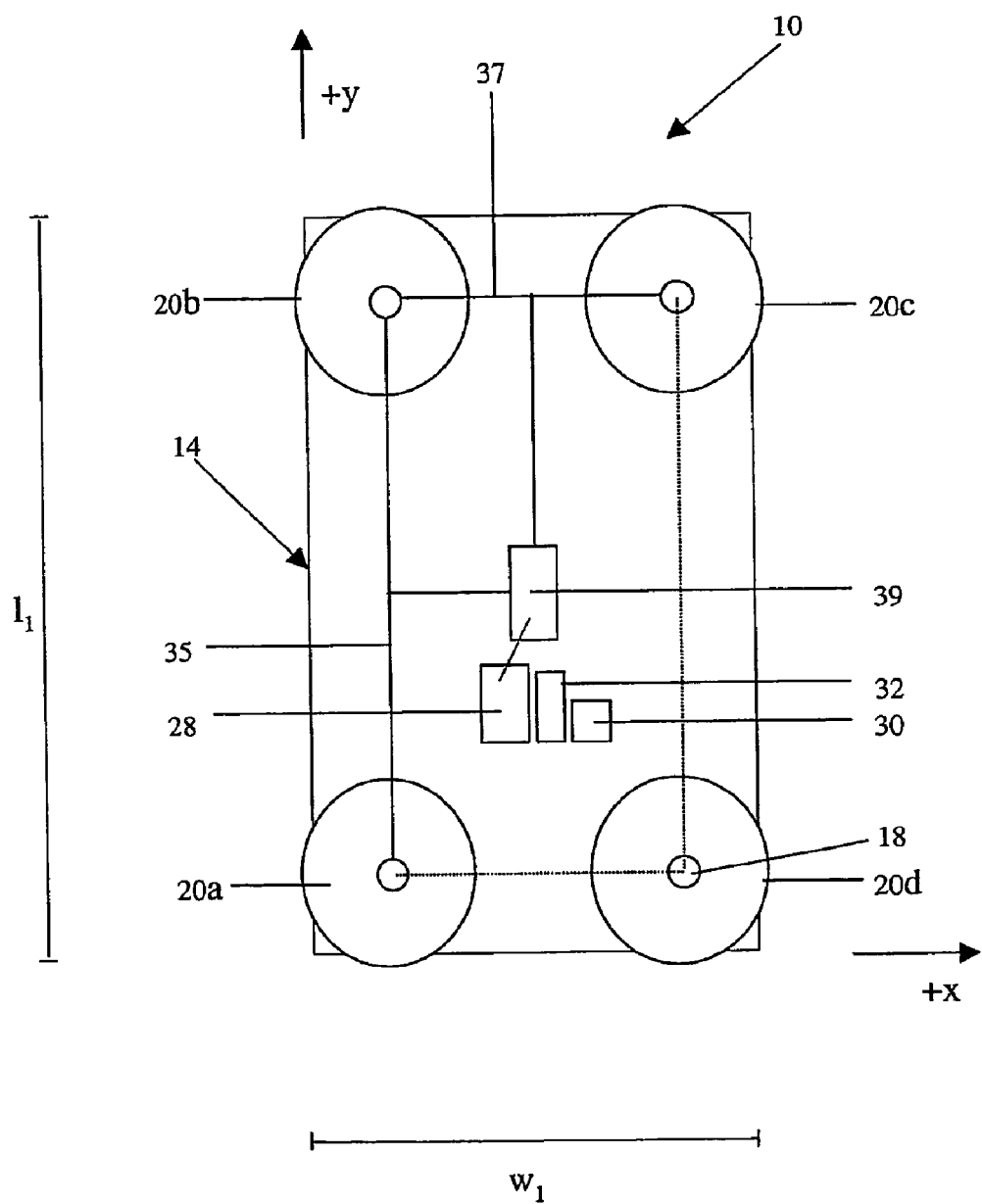

FIG. 3B schematically illustrates a cross-sectional view A-A through FIG. 3A, on the x-y coordinate system. Plate 14 has a width $w_1$, and a length $l_1$, although in an alternate embodiment, plate 14 may be squared. Four lateral wheels 20, designated as 20a, 20b, 20c, and 20d, protrude from plate 14 both in the x and y directions. In accordance with a preferred embodiment of the present invention, a first pair of adjacent lateral wheels 20, for example, lateral wheels 20a and 20b, are connected by an axle 35. Additionally, a second pair of adjacent lateral wheels 20 that share a common wheel 20 with the first pair, for example, lateral wheels 20b and 20c, are connected by an axle 37. Further in accordance with a preferred embodiment of the present invention, motor 28 selectably powers either axle 35 or axle 37, through a clutch 39. When motor 28 powers axle 35, wagon 10 moves in the ±x direction, and when motor 28 powers axle 37, wagon 10 moves in the ±y direction. Alternatively, motor 28 powers all four wheels 20 and no clutch mechanism is used.

Figure 3C:
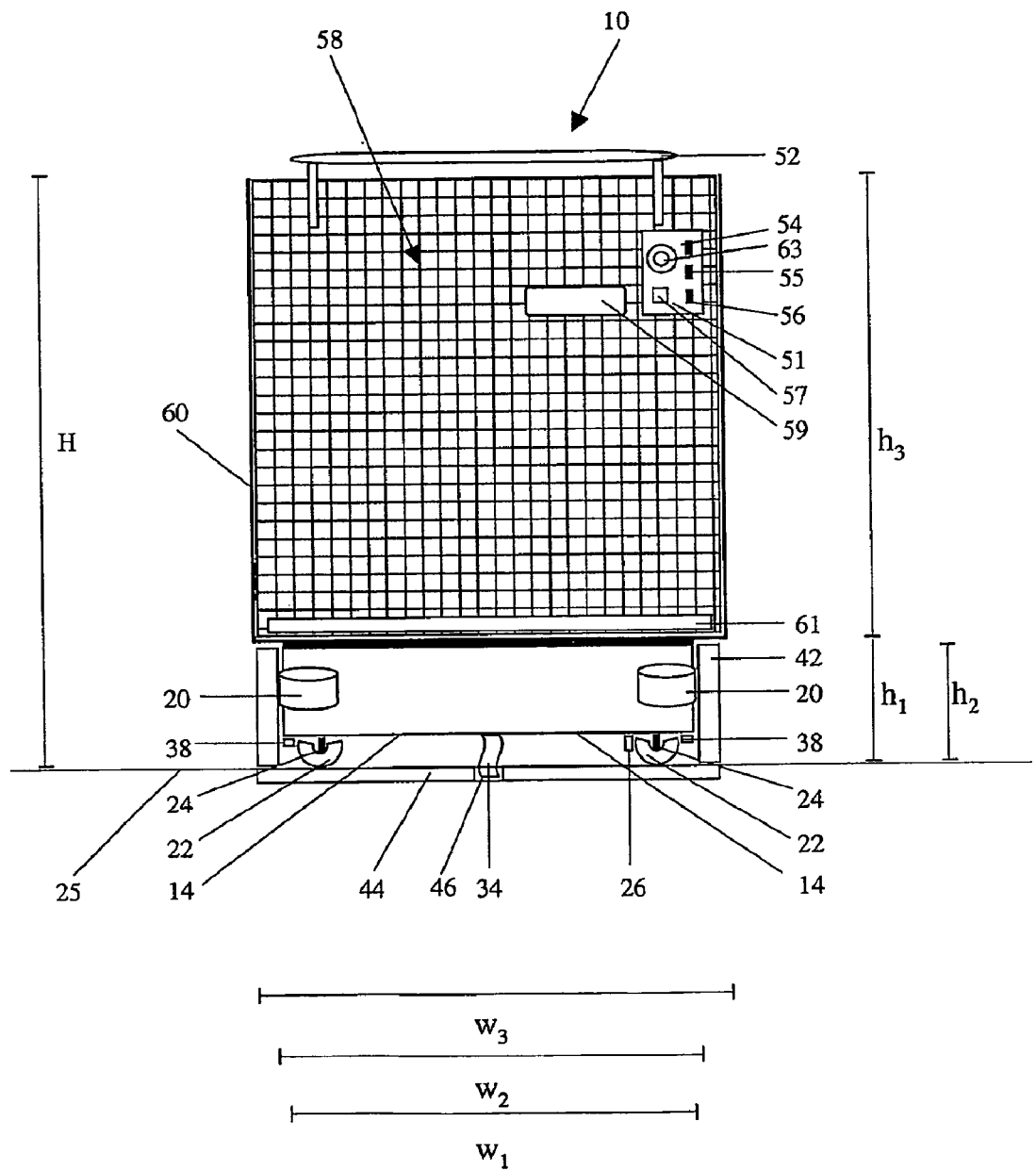
Figure 3D:
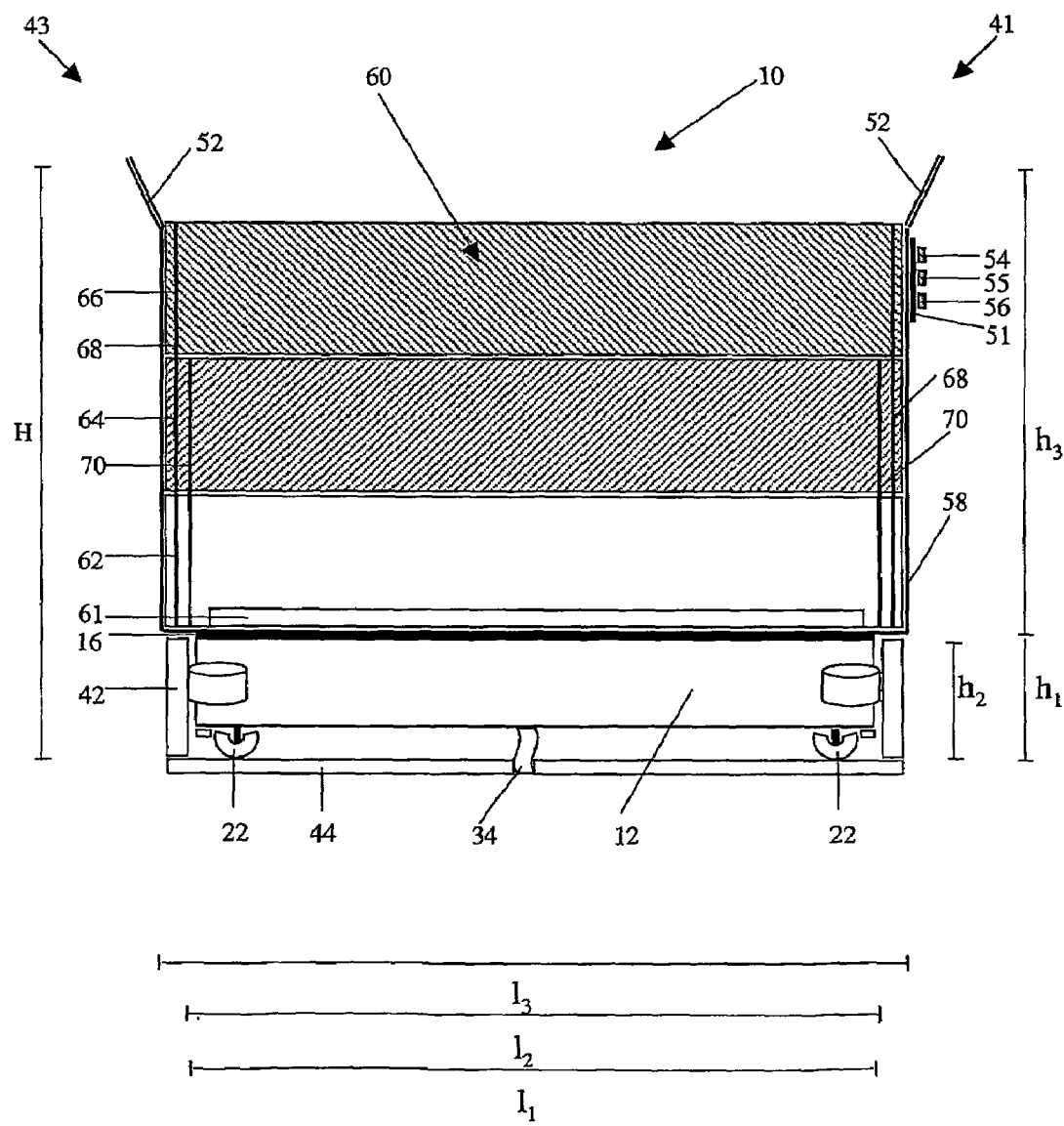

FIGS. 3C and 3D schematically illustrate widthwise and lengthwise views of wagon 10 in a track system 110. Track system 110 has a track floor 44, of a width $w_2$ and a length $l_2$ and track walls 42 of a height $h_2$. Track floor 44 substantially accommodates bottom 12 of wagon 10, with lateral wheels 20 pressing against track walls 42, for proper rolling friction. Preferably, as lateral wheels 20 roll against track walls 42, ball bearings 22 roll against track floor 44.

In accordance with a preferred embodiment of the present invention, height $h_2$ of track walls 42 is less than height $h_1$ of upper plate 16. For example, track walls 42 may be 18 centimeters high, while upper plate 16 may be 20 centimeters above track floor 44. Additionally, in accordance with a preferred embodiment of the present invention, upper plate 16 has width and length $w_3$ and $l_3$, which are greater than width $w_2$ and length $l_2$ of track floor 44. Thus, when wagon 10 is in track system 110, upper plate 16 extends over track walls 42. In accordance with an alternate embodiment of the present invention, upper plate 16 and lower plate 14 are substantially of the same dimensions, and upper plate 16 does not extend over track walls 42.

In accordance with a preferred embodiment of the present invention, charging rod 34 is arranged to fit into a power tunnel 46 and charge battery 32. (FIG. 3A) Preferably, charging rod 34 is selectably deployed when wagon 10 is inserted into track system 110, and selectably retracted when wagon 10 is on pavement 25.

FIGS. 3C and 3D further illustrate a widthwise side wall 58 and a lengthwise side wall 60 of wagon 10. Wagon 10 has a side 41 and a side 43, wherein generally, a passenger will push wagon 10 from side 41. Preferably, a handlebar 52 is provided on side wall 58, preferably of side 41. Alternatively, handlebars 52 are provided on two widthwise sides walls 58. In accordance with an alternate embodiment of the present invention, wagon 10 has a square shape, and handlebars 52 may be provided on one or more of its sides. When a person pushes handlebar 52 in a desired direction, ball bearings 22 roll in that direction.

Further in accordance with a preferred embodiment of the present invention, wagon 10 includes a control panel 51, located for example, on one of side walls 58, under handlebar 52, or at another easily accessible location. Preferably, control panel 51 includes a switch 54, for manually mounting wagon 10 onto track system 110. Switch 54 may start motor 28, to assist in the mounting of wagon 10 in track system 110, since lateral wheels 20 are pressed against track walls 42 with some force. Additionally, switch 54 may deploy charging rod 34. Furthermore, control panel 51 may include a switch 55, for manually removing wagon 10 from track system 110, stopping motor 28, and retracting charging rod 34. Alternatively, switches 54 and 55 may be incorporated in a single on/off switch. Additionally, control panel 51 may include an on/off switch 56, for manually activating or deactivating break mechanism 26, when desired.

In accordance with a preferred embodiment of the present invention, controller 30 may issues a warning signal when battery 32 is low, or does not recharge, or when wagon 10 malfunctions for other reasons, for example, due to a problem with motor 28 or clutch 39 (FIG. 3B). The warning signal may be a message, transmitted to the CMS 80, and may further describe the nature of the malfunction. Alternatively or additionally, the warning signal may be a red light 57, preferably with a printed message, such as "OUT OF ORDER." Red light 57 is preferably located on control panel 51.

Control panel 51 may further include a display panel 59, through which controller 30 may communicate with a person handling the wagon (not shown). Display panel 59 may further be a touch panel, for interactive communication between wagon 10 and the person handling it. In accordance with a preferred embodiment of the present invention, display panel 59 may provide a short video or written instructions on how to use wagon 10. Additionally or alternatively, wagon 10 may provide audio instruction, through a speaker 63. Preferably, wagon 10 may provide instructions in several languages, and may interact with a user in the language of his choice. Alternatively, written instructions are provided on at least one side wall of wagon 10, preferably in several languages. Additionally or alternatively, video displays, demonstrating the operation of wagon 10 are provided at various points of terminal 100.

In accordance with a preferred embodiment of the present invention, side walls 58 and 60 are formed of a metal mesh, for example, a steel mesh, to provide a strong structure and to allow the person handling the wagon to see its contents. Preferably, widthwise side walls 58 are fixed; however, lengthwise side walls 60 include fixed sections 62 and moving sections 64 and 66. Preferably, each of moving sections 64 and 66 may slide down, for example, along rails 68 and 70. Moving sections 64 and 66 are provided to facilitate arranging suitcases inside wagon 10 without having to heave the suitcases over the fall height of wagon 10. Additionally, moving sections 64 and 66 are provided to allow for automatic loading of wagon 10 by conveyer trays at the arrival area, as will be described hereinbelow, in conjunction with FIG. 12. In accordance with an alternate embodiment of the present invention, only one moving section, or more than two moving sections may be provided. Alternatively, one or more moving sections may be held by hinges and open outward. Alternatively, all side walls of wagon 10 may be fixed, or all side walls may include moving sections.

In accordance with a preferred embodiment of the present invention, wagon 10 includes four slits 61 on all side walls. (Only one slit 61 is shown in each of FIGS. 3C and 3D). Preferably, slits 61 are arranged exactly opposite each other on parallel side walls 58 and on parallel side walls 60, so that light which is shined through slit 61 of one side wall will be emitted from slit 61 of the opposite side wall. Preferably, four slits 61 are arranged very close to upper plate 16, which is the floor of wagon 10. Slits 61 are operative with a light gate 250 described hereinbelow, in conjunction with FIG. 12, to verify that no baggage was inadvertently left on wagon 10.

In accordance with the preferred embodiment of the present invention, a height H of wagon 10 is about 80 centimeters, the length $l_3$ is 110 centimeters, and the width $W_3$ is 70 centimeters. Preferably, the length $l_1$ and width $w_1$ of lower plate 14 are 100 and 60 centimeters. Preferably, upper plate 16 is about 20 centimeters above pavement 25 or track floor 44, wherein, preferably, the height of ball-bearings 22 is about 5 centimeters. Preferably, each of fixed section 62, and moving sections 64 and 66 are 20 centimeters high. In accordance with alternate embodiments of the present invention, other dimensions may be used.

FIG. 3E schematically illustrates a bottom view of wagon 10, showing the bottom surface of lower plate 14, edges of the bottom of upper plate 16, four lateral wheels 20, four ball bearings 22, and charging rod 34. In accordance with a preferred embodiment of the present invention, wagon 10 includes at least one and preferably four codes 13, unique to a particular wagon 10, preferably located on at least one and preferably four corners of the bottom surface of upper plate 16, or on the bottom surface of lower plate 14, and arranged to be read by a track sensor 120, as will be described hereinbelow, in conjunction with FIG. 4A. Additionally, wagon 10 may include at least one coded length ruler 21 and at least one coded width ruler 19, located, for example, along edges of the bottom surface of upper plate 16, or on the bottom surface of lower plate 14, and arranged to be read by track sensor 120. The purpose of codes 13 is to identify the wagon, as it passes over a track sensor. The purpose of coded rulers 19 and 21 is to identify the section of length or width of wagon 10 that has passed over the track sensor.

Further in accordance with a preferred embodiment of the present invention, wagon 10 may include four approach sensors 38, located on the four edges of double bottom 12, for indicating that wagon 10 is approaching another wagon or a track wall, when wagon 10 is on in track system 110. Sensors 38 are in communication with controller 30, which may slow or stop motor 28 when an approach is indicated, to prevent collisions. Alternatively, approach sensors 38 are not used; rather track sensors 120, described hereinbelow, in conjunction with FIG. 4A, are used to ward off collisions.

Figure 3F:
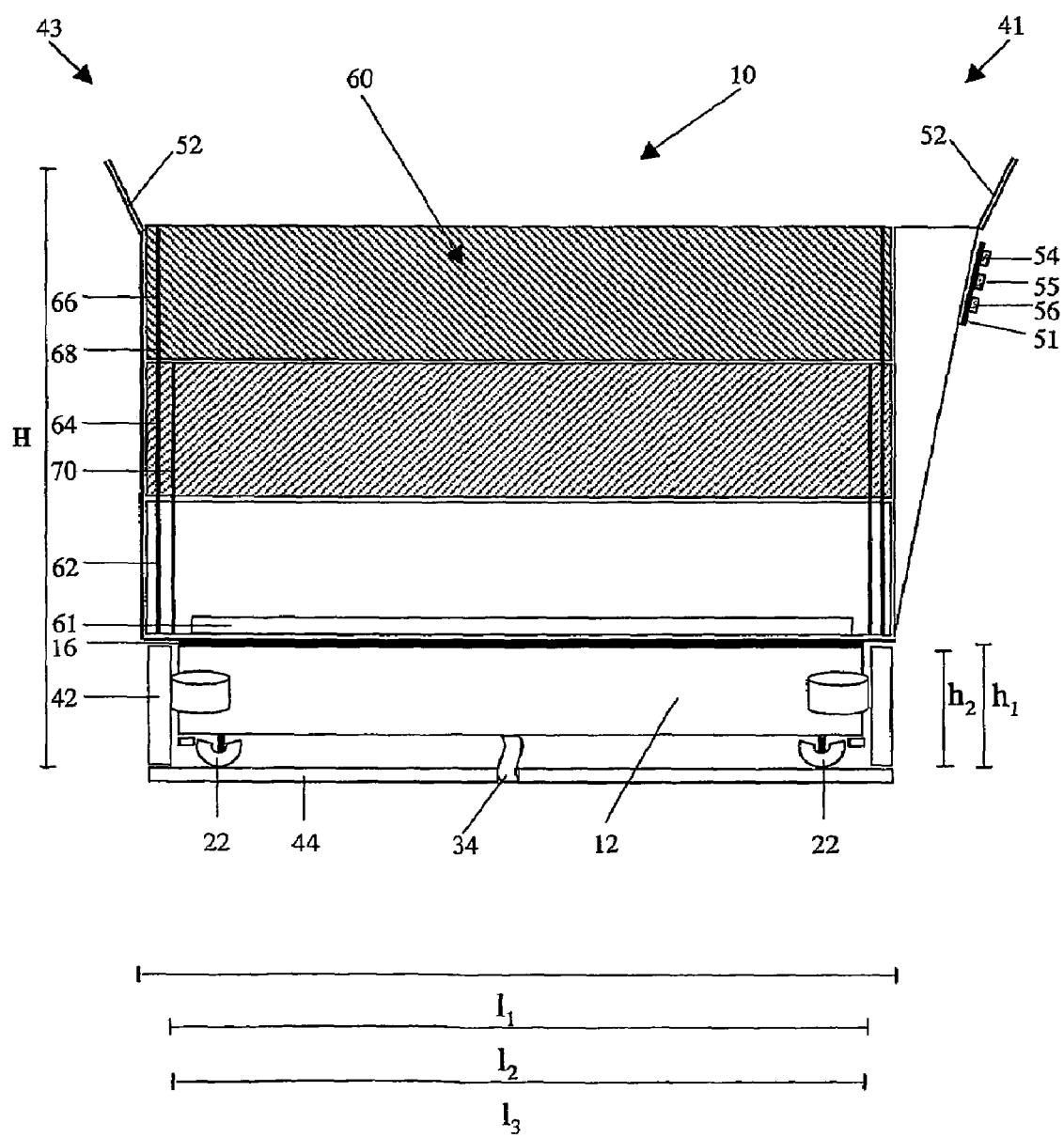

Reference is now made to FIG. 3F, which schematically illustrates wagon 10, in accordance with an alternate embodiment of the present invention, wherein side 41, from which generally a passenger pushes wagon 10 is slanted at an angle.

In an alternate embodiment, wagon 10 may be designed for use only on a track system 110, or a similar track system, and may not have ball bearings 22, or at least one handle bar 52.

Figure 4B:
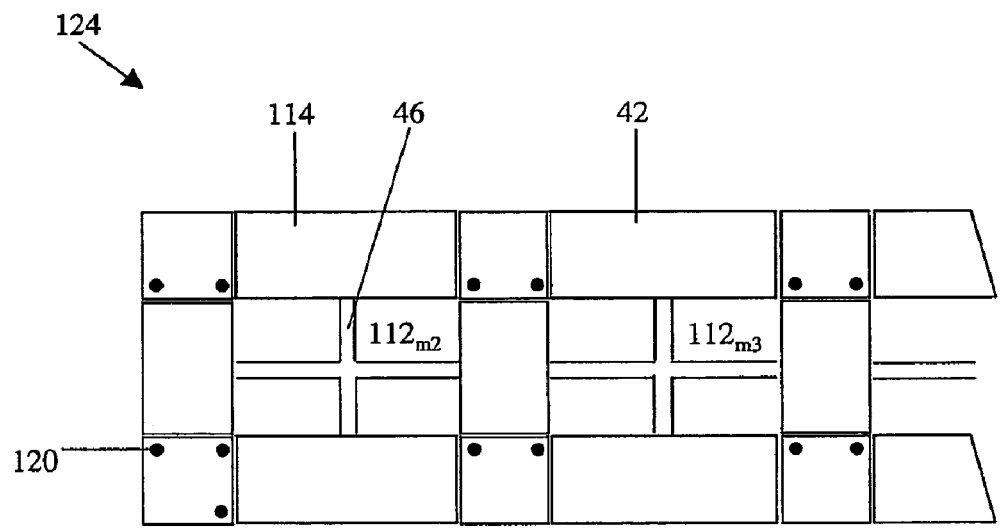
Figure 4C:
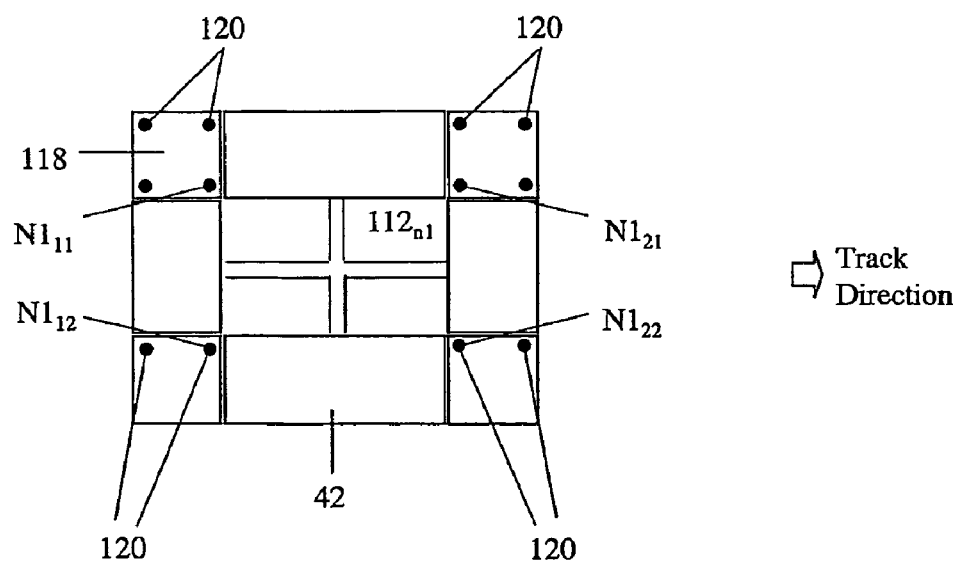

Reference is now made to FIGS. 4A-4C, which schematically illustrate a section 122 of track system 110, in accordance with a preferred embodiment of the present invention. Preferably, track walls 42 (see also FIGS. 3C and 3D) include external-wall sections 114 and dividing-wall sections 116. Additionally, track walls 42 may include columns 118, although in some embodiments of the present invention, columns 118 are not used. Track system 110 further includes track floor 44, which is preferably at the same elevation as pavement 25 of passenger areas 208 and 308.

Section 122 of track system 110 has three lanes, M, N and O. However, a single-lane track section or a multi-lane track section of a different number of lanes are similarly possible.

Figure 10A:
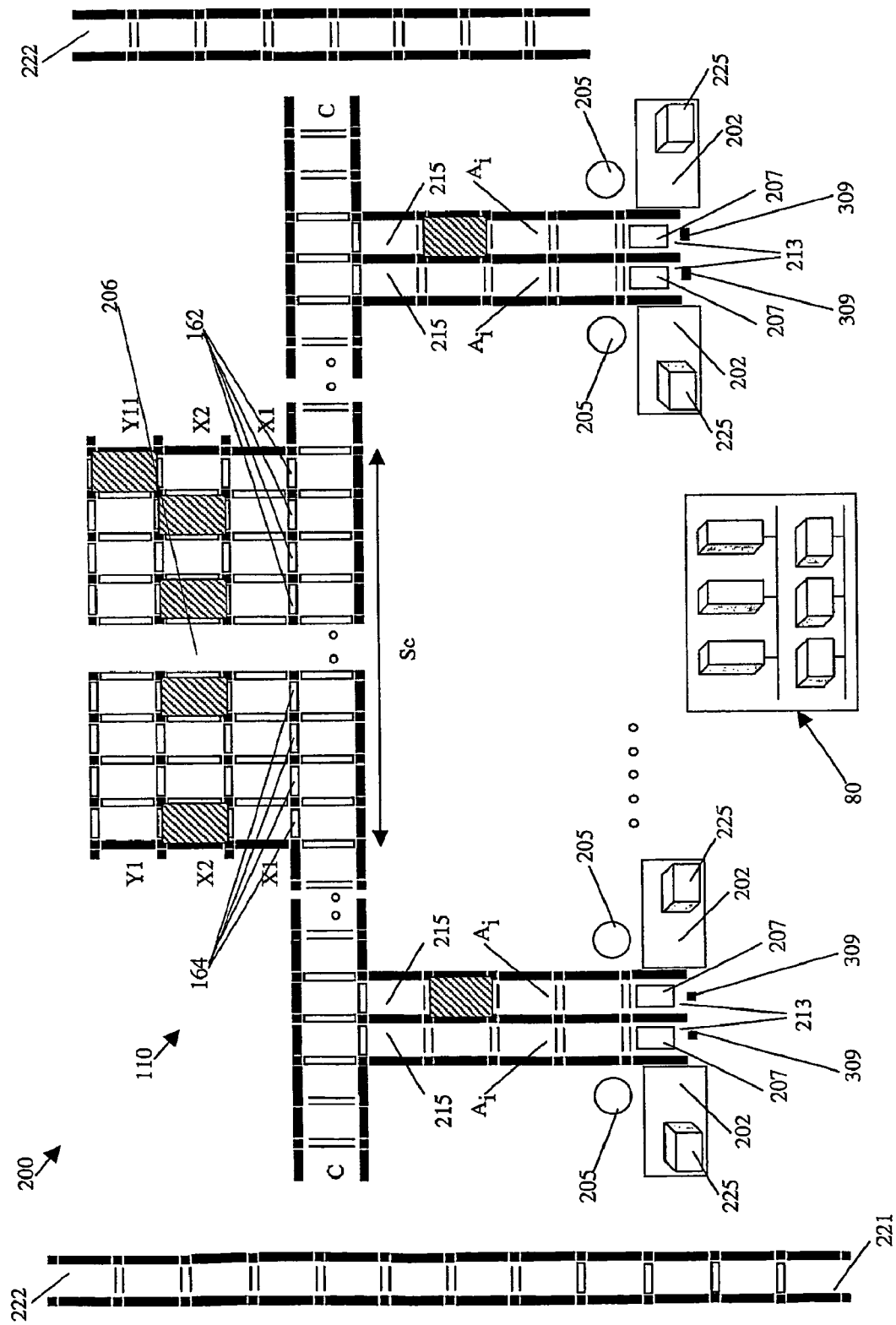

In accordance with the present invention, track system 110 is divided into cells 112, which are portions of track system 110, generally of a same size as lower plate 14 of wagon 10. Cells 112 are enclosed by at least two wall sections 114 or 116. Dividing-wall sections 116 can be lowered so as to be flush with internal floor 44 (see also FIGS. 3C and 3D), independently for each cell, to allow wagon 10 to pass over them, as it moves from one cell to another. Preferably, each dividing-wall section 116 may be raised and lowered, by a drive (not shown), located under each dividing wall section 116 or 114 responsive to commands from CMS 80 (FIG. 2), in a wired manner. Alternatively, each dividing-wall section 116 may be raised and lowered, by the drive, responsive to commands from controller 30 (FIG. 3A) via wireless communication. In a preferred embodiment of the present invention, dividing-wall sections 116 along a specific track lane may be raised and lowered as a group. Additionally, a group of adjacent dividing wall sections 116 may share a common drive and may be raised and lowered together. For example, a group 142 of adjacent dividing wall sections 116 described hereinbelow, in conjunction with FIG. 5A, or groups 162 and 164 of adjacent dividing wall sections 116 described hereinbelow, in conjunction with FIG. 10A are each raised and lowered as a group.

FIG. 4A further illustrates the x-y coordinate system and wagon 10 in track system 110. To understand how wagon 10 moves within track system 110, cells 112 are designated as cell $112_{m1}$, $112_{m2}$, $112_{m3}$, $112_{n1}$, $112_{n2}$, $112_{n3}$, $112_{o1}$, $112_{o2}$, and $112_{o3}$, wherein one wagon 10 is located in cell $112_{n2}$, and another in cell $112_{o3}$. Within the three-lane track section of track system 110, wagon 10 in cell $112_{n2}$ may move in the +x direction, to $112_{n3}$, or in the -x direction, to cell $112_{n1}$, in the +y direction, to $112_{m2}$ or in the -y direction, to cell $112_{o2}$. The change in lanes, for example, from lane N to lane M may be required, for example, when the lanes branch out in different directions.

Additionally, external-wall sections 114 may be lowered, by a drive (not shown), so as to be flush with pavement 25 and track floor 44, independently for each cell 112. For example, an external-wall section $114_{o3}$ can be lowered, to allow a wagon $10_{o3}$ to roll out of cell $112_{o3}$. Preferably, external-wall section $114_{o3}$ is lowered and raised, responsive to a command from key 55 (FIG. 3C) of wagon $10_{o3}$. Alternatively, external-wall section $114_{o3}$ is lowered and raised, responsive to a code entered to control panel 51 (FIG. 3C) of wagon $10_{o3}$. The code may be a number or a password, or an electromagnetic code on a card, a smartcard, or a similar device. Preferably, the code identifies the person that enters it as the person associated with any luggage on the particular wagon $10_{o3}$. Preferably, only a person associated with the luggage may remove wagon $10_{o3}$ from track system 110. Preferably, pavement 25 and track floor 44 are at a same level. Thus, when external-wall section $114_{o3}$ is lowered, wagon $10_{o3}$ may be rolled out of track system 110 on ball bearings 22. Alternatively, only some of external-wall sections 114 may be lowered, at specific track sections, for example, at pick-up area 304. Alternatively, all external-wall sections 114 are fixed, and wagon 10 may be removed from track system 110 only in specific locations, for example at airplane loading zones 204.

FIGS. 4A and 4B further illustrate power tunnels 46, arranged to provide power to charging rod 34 (FIGS. 3A, 3C, 3D and 3E) of wagon 10. In an alternate embodiment of the invention, wagon 10 may receive power from another source along track system 110.

As has been noted in conjunction with FIGS. 3C and 3D, in a preferred embodiment of the present invention, upper plate 16 of wagon 10 partially extends over walls 114 and 116 and columns 118, in each direction, as shown in cell $112_{n2}$, where one wagon 10 is located. Thus, preferably, the heights of walls 114 and 116, and of columns 118 are somewhat less than the height of upper plate 16. However, this feature is primarily aesthetic and is not a requirement of the present invention.

FIGS. 4A and 4B further illustrate at least one track sensor 120 associated with each cell 112, arranged for reading code 13 (FIG. 3E), which serves as identification code for wagon 10. Preferably, at least one track sensor 120 is further arranged for reading coded rulers 19 and 21 (FIG. 3E).

In accordance with a preferred embodiment of the present invention, wherein code 13 and coded rulers 19 and 21 of wagon 10 are located on the lower side of upper plate 16, as seen in FIG. 3E, track sensors 120 are located on columns 118, arranged for reading them. Alternatively, code 13 and preferably also coded rulers 19 and 21 are located on the lower side of lower plate 14, for example, near the edges of lower plate 14, and track sensors 120 are located on track floor 44, arranged for reading them. Alternatively, track sensors 120 and wagon codes 13 and preferably also 19 and 21 are arranged in another complementary way.

As seen in FIG. 4C, the track cells have sensors associated with them, for reading code 13 (FIG. 3E) and rulers 19 and 21 (FIG. 3E) of wagon 10. Preferably, sensors 120 are located on columns 118. Preferably, the four sensors 120 associated with cell $112_{n1}$ are designated $N1_{11}$, $N1_{12}$, $N1_{21}$, and $N1_{22}$. Each sensor 120 senses wagon 10 as it approaches the cell associated with it or leaves the cell associated with it. At any moment, each wagon 10 in track system 110 is sensed by at least one sensor. There may be situations in which fewer than four sensors 120 may be required, for example, for cells at an edge of the track, having a side from which wagons 10 do not approach or leave.

In a preferred embodiment of the invention, track sensor 120 may be a scanner, operative to read bar codes, and code 13 and coded rulers 19 and 21 may be bar codes. Alternatively, at least one track sensor 120 may be an electromagnetic sensor, and code 13 and coded rulers 19 and 21 may be electromagnetic codes. Alternatively, other known coding systems and sensors for reading them may be used.

FIG. 4B schematically illustrates a single-lane section 124 of track system 110, in accordance with a preferred embodiment of the present invention. Single-lane section 124 has no dividing-wall sections 116, since motion of wagons 10 proceeds along one axis. Dividing-wall sections 116 are needed only when wagon motion along two axes, ±y and ±x, is desired.

Reference is now made to FIGS. 5A-5F, which together illustrate an example of a process of reducing in a track, for moving wagons 10 in track system 110, in accordance with a preferred embodiment of the present invention. FIGS. 5A-5F illustrate a group of adjacent track cells 112 that form a track X of at least two cells. Track X may be, for example, any of lanes M, N, or O of three-lane track section 122 (FIG. 4A). Alternatively, track X may be a lane across three-lane track section 122, for example, a lane formed by cells $112_{m1}$, $112_{n1}$, and $112_{o1}$, (FIG. 4A). Alternatively, track X may be single-lane track section 124 (FIG. 4B), or any other group of adjacent track cells, arranged in a single file. Wagons 10 may enter track X, exit track X, and in particular, wagons 10 may move along track X.

In accordance with a preferred embodiment of the present invention, the movement of wagons 10 along track X is controlled by a thread, a part of a computer program, for example, a series of time-dependent transactional operations, that can execute independently of other parts of the computer program. The use of threads allows multithreading, sharing a single CPU amongst multiple threads in a way that minimizes the time required to switch threads. Threads share as much as possible of the program execution environment so that very little state needs to be saved and restored when switching amongst threads. In essence, multithreading allows very fine-grain multitasking, at the level of a few instructions.

In accordance with a preferred embodiment of the present invention, the series of time-dependent transactional operations that controls the movements of wagons 10 within track system 110 relate to receiving data from track sensors 120 and identifying the location of each wagon 10, commanding controller 30 of wagon 10 to start or stop motor 28 and commanding the drives of cells 112 to lower or raise dividing-wall sections 116, or external wall sections 114 individually, for each wagon 10 and each cell 112.

Preferably, CMS 80 runs a plurality of threads in parallel, wherein each thread, or group of threads, is controlled by a specific server, which may be a main server, or preferably a sub server. Preferably, threads remain "live" throughout the operation of CMS 80, unless specifically removed from the system. However, not all threads are running continuously; rather, a thread may be in one of the following states:

running, that is, executing its series of time-dependent transactional operations;

dormant, that is in a suspended state; and waiting, that is, waiting for a specific condition to occur in order to complete the execution of its series of time-dependent transactional operations.

A running thread will go into a dormant state either when it completes the execution of its series of time-dependent transactional operations, or upon receiving a command "suspend" from another thread.

A dormant thread will resume operation upon receiving a command "resume" from another thread.

A running thread will go into a waiting state when a specific condition required for the execution of its series of time-dependent transactional operations has yet to be met.

A waiting thread will resume operation upon receiving a command "notify" from another thread.

Running and waiting threads may also receive the command "resume" which means that when the thread completes the execution of its series of time-dependent transactional operations, it should begin again, rather than become dormant. A thread may accumulate several "resume" commands and perform them one after the other.

In FIGS. 5A-5F, a thread P, controlled by sub server $86_k$ (FIG. 2) is responsible for moving wagons 10 along track X, in a direction from a cell X1 towards a cell X8. In accordance with a preferred embodiment of the present invention, thread P receives a command "resume" from another thread running in sub server $86_k$ whenever track X includes at least one wagon 10 that can be moved towards X8. Alternatively, thread P receives a command "resume" from another thread running in sub server $86_k$ whenever track X includes a predetermined minimum number of wagons 10 that can be moved towards X8. Alternatively, thread P receives a command "resume" from sub server $86_k$, at regular time intervals, or when some other condition or set of conditions occur.

The motion of wagons 10 by a thread is subject to the following procedure:

1. To move wagons 10 along a section of a track, a thread P must first control that section of track X. Only one thread may control a section of track at any time.

2. When we define proximal and distal with respect to the direction of motion along a track so that the point of origin is proximal, the section of track that a thread must control in order to move along or reduce wagons 10 is between the most proximal cell 112 which is occupied by any wagon 10 and the most distal vacant cell 112 of that track.

3. Defining a motion step as the movement of any wagon 10 by one cell, in the direction of motion, the thread re-evaluates the section of track that it needs to control, between motion steps. Given a first motion step and a next motion step, after the first motion step, the thread releases control over cells that participated in the first motion step but do not participate in the next motion step, takes control over new cells that did not participate in the first motion step but participate in the next motion step, and maintains control over cells that participate in both the first and second motion steps. As has been described hereinabove, in conjunction with FIG. 3A, motor 28 may be a step motor, operative to provide one motion step with each motor step, or with a given integral number of motor steps.

The motion of wagons 10 by a thread towards a distal track section will henceforth be defined as a reducing process.

In the present example, illustrated in FIGS. 5A-5F, track X includes four wagons 10, designated as wagons a, b, c, and d, and their movement, in a reducing process, is as follows:

1. As illustrated in FIG. 5A, thread P will take control over a section of track X between cells X2 and X8.

2. On a first motion step, illustrated by the change between FIGS. 5A and 5B, thread P will move wagons a, b, c, and d by one cell 112 towards cell X8 and then re-evaluate its control over track X, releasing control over some cells and taking control over new cells. Having moved wagon a from X2 to X3, wagon b from X3 to X4, wagon c from X5 to X6, and wagon d from X7 to X8, the most proximal occupied cell becomes X3, and the most distal vacant cell becomes X7. Thus, thread P will release its control over cells X2 and X8 but maintain control over cells X3-X7.

3. FIG. 5C schematically illustrates the control of thread P over cells of track X after the first motion step.

4. On the second motion step, illustrated by the change between FIGS. 5C and 5D, thread P will move wagon a from X3 to X4, wagon b from X4 to X5, and wagon c from X6 to X7. Thread X will then release its control over cells X3 and X7, and maintain control over cells X4-X6.

5. FIG. 5E schematically illustrates the control of thread P over cells of track X after the second motion step.

6. On the third motion step, illustrated by the change between FIGS. 5E and 5F, thread P will move wagon a from X4 to X5 and wagon b from X5 to X6. Having brought all the wagons to the distal portion of track X, thread P will release its control over the cells of track X and become dormant.

Reference is now made to FIGS. 6A-6L, which together illustrate an example of a process of transferring wagons from one track to another, in accordance with a preferred embodiment of the present invention. FIGS. 6A-6L illustrate a track X and a track Y, separated by an imaginary interface 40, wherein track Y proceeds from track X. Although, on the face of it, tracks X and Y seem like a single track, there may be logical reasons in the design of track system 110 which require that they will be treated as two distinct tracks. For example, track X may be controlled by thread P, which is run by sub server $86_k$ (FIG. 2) and track Y may be controlled by a thread Q, which is run by sub server $86_i$ (FIG. 2), although the two threads may be controlled by the same sub server. The transfer of wagons 10 from track X to track Y is controlled by a third thread QT. Preferably, thread QT is run either by sub server $86_k$, like thread P, or by sub server $86_i$, like thread Q. However, this condition is not necessary. Thread QT may be run by sub server $86_j$ (FIG. 2). Thus in this particular example, track X has two threads associated with it, P and QT, and track Y has two threads associated with it, Q and QT.

The motion of wagons 10 along a track, which may be controlled by more than one thread is subject to the following procedure:

1. Defining a free track section as a track section not controlled by a thread, a thread may only take control over a free track section.
2. In order to move wagons 10 along a section of a track, a thread will first identify a free section of the track and then, within that section, take control over the group of adjacent cells from the most proximal occupied cell to the most distal vacant cell.
3. After each motion step, the thread re-identifies the free section of the track and re-evaluates its control over the re-identified free section, again taking control over a section between the most proximal occupied cell and the most distal vacant cell. This means that the thread releases control over cells 112 that it need not control any more, and notifies its server which cells 112 have been released. The notification is spread to all other servers, as there may be threads waiting for the release of these cells, in order to take control over them.
4. More than one thread may run in parallel, even on the same logical track, provided they are not sharing a common track section.

In the present example, illustrated in FIGS. 6A-6L, track X includes five wagons 10, designated as wagons g, h, i, j, and k, and track Y includes three wagons, u, v, and w. The present example illustrates a transfer process from track X to track Y, initiated by a request to thread QT from another thread. QT attempts to transfer wagons across interface 40, but since cell Y1 is not vacant, thread QT notifies thread P and Q to reduce wagons along Y, and preferably also along X.

The motion of wagons is as follows:
1. As illustrated in FIG. 6A, thread P will take control over a section of track X between cells X1 and X4, and thread Q will take control over a section of track Y between cells Y1 and Y6, for simple reducing processes, similar to that illustrated in FIGS. 5A-5F.

2. On a first motion step, illustrated by the change between FIGS. 6A and 6B, thread P will move wagon g from X1 to X2, and wagon h from X3 to X4. In parallel, thread Q will move wagons u, v, and w, from cells Y1, Y2, and Y3 to cells Y2, Y3, and Y4, respectively.

3. FIG. 6C schematically illustrates the control of threads P, Q and QT over cells of tracks X and Y after the first motion step. Thread P will maintain its control over cells X2 and X3, releasing control over cells X1 and X4, thread Q will maintain its control over cells Y2-Y6, releasing control over cell Y1, and thread QT will take control over cells X4-Y1, across interface 40.

4. On a second motion step, illustrated by the change between FIGS. 6C and 6D, thread P will move wagon g from X2 to X3. In parallel, thread Q will move wagons u, v, and w, from cells Y2, Y3, and Y4 to cells Y3, Y4, and Y5, respectively. Furthermore, thread QT will move wagons h, i, j, and k from cells X4, X5, X6 and X7 to cells X5, X6, X7, and Y1, respectively. Since again, cell Y1 is not vacant, thread QT will again notify threads Q and preferably also thread P to perform a reducing process along their respective tracks.

5. FIG. 6E schematically illustrates the control of threads over cells of tracks X and Y after the second motion step. Thread P will control cells X3-X4, thread Q will control cells Y1-Y6, and thread QT will go into waiting.

6. On a third motion step, illustrated by the change between FIGS. 6E and 6F, thread P will move wagon g from X3 to X4. In parallel, thread Q will move wagons u, v, and w, from cells Y3, Y4, and Y5 to cells Y4, Y5, and Y6, respectively. Additionally, thread Q will move wagon k from cell Y1 to cell Y2.

7. FIG. 6G schematically illustrates the control of threads over cells of tracks X and Y after the third motion step. Thread P becomes dormant, until a new wagon enters cell X1. Thread Q will control cells Y2-Y3. Thread QT will control cells X4-Y1.

8. On a fourth motion step, illustrated by the change between FIGS. 6G and 6H, thread Q will move wagon k from cell Y2 to cell Y3. In parallel, thread QT will move wagons g, h, i, and j from cells X4, X5, X6 and X7 to cells X5, X6, X7, and Y1, respectively.

9. FIG. 6I schematically illustrates the control of threads over cells of tracks X and Y after the fourth motion step. Thread Q controls cells Y1 and Y2, while the other threads are dormant.

10. On a fifth motion step, illustrated by the change between FIGS. 6I and 6J, thread Q will move wagon j from cell Y1 to cell Y2.

11. FIG. 6K schematically illustrates the control of threads over cells of tracks X and Y after the fifth motion step. Thread QT controls cells X5-Y1, while the other threads are dormant.

12. On a sixth motion step, illustrated by the change between FIGS. 6K and 6L, thread QT will move wagons g, h, and i from cells X5, X6 and X7 to cells X6, X7, and Y1, respectively, and become dormant.

However, in accordance with an alternate embodiment of the present invention, thread QT, responsible for the transfer of wagons from track X to track Y may also single-handedly control the movements of wagons on track X and track Y. Alternatively, thread Q may move wagons 10 along track Y and thread QT may move wagons 10 along track X as well as transfer them from X to Y. Alternatively, thread P may move wagons 10 along track X and thread QT may move wagons 10 along track Y as well as transfer them from X to Y.

Further description and characterization of the track system, in accordance with non-limiting embodiments are given in Appendix A-1.

Reference is now made to FIGS. 7A-7F, which together illustrate an example of a process of sorting wagons in track junctions, in accordance with a preferred embodiment of the present invention. Sorting may be performed, for example, in order to direct wagons to different wings in a terminal, to different flights, to different trains, or to different baggage-claim points. Alternatively or additionally, sorting may be performed in order to separate parcels by type, for example, fragile parcels, odd-shaped parcels, carton-packed parcels and suitcases. Alternatively or additionally, sorting may be performed in order to separate parcels by weight range. Alternatively or additionally, parcels may be sorted into groups of generally similar weights for each group, for loading arrangement onto an airplane. Naturally, sorting may be performed for other purposes as well.

Figure 7A:
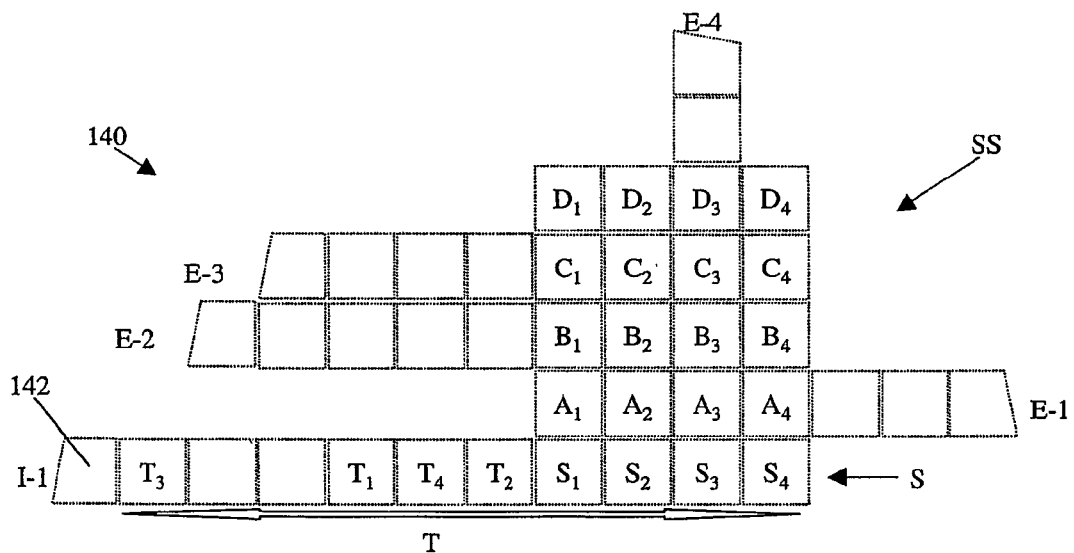
FIGS. 7A-7F together illustrate an example of a process of sorting wagons in track junctions, in accordance with a preferred embodiment of the present invention.

FIG. 7A illustrates a five-track junction 140 which includes one single-lane incoming track I-1, and four single-lane exiting tracks E-1, E-2, E-3, and E-4. Preferably, junction 140 further includes a sorting lane S and a sorting array SS. The rules for construction a sorting junction are as follows:

1. The number of cells in sorting lane S has to be at least equal to the number of exiting tracks of sorting junction 140.
2. The number of columns of sorting array SS has to be equal to the number of cells of sorting lane S.
3. The number of rows of sorting array SS has to be equal to the number of exiting tracks of the sorting junction.

Since sorting junction 140 has four exiting tracks, sorting lane S may have four or more lanes, and sorting array SS may have four or more columns and four rows. In the present example of FIGS. 7A-7F, sorting lane S has four cells $S_1$-$S_4$, and 4×4 sorting array SS has cells $A_1$-$A_4$, $B_1$-$B_4$, $C_1$-$C_4$, and $D_1$-$D_4$. The cell designations apply to FIGS. 7A-7F, but is shown only in FIG. 7A, so as not to obscure the positions of the wagons in the other figures. Preferably, junction 140 is controlled by sub server $86_k$ of CMS 80 (FIG. 2). However, any sub server or server or a combination of them could control junction 140.

Motion of wagons through a sorting junction is controlled by at least two threads as follows:
1. A first thread, T, is responsible for the transfer of wagons from an at least one incoming lane into sorting lane S and for the motion of wagons within sorting lane S.
2. A second thread, TS, is responsible for the transfer of wagons from sorting lane S to sorting array SS and for the motion of wagons within sorting array SS.
3. Threads. T and TS may run in parallel, with thread T transferring wagons to sorting lane. S and thread TS moving wagons within array SS.
4. Only one thread, T or TS may control sorting lane S, wherein preferably, thread T has a higher priority, and thread TS must wait until notified that thread T has completed its task.
5. Thread TS will begin transferring wagons from sorting lane S to array SS only when array SS has no wagons still to be directed to an exiting track.
6. The maximum number of motion steps that may be required for a wagon to be sorted by a sorting array is equal to the number of rows + the number of columns of the sorting array.

FIG. 7A illustrates a first motion step, in which sorting lane S and sorting array SS are free of wagons, while a line of wagons 10 approach junction 140, on incoming track I-1. The wagons are designated according to a desired exiting track. In other words, wagon $T_1$, should exit junction 140 via exiting track E-1, and wagon $T_2$ should exit junction 140 via exiting track E-2, wagon $T_3$ should exit junction 140 via exiting track E-3, and wagon $T_4$ should exit junction 140 via exiting track E4.

Figure 7B:
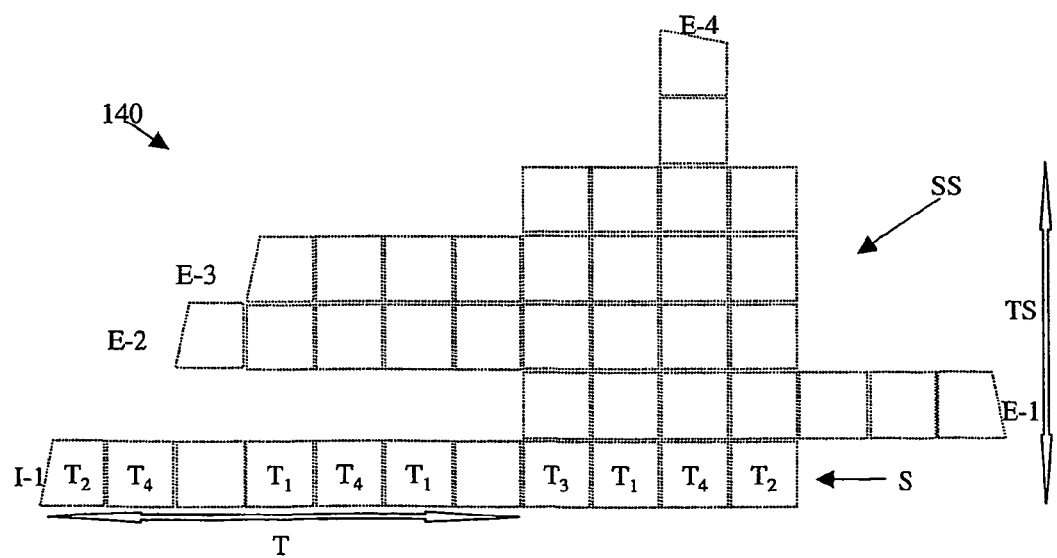

FIG. 7B illustrates a reducing process by a thread T, operated, for example, by sub server $86_k$ (FIG. 2). Thread T transfers wagons $T_3$, $T_1$, $T_4$, and $T_2$ to cells $S_1$, $S_2$, $S_3$, sorting lane S. The reducing process in the present example took six motion steps, since the last wagon to enter sorting lane S, wagon T3, was six cells away from it. Preferably, sub server $86_k$ makes a decision, whether to fill sorting lane S, by waiting for distant wagons, or whether to begin the sorting process with a partially filled sorting lane S. In other words, sub server $86_k$ could have decided to perform a sorting process for only three wagons $T_1$, $T_4$, and $T_2$, filling positions $S_1$, $S_2$, and $S_3$ only, rather than to wait for wagon $T_3$, for example, if wagon $T_3$ had been very far. In some situations, sub server $86_k$ may decide to sort only one incoming wagon, or only two incoming wagons. Preferably then, sorting takes place from cells $S_1$ and/or $S_2$ of sorting lane S.

Figure 7C:
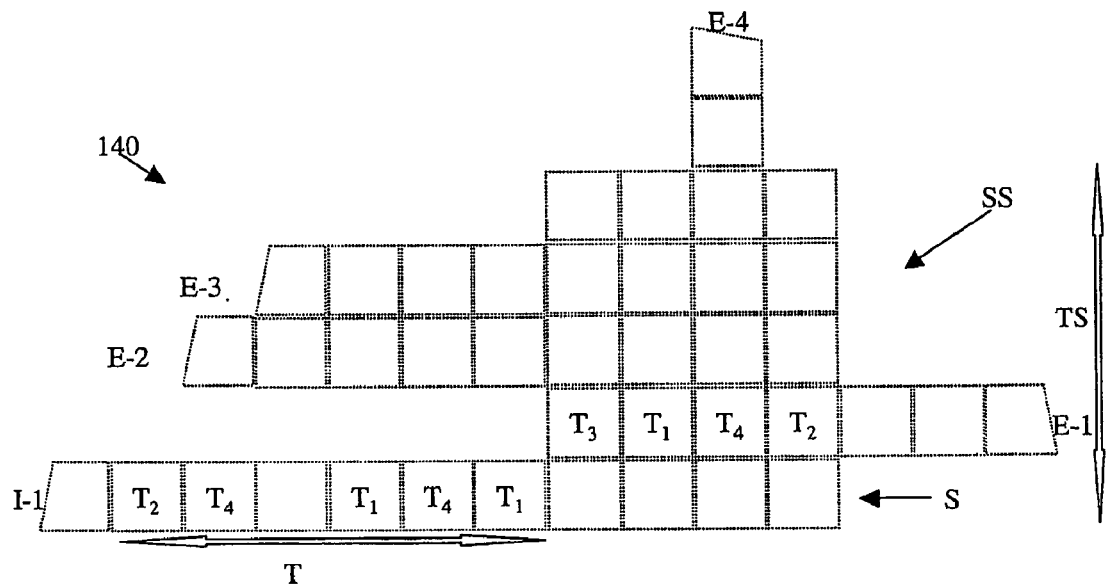

FIG. 7C illustrates a first motion step of the sorting process, in which thread T releases its control over sorting lane S, and thread TS takes control over sorting array SS and sorting lane S, transferring all the wagons from sorting lane S to a first line of cells of sorting array SS.

Figure 7D:
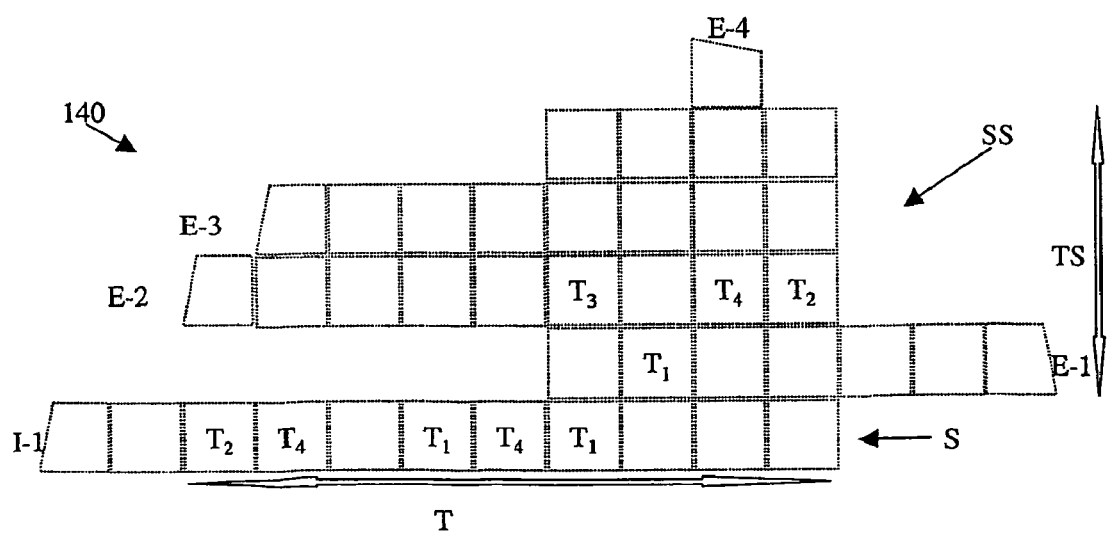
Figure 7E:
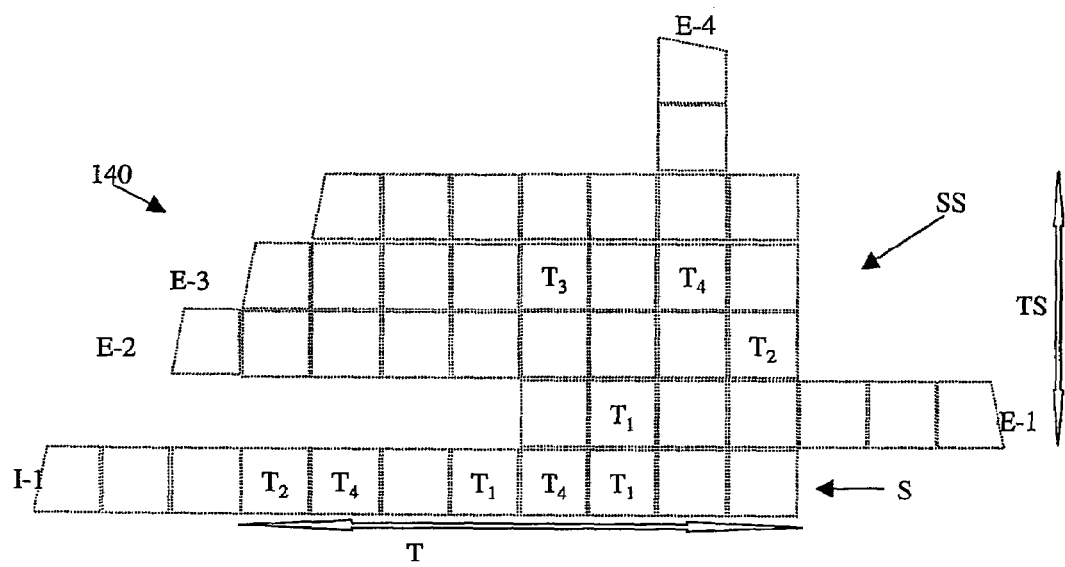
Figure 7F:
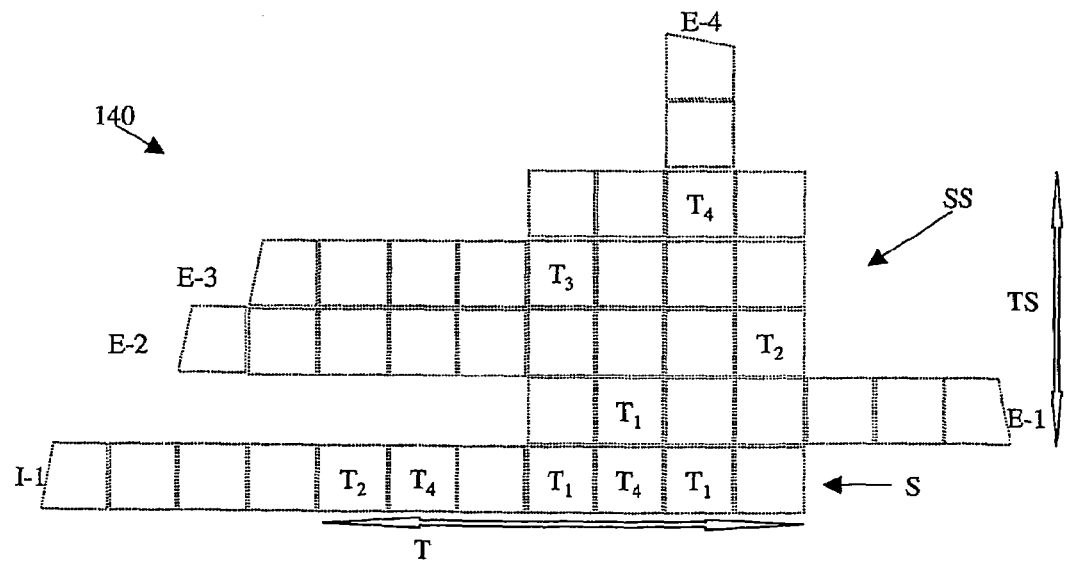

FIGS. 7D-7F illustrate the continuation of the sorting process. Thread TS releases its control over sorting lane S. In the meantime, a new group of wagons 10, which includes new wagons (as shown from right to left) $T_1$, $T_4$, $T_1$, $T_4$, and $T_2$, designated according to a desired exiting track, enters sorting lane S. Therefore, thread T may take over sorting lane S, moving the new group of wagons to it. In parallel, thread TS, which controls array SS, moves each wagon, first to a line of cells opposite the exiting track to which it is designated, and then along that line of cells towards the exiting track to which it is designated.

The movement of wagon $T_4$ from sorting lane S to its desired exiting track (using the designations noted on FIG. 7A), will be:

$S_3$->$A_3$->$B_3$->$C_3$->$D_3$->exiting track E-4.

Preferably, lateral movements along each of lines of cells, A, B, C and D takes place only after all wagons have reached their designated rows, for exiting through their designated exit tracks. Thus, preferably, wagons $T_1$, $T_2$, and $T_3$ do not move in the lateral direction along lines of cells A, B, or C, until wagon $T_4$ reaches line of cells D. Preferably, when wagon $T_4$ reaches line of cells D, all wagons begin to move towards their designated exit tracks.

The length of time that a wagon may spend in a sorting M×N array junction is no more than M+N motion steps.

While one group of wagons is being sorted in array SS, by thread TS, another group of wagons is being moved into sorting lane S, by thread T. When all wagons 10 have left sorting array SS, so that array SS is completely clear of wagons, and when thread T releases its control over sorting lane S, thread TS can again take control over sorting lane S and array SS and begin the new sorting process.

Figure 8A:
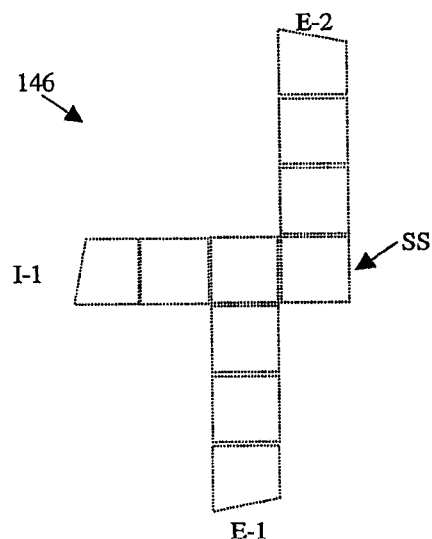
FIGS. 8A-8D illustrate a plurality of track junctions, in accordance with the present invention.

Reference is now made to FIGS. 8A-8D, which illustrate a plurality of track junctions, in accordance with the present invention. FIG. 8A illustrates a simple T sorting junction 146 of one incoming track I-1, two exiting tracks E-1 and E-2, and a two×two sorting array SS. In this simple junction, no sorting lane S is needed.

Figure 8B:
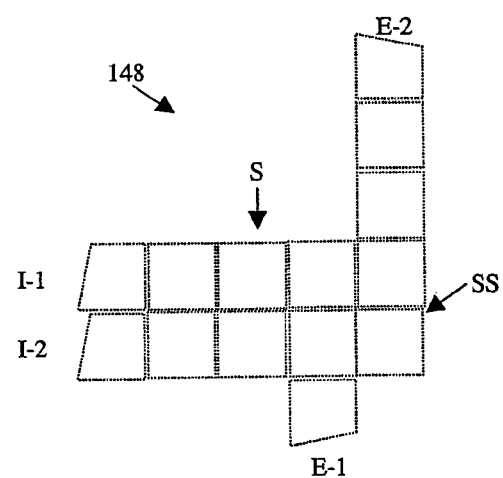

FIG. 8B illustrates a four-way sorting junction 148 of two incoming tracks I-1 and I-2, two exiting tracks E-1 and E-2, a two-cell sorting lane S, and a two x two sorting array SS.

Figure 8C:
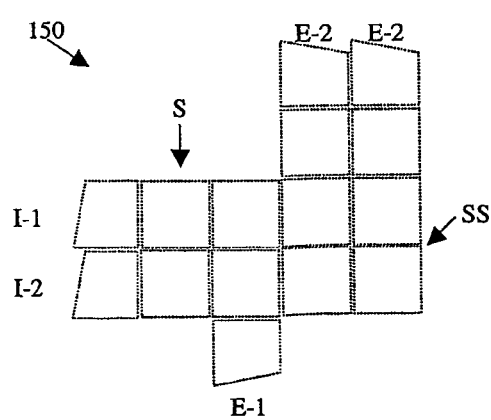

FIG. 8C illustrates a four-way sorting junction 150 of two incoming, single-lane tracks I-1 and I-2, one exiting, single-lane track E-1, and one exiting, double-lane track E-2. Junction 150 has a two-cell sorting lane S and a two x three sorting array SS.

Figure 8D:
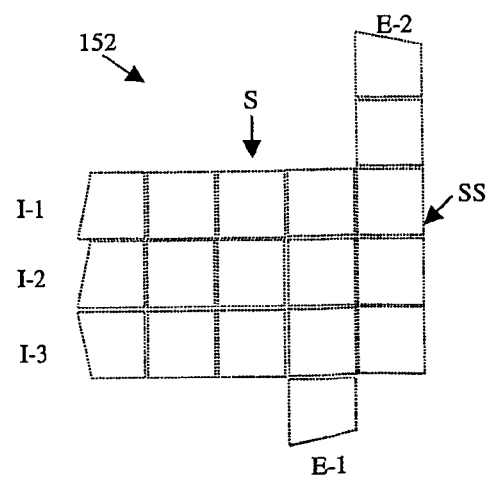

FIG. 8D illustrates a five-way sorting junction 152 of three incoming tracks I-1, I-2, and I-3, two exiting tracks E-1 and E-2, a three-cell sorting lane S and a three x two sorting array SS.

It will be appreciated by persons skilled in the art, that many other arrangements of junctions and combinations of sorting junctions are possible, and are within the scope of the invention. Further description and characterization of the sorting junctions, in accordance with non-limiting embodiments, are given in Appendix A-2.

While the preceding discussion illustrated sorting junctions, some of the arrangements included merging junctions as well. In particular, FIG. 8C illustrates a merge of two single-lane incoming tracks I-1 and I-2, and FIG. 8D illustrates a merge of three single-lane incoming tracks I-1, I-2, and I-3.

Figure 9A:
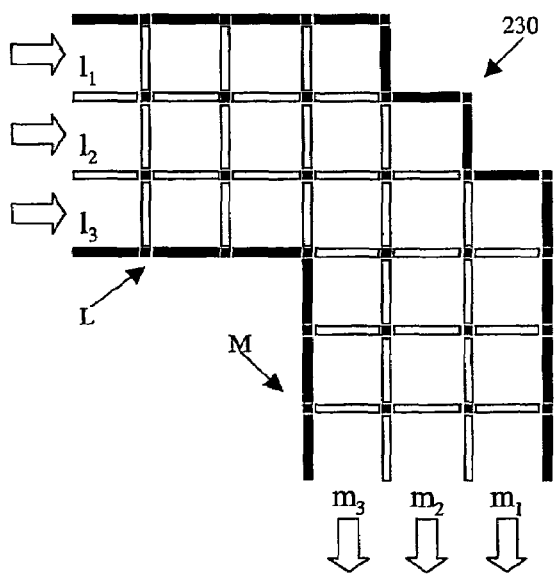
FIGS. 9A-9E schematically illustrate additional features of a track system, in accordance with a preferred embodiment of the present invention.

Reference is now made to FIGS. 9A-9E, which schematically illustrate additional features of track system 110, in accordance with a preferred embodiment of the present invention. FIG. 9A illustrates a 900 turn in a triple-lane section 230 of track system 110. Section 230 includes a triple-lane section L, having lanes 11, 12, and 13, and a triple-lane section M, having lanes $m_1$, $m_2$, and $m_3$, wherein wagons 10 from lane 11 would proceed to lane $m_3$, and wagons 10 from lane 13 would proceed to lane $m_1$. Alternatively track 230 may be a single-lane track, or a multi-lane track of any number of lanes. Where it is desired to make a U-turn or a complex turn several 90° turns may be used in succession.

Figure 9B:
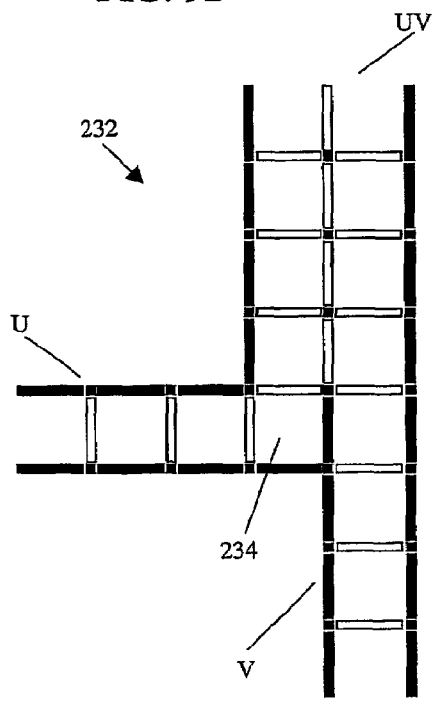

FIG. 9B illustrates a merge junction 232 where two single-lane track sections U and V meet at 90° and merge to form a double-lane track UV. Wagons coming from track U make their 90° turn in cell 234.

Figure 9C:
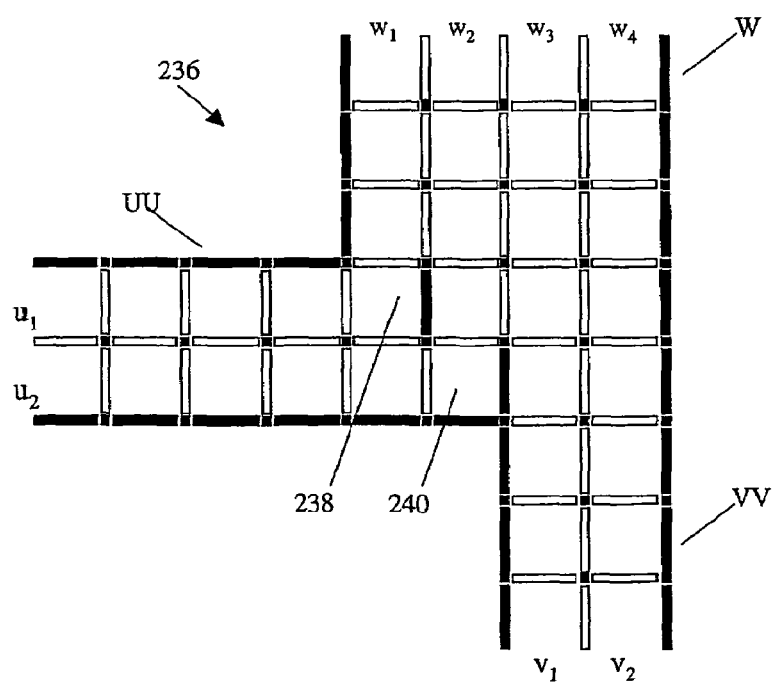

FIG. 9C illustrates a merge junction 236, wherein two double-lane track sections UU, having lanes $u_1$ and $u_2$ and VV, having lanes $v_1$ and $v_2$ meet at 90° and merge to form a four-lane track W, having $w_1$, $w_2$, $w_3$, and $w_4$. Wagons coming from lane $u_1$ make their 90° turn in cell 238, and wagons coming from lane $u_2$ make their 90° turn in cell 240.

Figure 9D:
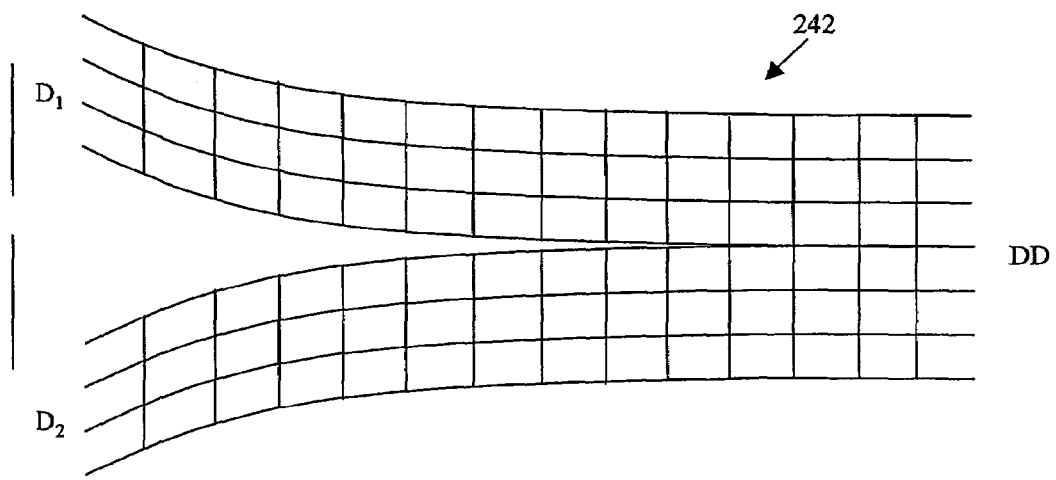

FIG. 9D illustrates a merge junction 242, wherein two triple-lane sections $D_1$ and $D_2$ merge to form a six-lane track DD.

Figure 9E:
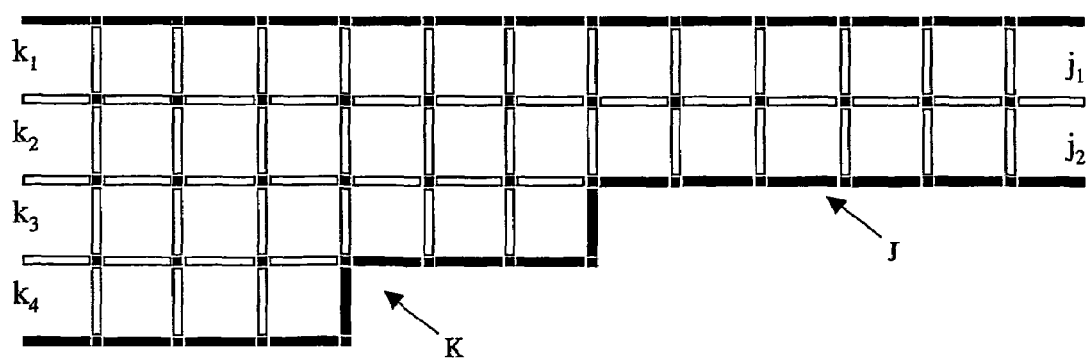

FIG. 9E illustrates a reducing process for bringing down a four-lane track section K, having lanes $k_1$, $k_2$, $k_3$, and $k_4$ to a two-lane track section J, having lanes $j_1$ and $j_2$. Preferably, for this purpose, the threads which move wagons along section K release their control over section K at predetermined time intervals, and a thread Th-4-to-2, takes over control during these time intervals, moving wagons in a direction from $k_4$ to $k_1$.

It will be appreciated by persons skilled in the art that merging junctions for combining wagons coming from different tracks into fewer tracks or into a single track are similarly possible. Further description and characterization of the merging junctions, in accordance with non-limiting embodiments, are also given in Appendix A-2.

Figure 10C:
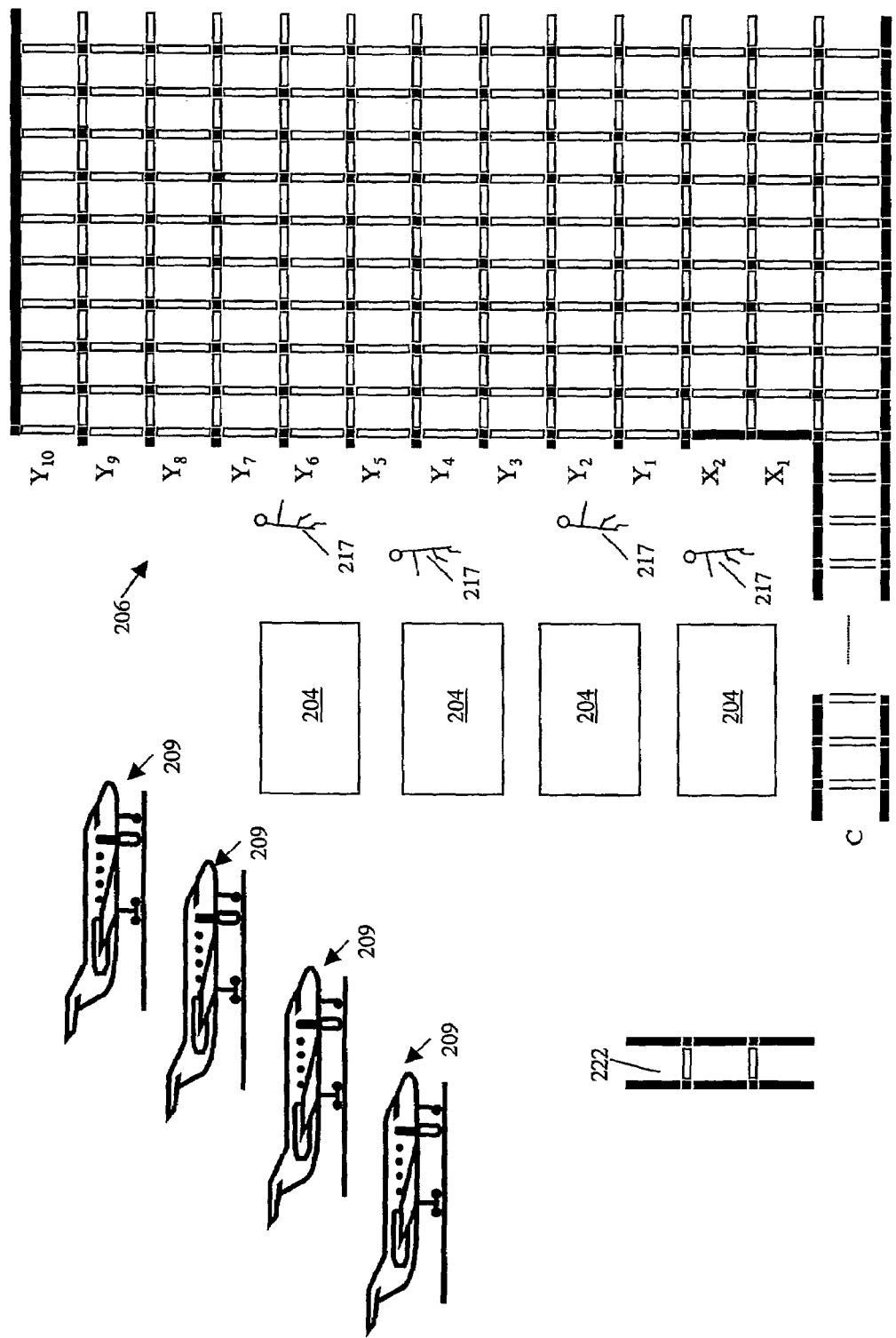

Reference is now made to FIGS. 10A-10C, which together illustrate an arrangement of track system 110 in departure area 200, in accordance with a preferred embodiment of the invention. Departure area 200 includes at least one and preferably a plurality of check-in counters 202, each having a check-in attendant 205 for performing the necessary check-in procedure, described hereinbelow in conjunction with the method of utilizing track system 110 and wagon 10 in an airport terminal. At least one entry track $A_i$ and preferably a plurality of entry tracks $A_i$ of track system 110, are adjacent to check-in counters 202. In the embodiment of the invention seen in FIG. 10A, each entry track $A_i$ is a single-lane track associated with one check-in counter 202 and one attendant 205. Alternatively entry track $A_i$ may be a multi-lane track.

Preferably, entry tracks $A_i$ lead to a collection track C, preferably perpendicular to entry tracks $A_i$. Track C may be a single-lane track or a multi-lane track and leads to departure-area sorting system 206, which routes luggage from any particular check-in counter 202 to the proper airplane-loading zone 204, based on the desired destination for the luggage.

In accordance with a preferred embodiment of the present invention, sorting system 206 is a two-stage sorting system, wherein in the first stage, wagons 10 are sorted either to the left, forming a left group, or to the right, forming a right group, based on the designated flight for their luggage. In the second stage, wagons 10 of the left group and of the right group are further sorted to specific tracks, which may lead, for example, to specific airplane loading zones 204, based on the designated flight for their luggage.

FIG. 10B illustrates an overview of sorting system 206 which includes a first-stage sorting array 166 for sorting wagons 10 between exit tracks 168 and exit tracks 167 and a second-stage sorting array 170, for sorting wagons 10 amongst the different exit tracks of 168 and 167.

First-stage sorting array 166 includes a sorting lane $S_c$. Sorting system 206 may be at a center of collection track C, as shown in FIGS. 10A and 10B, wherein wagons 10 may enter sorting lane $S_c$ from the left and from the right.

First-stage sorting junction 166 further includes a sorting array of two rows, $X_1$ and $X_2$ wherein row $X_1$ serves as a sorting lane for exit tracks 168 and row $X_2$ serves as a sorting lane for exit tracks 167. In accordance with a preferred embodiment of the present invention, exit tracks 168 include tracks Y11-Y20, and exit tracks 167 include tracks, tracks Y1-Y10. However, fewer or more exit tracks may be used.

Further in accordance with a preferred embodiment of the present invention, sorting array 170 has 10 rows and 20 columns. However arrays of other sizes may be used.

The route wagon 10 follows on sorting system 206 is as follows. At a proximal end 213 of track $A_i$, next to check-in counter 202, wagon 10 enters track system 110. Preferably, in order to mount wagon 10 onto track $A_i$, a sensor 309 senses the approach of wagon 10, starts the operation of motor 28, and deploys charging rod 34. Alternatively, switch 54 may be used to manually start motor 28 and deploy charging rod 34.

A thread Th-$A_i$ operating on each track $A_i$ individually, reduces each wagon 10 to distal end 215 of track $A_i$, as soon as attendant 205 completes the handling of that wagon 10 and notifies Th-$A_i$ by a keystroke of computer terminal 225.

A second thread Th-C, operating on all junctions between tracks $A_i$ and collection track C transfers wagons from distal end 215 of tracks $A_i$ to collection track C at specific time intervals.

A third thread, Th-RC reduces wagons 10 along collection track C towards sorting lane Sc, and preferably also into sorting lane Sc.

Since both threads Th-C and Th-$A_i$ are associated with tracks $A_i$ and since both threads Th-C and Th-RC are associated with collection track C, generally, the three threads will not run in parallel. Rather, either threads Th-$A_i$ and Th-RC will run in parallel, and thread Th-C will wait, or thread Th-C will run and threads Th-$A_i$ and Th-RC will wait.

A fourth thread, Th-$S_c$, moves wagons 10 from sorting lane $S_c$, to either lane $X_1$ or lane $X_2$, depending on whether they are designated to exit tracks 168 or exit tracks 167, respectively.

A fifth thread Th-$X_1$ reduces wagons 10 along lane $X_1$.

A sixth thread Th-$X_2$ reduces wagons along lane $X_2$.

A seventh thread Th-168 moves wagons from $X_1$ to array 170 and from it to exiting tracks Y11-Y20.

An eighth thread Th-167 moves wagons from $X_2$ to array 170 and from it to exiting tracks Y1-Y10.

Threads Th-RC and Th-$S_c$ must wait for each other with regard to taking control over sorting lane Sc. Threads Th-$S_c$, Th-$X_1$ and Th-168 must wait for each other with regard to taking control over lane $X_1$, and threads Th-$S_c$, Th-$X_2$ and Th-167 must wait for each other with regard to taking control over lane $X_2$.

FIG. 10C illustrates a distal portion of sorting system 206 and track system 110, wherein exiting tracks Y1-Y10 reach airplane loading zones 204 and wagons 10 return to departure area 200 via a track 222.

Figure 26:
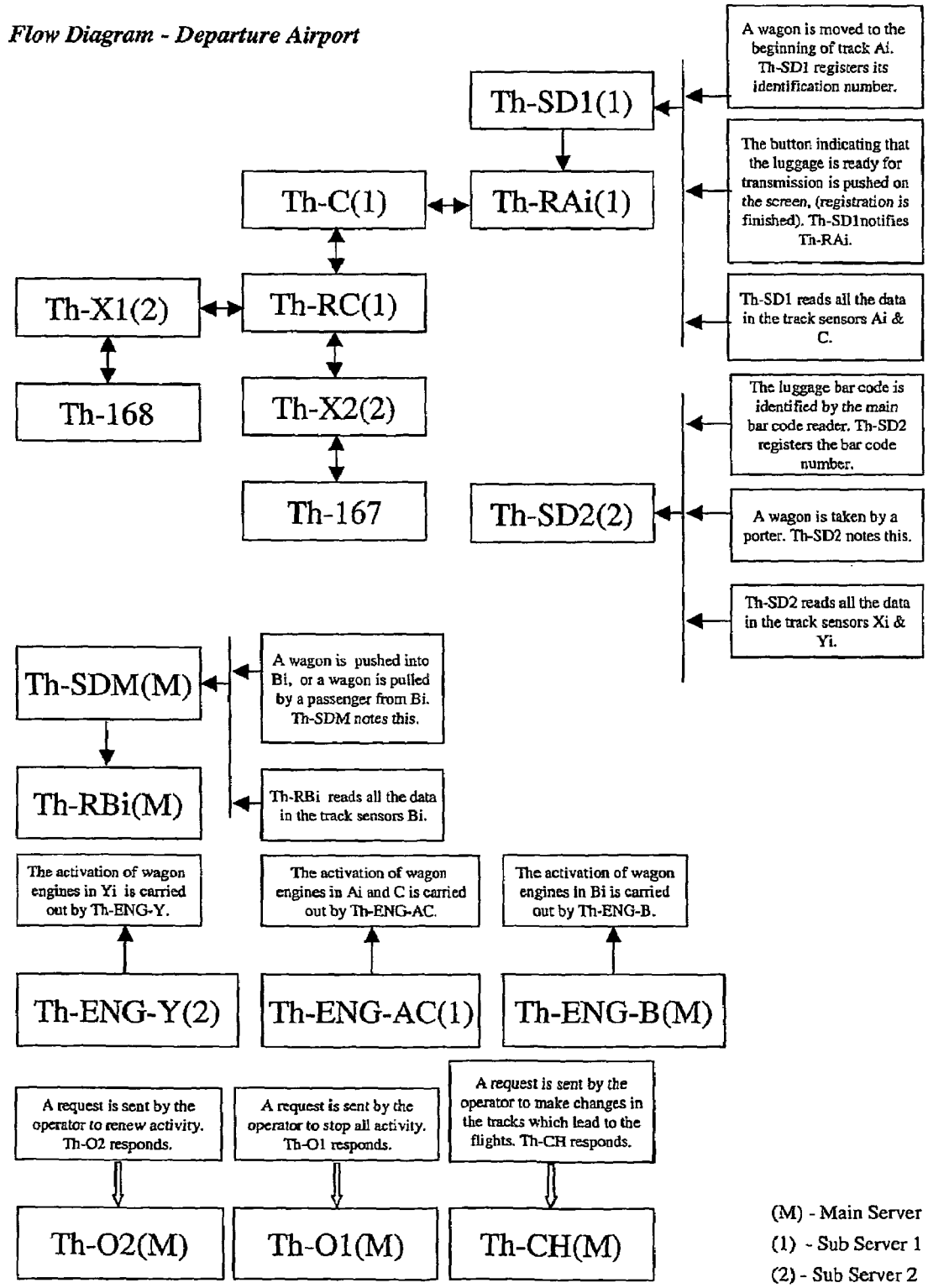
FIG. 26 is a flow diagram representation of operation of a departure airport, in accordance with a non-limiting preferred embodiment of the present invention.

Further description and characterization of the algorithms associated with FIGS. 10A-10C, in accordance with non-limiting embodiments, are given in the flow diagram of FIG. 26.

Reference is now made to FIG. 11, which schematically illustrates an arrangement of track system 110 in departure area 200, in accordance with an alternative embodiment of the invention. Preferably, tracks $A_i$ lead to a multi-lane collection track C, preferably perpendicular to sections $A_i$. In accordance with the present embodiment, collection track C includes two triple-lane tracks which merge together at a sorting junction 172. Each section C includes lane $C_1$, $C_2$, and $C_3$, wherein $C_3$ is the most proximal with respect to section $A_i$ and check-in counter 202, and $C_1$ is the most distal.

Further in accordance with the present embodiment, sorting junction 172 includes a sorting lane $S_6$ of six cells, a sorting array SV and four exiting tracks, N, W, E and S, leading for example, to four different wings of the airport. Since sorting array SV has 6×4 cells, the sorting process will take no more than 10 motion steps.

In accordance with the present embodiment of the invention, wagons 10 are admitted to a track $A_i$ at proximal ends 213, and are brought to distal portion 215 by thread Th-$A_i$.

Preferably at specific time intervals, thread Th-$A_i$-to-C moves wagons 10 from distal cells of tracks $A_i$ to collection track C. Preferably, thread Th-$A_i$-to-C moves wagon 10 to the most distal lane of section C, which is vacant.

In alternate embodiments of the invention, sorting junction 172 may have a fewer or a greater number of exiting tracks. For example, sorting junction 172 may have 10 different exiting tracks, leading for example, to 10 different flights. Sorting array SV of junction 172 will then have 6×10 cells, and the sorting process will take no more than 16 motion steps.

In alternate embodiments of the invention, section C may have a fewer or a greater number of lanes. For example, section C may be a two-lane track, or a six-lane track.

Figure 12:
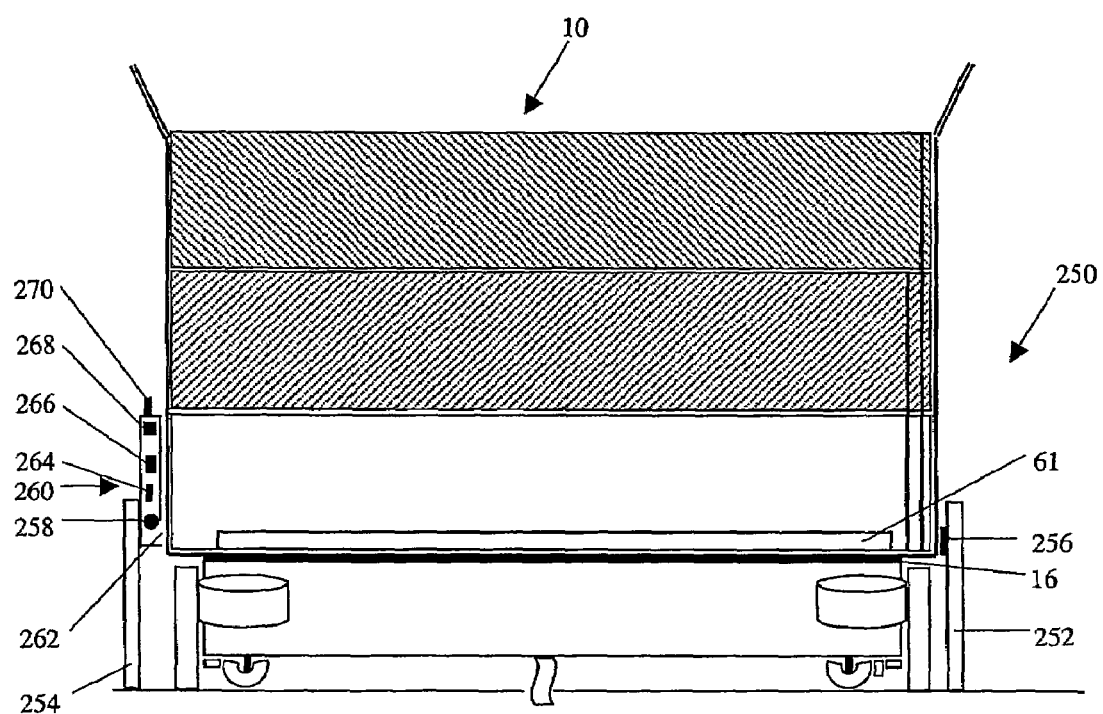
FIG. 12 schematically illustrates a light gate for verifying that no luggage was inadvertently left on a wagon, in accordance with a preferred embodiment of the present invention.

Reference is now made to FIG. 12, which schematically illustrates a light gate 250 for verifying that no luggage was inadvertently left on a wagon, in accordance with a preferred embodiment of the present invention. As has been illustrated in FIG. 3D, wagon 10 includes four slits 61 on two parallel sides 58 and on two parallel sides 60, wherein slits 61 are arranged exactly opposite each other on each of the two parallel sides, so that light which is shined through slit 61 of one side will be emitted from slit 61 of the other side. Preferably, four slits 61 are arranged very close to upper plate 16 of double bottom 12, and preferably, each slit extends almost to the full width or length of its side of the wagon. Preferably, light gate 250 includes two posts 252 and 254, of a height that is higher than the height of slits 61. Post 252 includes a light source 256, which may be a laser light or a white light. Post 254 includes a light sensor 258, for example, a CCD array, preferably located in a housing 260, having an aperture 262, in line with slit 61 and light sensor 258. Preferably, housing 260 further includes a controller 264, a beeper 266, a transmitter 268, which may be embedded in controller 264 and preferably also an all-clear button 270, which may include written instructions, such as "Press when wagon is clear of parcels". Light sensor 258 is operative to sense obstacles blocking light transmission from light source 256, thereby indicating that wagon 10 still contains parcels.

Preferably, wagon 10 moves into a track cell at which light gate 250 is positioned, directly after its parcels have been unloaded, for example, after it leaves airplane loading zone 204 (FIG. 1A) or after a passenger has claimed his bags. As wagon 10 moves through light gate 250, at least one track sensor 120 (FIG. 4A) reads code 13 of wagon 10 (FIG. 3E) and notifies $CMS_{departure}$ 82 that wagon 10 is moving through light gate 250, If light sensor 258 senses an obstacle in the light path from light source 256, it will preferably sound beeper 266, to alert the porter that unloaded the wagon, and notify $CMS_{departure}$ 82 to stop the movement of wagon 10, as there is a forgotten parcel in it. The alerted porter or passenger may remove the forgotten parcel and press button 270, which notifies $CMS_{departure}$ 82 that the situation was remedied. Wagon 10 may then continue on its path.

Alternatively, the porter may not respond to beeper 266, at which point, $CMS_{departure}$ 82 may attempt to contact an area-supervisor, by phone, in order to remedy the situation. If this attempt also fails, then after a predetermined pause period, $CMS_{departure}$ 82 will direct the movement of wagon 10 to a special "forgotten parcel" area. At the same time, $CMS_{departure}$ 82 will attempt to contact the owner of the parcel, for example, by phoning the passenger and informing him of the whereabouts of his forgotten parcel.

Figure 13:
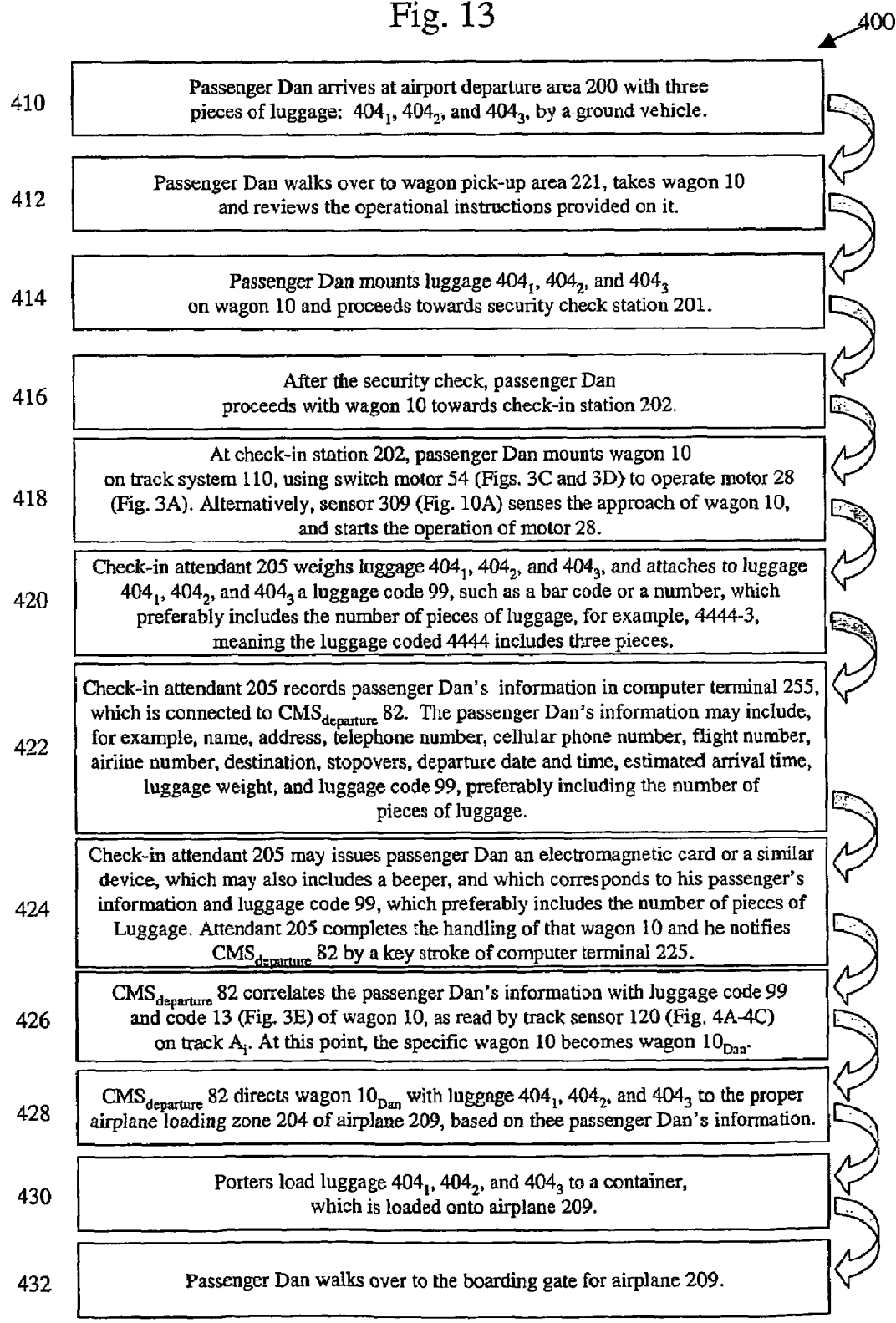
FIG. 13 is a flowchart, which schematically describes a method of overall luggage logistics in a departure terminal, in accordance with a preferred embodiment of the present invention.

Reference is now made to FIG. 13, which is a flowchart which schematically describes a method 400 of overall luggage logistics in departure terminal 200, in accordance with a preferred embodiment of the present invention. Unless otherwise noted, elements in FIG. 13 have been described hereinabove, in conjunction with FIGS. 1A, 1B, 1C, and 1D. FIG. 13 relates to a specific example delineated in FIG. 1A, of passenger Dan and his three pieces of luggage $404_1$, $404_2$, and $404_3$ intending to board airplane 209.

In box 410, a passenger Dan arrives at airport departure area 200 with three pieces of luggage, $404_1$, $404_2$, and $404_3$, by a ground vehicle, such as a car, a train or a bus.

In box 412, passenger Dan walks over to wagon pick-up area 221, takes wagon 10 and reviews the operational instructions provided on it.

In box 414, passenger. Dan mounts luggage $404_1$, $404_2$, and $404_3$ on wagon 10 and proceeds towards security check station 201.

In box 416, after the security check, passenger Dan proceeds with wagon 10 towards check-in station 202.

In box 418, at check-in station 202, passenger Dan mounts wagon 10 on track system 110, using switch 54 (FIGS. 3C and 3D), to operate motor 28 (FIG. 3A). Alternatively, sensor 309 (FIG. 1A) senses the approach of wagon 10 and starts the operation of motor 28.

In box 420, check-in attendant 205 weighs luggage 4041, $404_2$, and $404_3$, and attaches to luggage $404_1$, $404_2$, and $404_3$ a luggage code 99, such as a bar code or a number, which preferably includes the number of pieces of luggage, for example, 4444-3, meaning the luggage coded 4444 includes three pieces.

In box 422, check-in attendant 205 records passenger Dan's information in computer terminal 225, which is connected to $CMS_{departure}$ 82. The passenger Dan's information may include, for example, name, address, telephone number, cellular phone number, flight number, airline number, destination, stopovers, departure date and time, estimated arrival time, luggage weight, and luggage code 99, preferably including the number of pieces of luggage.

In box 424, check-in attendant 205 preferably issues passenger Dan an electromagnetic card or a similar device, which may also include a beeper, and which corresponds to his passenger's information and luggage code 99, which preferably includes the number of pieces of luggage.

In box 426, $CMS_{departure}$ 82 correlates the passenger Dan's information with luggage code 99 and code 13 (FIG. 3E) of wagon 10, as read by track sensor 120 (FIGS. 4A-4C) on track $A_i$. At this point, the specific wagon 10 becomes wagon $10_{Dan}$.

In box 428, $CMS_{departure}$ 82 directs wagon 10 with luggage $404_1$, $404_2$, and $404_3$ to the proper airplane loading zone 204, of airplane 209, based on the passenger Dan's information, as will be described hereinbelow, in conjunction with FIG. 15.

In box 430, porters load luggage $404_1$, $404_2$, and $404_3$ to a container, which is loaded onto airplane 209.

In box 432, passenger Dan walks over to the boarding gate for airplane 209.

Reference is now made to FIG. 14, which is a flowchart which schematically describes a method 440 of overall luggage logistics in departure terminal 200, in accordance with an alternate embodiment of the present invention, wherein luggage is piled on platforms that are loaded onto the airplane, and several pieces of luggage of a passenger are converted to a single piece by sac 406. Unless otherwise noted, elements in FIG. 14 have been described hereinabove, in conjunction with FIGS. 1A, 1B, 1C, and 1D. FIG. 14 relates to a specific example delineated in FIG. 1A, of passenger Dan and his three pieces of luggage $404_1$, $404_2$, and $404_3$ intending to board airplane 209.

In box 450, a passenger Dan arrives at airport departure area 200 with three pieces of luggage, $404_1$, $404_2$, and $404_3$, by a ground vehicle, such as a car, a train or a bus.

In box 452, passenger Dan walks over to wagon pick-up area 221, takes wagon 10 with sac 406 in it, and reviews the operational instructions provided on wagon 10.

In box 454, passenger Dan places luggage $404_1$, $404_2$, and $404_3$ in sac 406 and proceeds towards security check station 201.

In box 456, after the security check, passenger Dan proceeds with wagon 10 towards check-in station 202.

In box 458, at check-in station 202, passenger Dan mounts wagon 10 on track system 110, using switch 54 (FIGS. 3C and 3D). Alternatively, sensor 309 (FIG. 10A) senses the approach of wagon 10 and starts the operation of motor 28.

In box 460, check-in attendant 205 weighs the luggage and attaches to sac 406 a luggage code 99, which preferably includes the number of pieces of luggage. Additionally, check-in attendant 205 may attach code 99 also to individual pieces $404_1$, $404_2$, and $404_3$, as a measure of safety, in case sac 406 is damaged.

In box 462, check-in attendant 205 enters passenger Dan's information and luggage code 99 into computer terminal 225, which is connected to $CMS_{departure}$ 82. Passenger Dan's information may include, for example, name, address, telephone number, cellular phone number, flight number, airline, destination, stopovers, departure date and time, estimated arrival time, and luggage code 99, preferably including the number of pieces of luggage.

In box 464, check-in attendant 205 preferably issues passenger Dan an electromagnetic card or a similar device, which may also include a beeper, and which corresponds to his passenger's information and luggage code 99.

In box 466, $CMS_{departure}$ 82 correlates the passenger Dan's information with luggage code 99 and code 13 (FIG. 3E) of wagon 10, as read by track sensor 120 (FIGS. 4A-4C) on track $A_i$. Thus, wagon 10 becomes wagon $10_{Dan}$.

In box 468, $CMS_{departure}$ 82 directs wagon 10 with luggage $404_1$, $404_2$, and $404_3$, in sac 406 to the proper airplane loading zone 204, of airplane 209, based on the passenger Dan's information, as will be described hereinbelow, in conjunction with FIG. 15.

In box 470, porters close sac 406 tightly and load it onto a platform, which is loaded onto airplane 209.

In box 472, passenger Dan walks over to the boarding gate for airplane 209.

It will be appreciated by persons skilled in the art, that straps 409 may be used in place of sac 406. Alternatively, ropes may be used.

Reference is now made to FIG. 15, which is a flowchart which schematically describes a method 500 of automatically directing wagon 10, containing luggage $404_1$, $404_2$, and $404_3$, to loading zone 204 of airplane 209, by $CMS_{departure}$ 82, in accordance with a preferred embodiment of the present invention. Luggage $404_1$, $404_2$, and $404_3$, may be contained in sac 406, strapped by straps 409, or simply placed in wagon 10.

In box 510, at check-in station 202, as passenger Dan mounts wagon 10 on track $A_i$ of track system 110, track sensor 120 reports to $CMS_{departure}$ 82 the position of wagon 10 which contains passenger Dan's luggage, and code 13 of that wagon 10.

In box 512, check-in attendant 205 weighs luggage $404_1$, $404_2$, and $404_3$, provides the luggage with code 99, and enters into terminal 225 of $CMS_{departure}$ 82 relevant passenger Dan's information, including the flight number and luggage code 99, preferably including the number of pieces of luggage.

In box 514, $CMS_{departure}$ 82 relates code 13 of wagon 10 on track $A_i$ to the information received from terminal 225 associated with the particular track $A_i$, and designates wagon 10 as wagon $10_{Dan}$.

In box 516, CMS$_{departure}$ 82 determines for wagon 10$_{Dan}$ a track path along track system 110 delineated by tracks and track sorting junctions from proximal end 213 of track A$_i$ to loading zone 204 of airplane 209.

In box 518, CMS$_{departure}$ 82 informs all servers and sub servers associated with movements of wagons along track system 110 of departure area 200 of the specific track path of wagon 10$_{Dan}$.

In box 520, servers and sub servers associated with movements of wagons along track system 110 of departure area 200 will move wagon 10$_{Dan}$ motion step by motion step in accordance with its track path, from proximal end 213 of track A$_i$ to loading zone 204 of airplane 209.

Figure 16B:
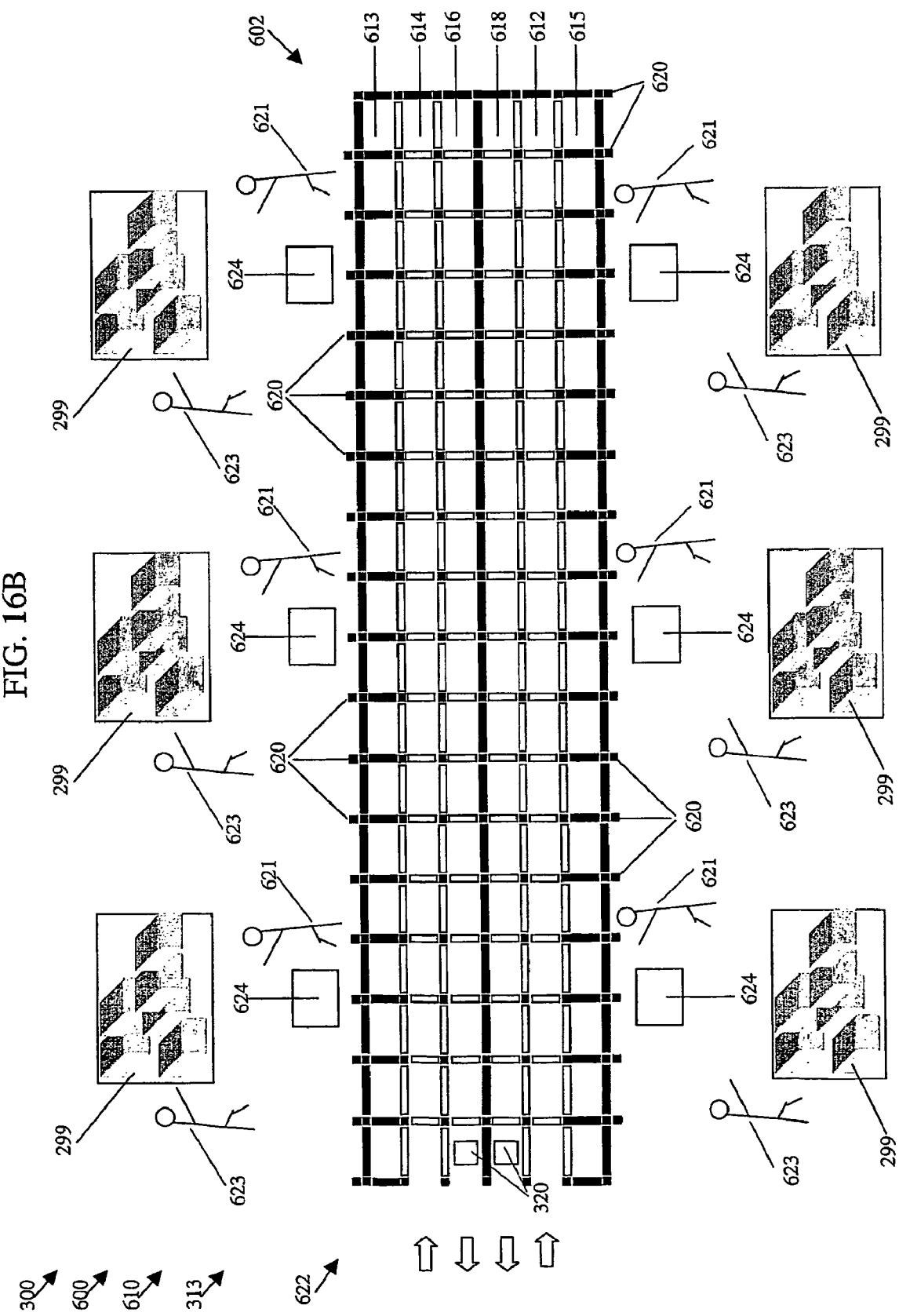
Figure 16C:
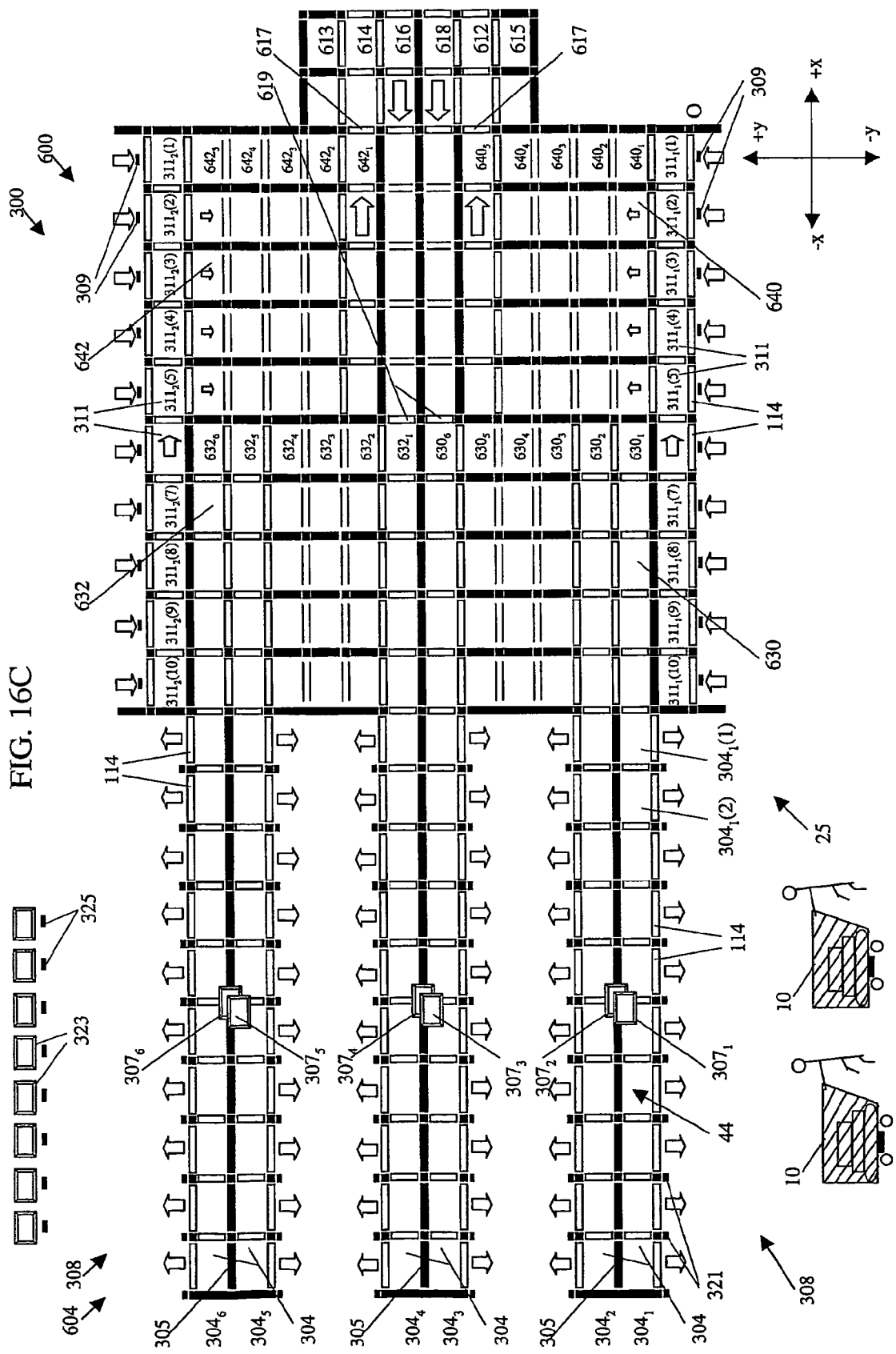

Reference is now made to FIGS. 16A-16C, which together schematically illustrate a track 600 of track system 110, for moving wagons 10 along it, in arrival area 300, in accordance with a first embodiment of the present invention. In a sense, the movement of wagons along track system 110 is simpler on arrival than during departure, since on arrival, all pieces of luggage from plane 209 are to be moved to the same luggage pick-up area 304, and it appears that no sorting is necessary.

However, it is desirable that passenger Dan will receive his three pieces of luggage together, so that where wagons 10 are used, it is desirable that luggage 404$_1$, 404$_2$, and 404$_3$ will all be on the same wagon 10, at arrival area 300. Where sacs 406 or straps 409 are used to form a single piece of luggage from 404$_1$, 404$_2$, and 404$_3$, this requirement is already fulfilled by the use of sacs 406 or straps 409.

As seen in FIG. 16A, arrival area 300 includes airplane-unloading zone 302 at a distal end 602 of track 600. Arrival area 300 may further include crane areas 299, forklift tracks 411 and movable platforms 407.

As seen in FIG. 16C, arrival area 300 includes arriving passenger area 308 and luggage pick-up tracks 304, at a proximal end 604 of track 600. Arrival area 300 further includes empty-wagon transfer systems 311.

As seen in FIG. 16B, track 600 includes a wagon-loading track system 610, which leads from empty-wagon collection system 311 (FIG. 16C) to wagon-loading zone 313, and from there in a reverse direction, to arriving passenger area 308 (FIG. 16C). Preferably, wagon-loading track system 610 is a six-lane track, having two outmost lanes 615 and 613, for loading wagons 10, two middle lanes 612 and 614, for moving empty wagons 10 from empty-wagon transfer system 311 to wagon-loading zone 313, and two innermost lanes 618 and 616, for moving loaded wagons 10 from wagon-loading zone 313 to arriving passenger area 308. Track system 610 defines an x direction, in the direction of wagon movement on tracks 612 and 614 and a y direction, in the direction of wagon movement from track 614 to track 613.

Track system 610 is controlled by the following threads:

1. Threads Th-612 and Th-614, which move empty wagons 10 in the +x direction, along tracks 612 and 614, and across an interface 617 (FIG. 16C, described hereinbelow). For thread Th-612 to operate, track 612 must be clear of loaded wagons 10, and thread Th-612 must take control over all of track 612. Similarly, for thread Th-614 to operate, track 614 must be clear of loaded wagons 10, and thread Th-614 must take control over all of track 614. Threads Th-612 and Th-614 are operative to move empty wagons 10 to the distal most cells in tracks 612 and 614, respectively. Thread Th-612 will position empty wagons 10 only in cells of track 612, adjacent to vacant cells in track 615.

Similarly, Thread Th-614 will position empty wagons 10 only in cells of track 614, adjacent to vacant cells in track 613. Preferably, thread Th-612 operates whenever there are at least 5 vacant cells in loading track 615. Similarly, thread Th-614 operates whenever there are at least 5 vacant cells in loading track 613. Alternatively, another number of vacant cells may be used to call on threads Th-612 and Th-614.

2. Threads Th-616 and Th-618, which reduce loaded wagons 10 in the −x direction, along tracks 616 and 618, towards arriving passenger area 308 (FIG. 1). For thread Th-616 to operate, it must take control over all of track 616.

Similarly, for thread Th-618 to operate, it must take control over all of track 618. Threads Th-616 and Th-618 are operative to reduce loaded wagons 10 along tracks 616 and 618 and across interface 619, described hereinbelow, conjunction with FIG. 16C, arranging loaded wagons 10 in the cells closest to interface 619.

3. Threads Th-612-to-615 and Th-614-to-613, which move empty wagons 10 in the y direction to loading tracks 615 and 613. For thread Th-612-to-615 to operate, thread Th-612 must release control over track 612. For thread Th-614-to-613 to operate, thread Th-614 must release control over track 614.

4. Threads Th-615-to-618 and Th-613-to-616, which move loaded wagons 10 in the y direction to tracks 618 and 616, the tracks in which loaded wagons 10 are directed from wagon-loading zone 313 to arriving passenger area 308 (FIG. 1).

For thread Th-615-to-618 to operate, thread Th-612 must release control over track 612, and thread Th-618 must release control over track 618. For thread Th-613-to-616 to operate, thread Th-614 must release control over track 614, and thread Th-616 must release control over track 616. However, threads Th-615-to-618, Th-613-to-616, Th-612-to-615 and Th-614-to-613, may operate in parallel, since they are all operating in the y direction.

In accordance with a first embodiment of the present invention, in the point-of-origin airport, passengers' luggage was arranged in sacs 406 (FIG. 1C) or was strapped in straps 409 (FIG. 1D), individually for each passenger, and was placed on movable platforms 407 (FIG. 1A) which were loaded onto airplane 209 (FIG. 1A). As seen in FIG. 16A, when airplane 209 arrives at the destination airport, movable platforms 407, on which the passengers' pieces of luggage are arranged, are unloaded at unloading zone 302, and brought, preferably by lift-fork trucks 411, to crane areas 299 of wagon-loading zone 313.

Preferably, at wagon-loading zone 313, each platform 407 is placed in a crane area 299, for which a crane 624 and a crane operator 623 are responsible. Preferably, wagon-loading zone 313 includes several crane areas 299, several cranes 624, and several crane operators 623, wherein crane 624, crane operator 623, and crane area 299 are generally in communication with a fixed number of track cells of loading tracks 615 and 613. For example, each crane 624, crane operator 623, and crane area 299 may be responsible for six cells of loading tracks 615 or 613. Alternatively, the number of cells for which each crane 624, crane operator 623, and crane area 299 are responsible may vary from flight to flight, depending on the extent of the passenger and luggage traffic.

After platforms 407 arrive to crane areas 299, crane operators 623 begin to load empty wagons 10 in cells in loading tracks 615 and 613, one wagon at a time.

Preferably, a porter 621 mans each crane area 299. The tasks of porter 621 are to open sacs 406, and to display the pieces of luggage therein, or to open straps 409. Additionally, porters 621 press keys 620, adjacent to each cell in loading tracks 615 and 613, to inform $CMS_{arrival}$ 92 that the wagon 10 of the specific track cell whose key 620 has been pressed is ready. Alternatively, porters 621 are not employed; rather, crane operators 623 activate keys 620 of a specific cell, for example, by remote control, and the passengers open sacs 406 or straps 409 of their luggage, when they receive it.

Thus, empty wagons 10 are brought to loading tracks 615 and 613 by threads Th-612 and Th-614, which move empty wagons 10 in the +x direction, along tracks 612 and 614, and by threads Th-612-to-615 and Th-614-to-613, which move empty wagons 10 in the y direction to loading tracks 615 and 613. In tracks 615 and 613, wagons 10 are loaded by crane operators 623, and cranes 624. After wagons 10 have been loaded, porters 621 opens sacs 406 or straps 409, and press keys 620 in cells of wagons whose handling is complete, to inform $CMS_{arrival}$ 92 of each wagon that is ready. Threads Th-615-to-618 and Th-613-to-616 then move loaded wagons 10 in the y direction to tracks 618 and 616, and threads Th-618 and Th-616 reduce loaded wagons 10 in the -x direction, along tracks 618 and 616, towards arriving passenger area 308.

Preferably loaded wagons 10 go through a scanner gate 320, positioned on each of lanes 616 and 618 at a proximal end 622 of track system 610. Scanner gate 320 reads luggage code 99 of sac 406, while track sensor 120 reads code 13 of wagon 10 at that position. Both readings are reported to $CMS_{arrival}$ 92 of the destination airport. Preferably, $CMS_{arrival}$ 92 has received from $CMS_{departure}$ 82 of the point-of-origin airport the passenger information and luggage code for each arriving passenger. Therefore, $CMS_{arrival}$ 92 of the arrival airport can identify wagon 10 which contains the luggage of passenger Dan, or wagon $10_{Dan}$.

As seen in FIG. 16C, arriving passenger area 308 includes luggage pick-up tracks 304, and track sections 630 and 632 of track 600, which connect track system 610 (FIG. 16B) and luggage pick-up tracks 304. Preferably, track sections 630 and 632 are multi-lane track sections, which define an x direction, parallel to the x direction of track system 610 and a y direction, parallel to the y direction of track system 610. In the description of the operation of track sections 630 and 632, an index system is used, in which i denotes cells along the x-axis and j denotes cells along the y-axis, as $630_j(i)$, or $632_j(i)$. Point O is the 0,0 point. Thus $630_1$ denotes a row of $630_{j=1}$.

Preferably, the arrangement illustrated in FIG. 16C includes a plurality of luggage pick-up tracks 304, for example, six luggage pick-up tracks 304. Alternatively, any other number of luggage pick-up tracks 304 is possible. In the description of the operation of luggage pick-up tracks 304, an index system, similar to that used for track sections 630 and 632, is used, in which i denotes cells along the x-axis and j denotes cells along the y-axis, wherein each luggage pick-up track is denoted as $304_j$ and each cell is denoted as $304_j(i)$, with respect to point O.

Additionally, in the arrangement of six luggage pick-up tracks 304, illustrated in FIG. 16C, luggage pick-up pairs $304_1;304_2$, $304_3;304_4$, and $304_5;304_6$ share common fixed walls 305. Additionally, each cell $304_j(i)$ includes external-wall section 114 on a side parallel to fixed wall 305. It may be recalled from the discussion hereinabove, in conjunction with FIG. 4A, that external-wall sections 114 of cell $304_j(i)$ may be lowered, by a drive (not shown), so as to be flush with pavement 25 and track floor 44, independently for each cell $304_j(i)$, to allow wagon 10 in cell $304_j(i)$ to roll out of the cell, on ball bearings 22 (FIG. 3A). Preferably, external-wall section 114 of cell $304_j(i)$ is lowered and raised, responsive to a command from key 55 (FIG. 3C) of wagon 10 in cell $304_j(i)$. Alternatively, external-wall section 114 of cell $304_j(i)$ is lowered and raised, responsive to a code entered into control panel 51 (FIG. 3C) of wagon 10 in cell $304_j(i)$. Alternatively, external-wall section 114 of cell $304_j(i)$ is lowered and raised, responsive to a magnetic card or a code entered into a reader 321 of cell $304_j(i)$. The code may be a number or a password, or an electromagnetic code on a card, a smartcard, or a similar device. Preferably, the code identifies the person that enters it as the person associated with the luggage on the particular wagon 10 in cell $304_j(i)$. Preferably, only a person associated with the luggage may remove wagon 10 from cell $304_j(i)$.

Additionally, track 600 includes empty-wagon transfer systems 311 and loaded wagon transfer systems 640 and 642 which are multi-lane tracks that connect between empty-wagon transfer systems 311 and track system 610 (FIG. 16B). Track systems 311, 640 and 642 may also be indexed as $311_j(i)$, $640_j(i)$, and $642_j(i)$. Each cell $311_j(i)$ includes at least one external wall section 114 which may be lowered in order to mount an empty wagon onto the track. Preferably, the system of mounting wagons onto track system 311 is similar to that of mounting wagons at check-in counters 202 (FIG. 1A), wherein external-wall section 114 of cell $311_j(i)$ is lowered and raised, responsive to a command from key 55 (FIG. 3C) of wagon 10, which is approaching cell $311_j(i)$. Alternatively, external-wall section 114 of cell $311_j(i)$ is lowered and raised, responsive to a command from sensors 309 next to each cell $311_j(i)$. Additionally, motor 28 (FIG. 3A) begins to operate as external-wall section 114 of cell $311_j(i)$ is lowered. Alternatively, switch 54 (FIG. 3C) is used to start motor 28.

In accordance with the present invention, a plurality of threads controls the movements of loaded wagons 10 from track system 610 (FIG. 16B) to luggage pick-up tracks 304, and from empty-wagon transfer systems 311 to track system 610.

Preferably, after passengers remove wagons 10 from luggage pick-up tracks $304_j$, vacating cells $340_j(i)$, threads Th-$304_j$ reduce wagons in the -x direction along tracks $304_j$ from an interface 619 towards proximal end 604, as follows:

After wagons 10 are removed from luggage pick-up track $304_1$, vacating cells in row $630_1$, thread Th-$304_1$ further reduces wagons 10 from cells in rows $630_5$-$630_3$ to luggage pick-up track $304_1$. Similarly, as wagons 10 are removed from luggage pick-up track $304_2$, vacating cells in row $630_2$, thread Th-$304_2$ further reduces wagons 10 from cells in rows $630_5$-$630_3$ to luggage pick-up track $304_2$. Furthermore, as wagons 10 are removed from cells in rows $630_5$-$630_3$, a thread Th-630 takes control over all of track 618 (FIG. 16B) and rows $630_6$- $630_3$, reducing wagons 10 from track 618 to cells in rows $630_5$- $630_3$.

Similarly, after wagons 10 are removed from luggage pick-up track $304_6$, vacating cells in row $632_6$, thread Th-$304_6$ further reduces wagons 10 from cells in rows $632_2$-$632_4$ to luggage pick-up track $304_6$. Similarly, as wagons 10 are removed from luggage pick-up track $304_5$, vacating cells in row $632_5$, thread Th-$304_5$ further reduces wagons 10 from cells in rows $632_2$-$632_4$ to luggage pick-up track $304_5$. Furthermore, as wagons 10 are removed from cells in rows $632_2$-$632_4$, a thread Th-632 takes control over all of track 616 (FIG. 16B) and rows $632_1$-$632_4$, reducing wagons 10 from track 616 to cells in rows $632_2$- $632_4$.

In the present example, the situation with regard to luggage pick-up tracks $304_3$, and $304_4$ is somewhat different. After wagons 10 are reduced in luggage pick-up track $304_3$, vacating cells in rows $630_6$, thread Th-$304_3$ takes control over all of track 618 (FIG. 16B) and track $304_3$, reducing wagons 10 from track 618 to track $304_3$. Similarly, as wagons 10 are reduced in luggage pick-up track $304_4$, vacating cells in rows $632_1$, thread Th-$304_4$ takes control over all of track 616 (FIG. 16B) and track $304_4$, reducing wagons 10 from track 616 to track $304_4$.

Figure 28:
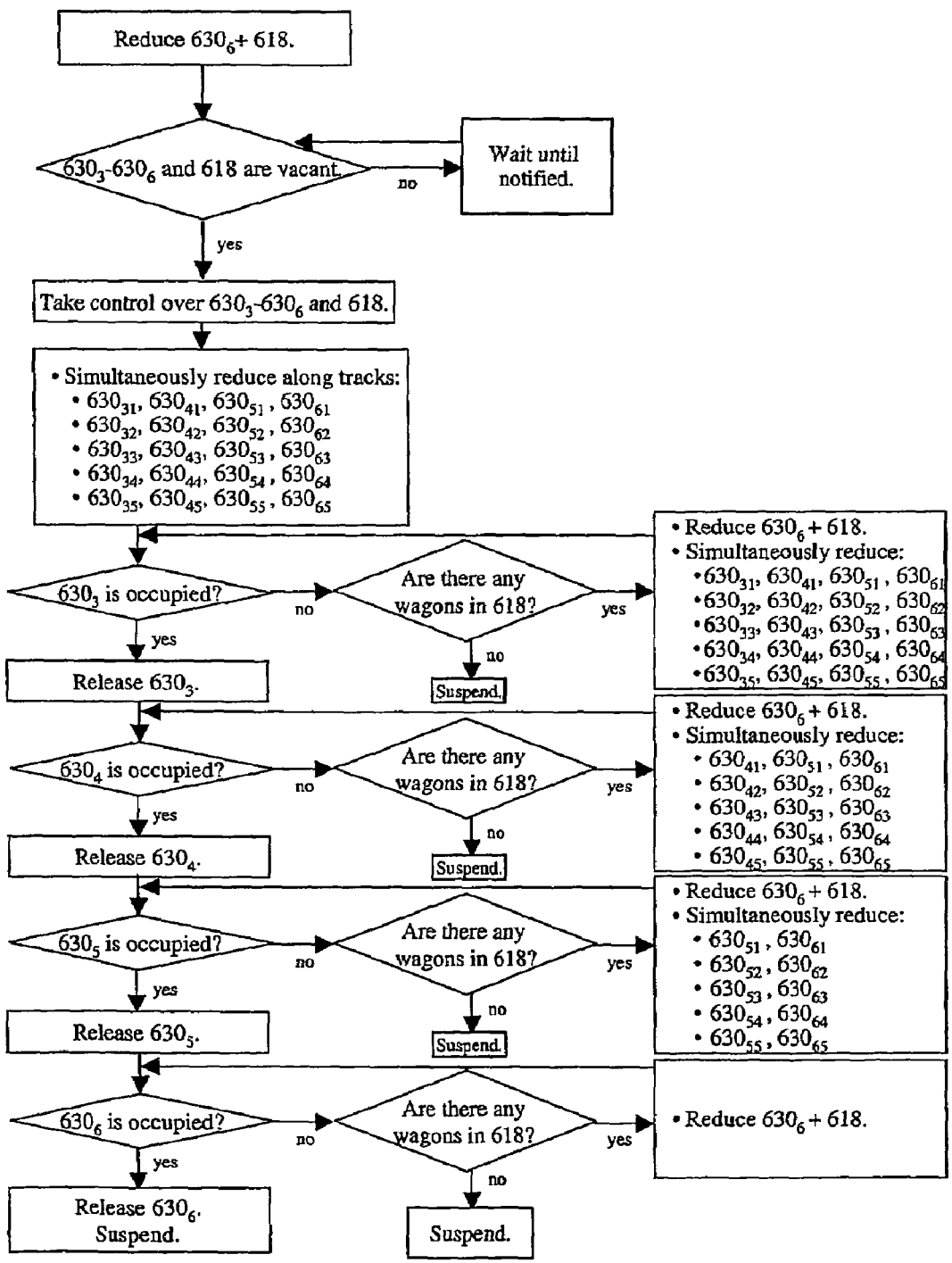

The manner by which wagons 10 are moved in tracks 630, 632 and 304 is further described and characterized in the flow diagrams of FIGS. 27A-28, in accordance with non-limiting embodiments of the present invention.

It should be noted that threads Th-$304_1$-Th-$304_6$ do not operate when passengers remove wagons from tracks $304_1$-$304_6$. When these threads operate, passengers may not remove wagons 10. Preferably, electronic displays $307_1$-$307_6$, preferably positioned on walls, easily viewed by all passengers who are associated with each of tracks $304_1$-$304_6$, inform passengers when wagons may be removed from tracks $304_1$-$304_6$.

Additionally, after wagons 10 are mounted on empty-wagon transfer system $311_1$, a thread Th-$311_1$ reduces wagons 10 in the +x direction along track $311_1$ towards distal end 602 (FIG. 16B). In the present example, when cells $311_1$(1)-$311_1$(5) are occupied with empty wagons, a thread Th-640 reduces wagons 10 in the +y direction from cells $311_1$(1)-$311_1$(5) to row $640_5$, which is also the proximal portion of track 612. When row $640_5$ is fully occupied, thread Th-612 takes control over all of track 612 across interface 617 to distal end 602 moving empty wagons 10 in the +x direction, as has been described in conjunction with FIG. 16B.

Similarly, after wagons 10 are mounted on empty-wagon transfer system $311_2$, a thread Th-$311_2$ reduces wagons 10 in the +x direction along track $311_2$ towards distal end 602 (FIG. 16B). In the present example, when cells $311_2$(1)-$311_1$(5) are occupied with empty wagons, a thread Th-642 reduces wagons 10 in the -y direction from cells $311_2$(1)-$311_2$(5) to row $642_1$, which is also the proximal portion of track 614. When row $642_1$ is fully occupied, thread Th-614 takes control over all of track 614 across interface 617 to distal end 602 moving empty wagons 10 in the +x direction, as has been described in conjunction with FIG. 16B.

Preferably, arriving passenger area 308 further includes monitors 323, and preferably, magnetic card readers 325 which a passenger may use. By inserting his electromagnetic card (not shown), issued by check-in attendant 205 (FIG. 1A), or by punching a code given to him by check-in attendant 205, passenger Dan may check on the whereabouts of wagon $10_{Dan}$. Preferably, when wagons 10 from a specific flight arrive to luggage pick-up tracks 304, passenger Dan may learn which specific row $304_j$ contains his wagon $10_{Dan}$. Alternatively or additionally, if passenger Dan was issued a beeper, it will beep when wagon $10_{Dan}$ has arrived to luggage pick-up tracks 304, so that the passenger Dan will know to check monitor 323, using magnetic card reader 325 and his magnetic card, to see in which row $304_j$ wagon $10_{Dan}$ is. Alternatively or additionally, if passenger Dan has a cellular phone, $CMS_{arrival}$ 92 may call him with a message such as:

"Dan, your luggage has arrived and is waiting for you at cell $304_j(i)$.

We are happy to serve you, have a nice day."

Alternatively or additionally, electronic displays $307_1$-$307_6$, which are preferably positioned on walls, easily viewed by all passengers, and are associated with each of tracks $304_1$-$304_6$, display the names of passengers whose luggage arrived, and the specific cells $304_j(i)$ where the luggage of each passenger is.

Thus, passenger Dan need not stand by conveyer belts, on edge. He may sit at a lounge and read a paper, or talk to his receiving party until notified that his luggage has arrived. When he walks over to wagon $10_{Dan}$, display panel 59 (FIG. 3C) may display his name for confirmation.

Further description and characterization of the algorithms associated with FIGS. 16B-16C, in accordance with non-limiting embodiments, are given in Appendix A-3.

Figure 17B:
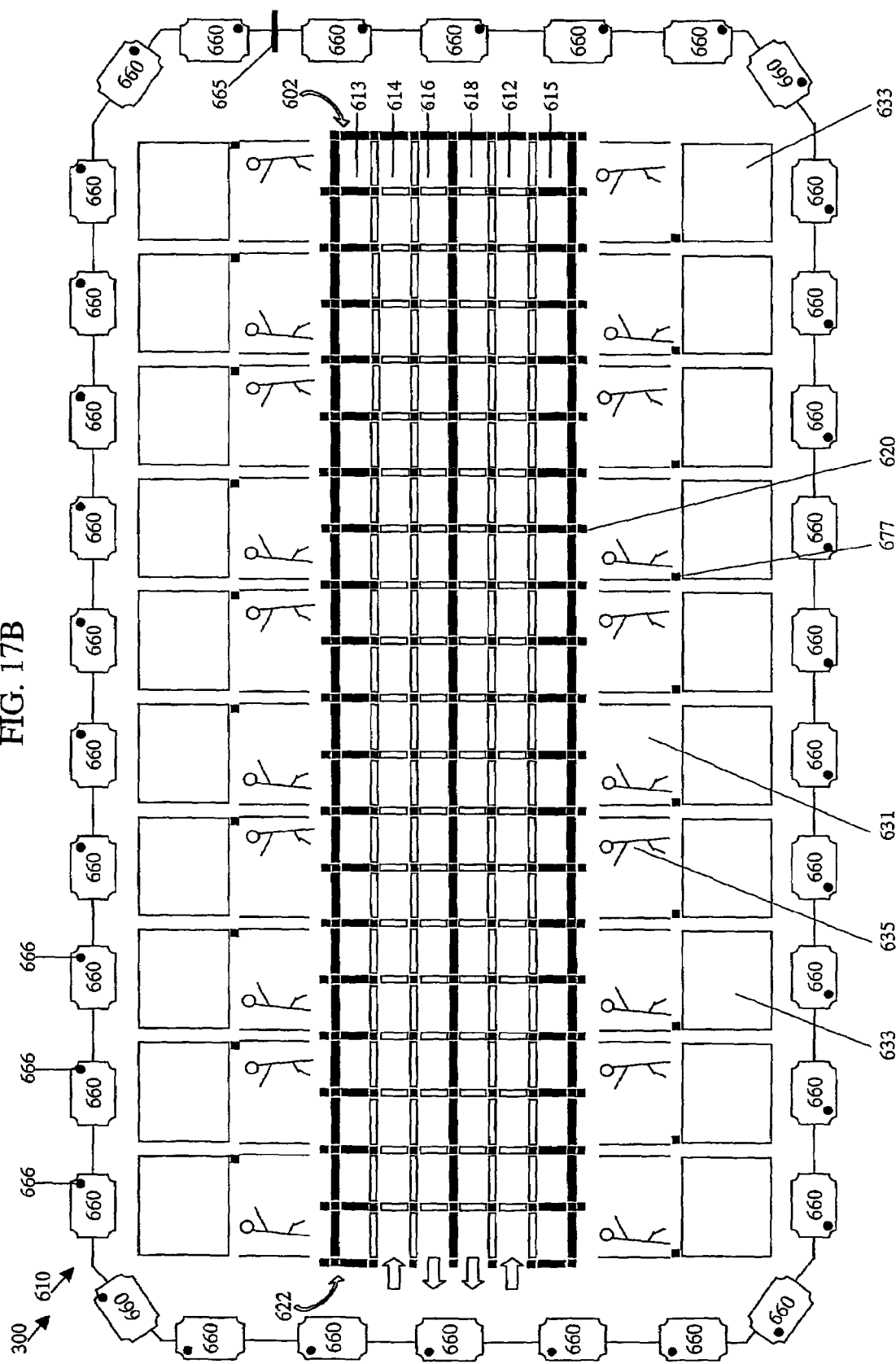

Reference is now made to FIGS. 17A and 17B, which together schematically illustrate track system 610, and a system of trays 660, arranged for sorting pieces of luggage, by passenger, into wagons 10, in accordance with a second embodiment of the present invention. In this way, passenger Dan will receive his three pieces of luggage, $404_1$, $404_2$, and $404_3$ together, on a single wagon 10, at the destination airport.

In jumbo planes, luggage is generally arranged in containers, wherein each container includes, on the average, 40 pieces of luggage. Thus, although several hundred passengers may have flown in airplane 209, the airplane in which passenger Dan flew, and although the number of pieces of luggage is generally 160% greater than the number of passengers, the luggage in each container belongs to only about 25 people. Preferably, the several pieces of luggage from a single wagon 10 are loaded onto a single container. Thus, the luggage in each container needs to be sorted only amongst about 25 wagons 10.

Other types of planes do not use containers. Rather, luggage is brought to the planes on platforms, which like containers, generally include the luggage of about 25 people. The luggage is spread inside the plane. Preferably, where platforms are used, it is recommended that the luggage of each platform is color-coded by the porters, before loading onto the airplane. When the plane is unloaded, at the destination airport, the porters may arrange the luggage by color code, so as to reconstruct, at the destination airport, the original platform arrangement of the point-of-origin airport. In this way again, the several pieces of luggage of a single wagon 10, belonging to a single passenger, will in all likelihood, be handled together.

Luggage from airplane 209 is unloaded into airplane-unloading zones 302. From there, it is brought, preferably by vehicle, to tray-loading zone 315. Preferably, the luggage is brought in groups of about 40 pieces, representing the contents of a single container, or representing the contents of a single point-of-origin platform, wherein due to the arrangements in the containers, or due to color code, the several pieces of luggage of a single passenger are generally included in a single group of 40 luggage pieces.

Preferably, porters 317, at tray-loading zone 315, load the luggage onto trays 660, placing a single piece of luggage on each tray 660. Preferably, trays 660 are arranged on a conveyer belt 662, or a similar arrangement, which rotates around track system 610. In the example depicted in FIGS. 17A-17B rotation is in a counterclockwise direction.

Preferably, tracks 615 and 613 of track system 610 include 20 cells each, although another arrangement may be possible. Preferably trays 660 are arranged to tilt so as to stand nearly on end, much like a tipper truck unloading its cargo, spilling their luggage onto slides 633, arranged between trays 660 and cells of tracks 613 and 615. Preferably, porters 635 stand in porter areas 631, between slides 633 and wagons 10, and transfer the pieces of luggage from slides 633 to wagons 10 in cells of loading tracks 613 and 615.

In accordance with a preferred embodiment of the present invention, each porter 635 and slide 633 are in communication with two adjacent cells of loading tracks 613 and 615, forming loading cell pairs. The reason for this is that when wagon 10 of a specific cell is loaded, porter 635 may begin working on its adjacent wagon, rather than having to wait until another empty wagon arrives. However, in accordance with the present invention, porter 635 loads only one wagon 10, located in one of the cells of the loading cell pairs, from a single tray 660, at a time.

In accordance with a preferred embodiment of the present invention, a reader 665 is arranged along conveyer belt 662, arranged to read luggage code 99 of each piece of luggage on each tray 660, as it passes by reader 665, indicating that one of three pieces of luggage of a particular passenger is on tray 660 that has past by reader 665. Reader 665 may be for example, an optical scanner. Reader 665 is in communication with $CMS_{arrival}$ 92.

In accordance with a preferred embodiment of the present invention, each tray 660 has a specific designation, for example, $660_1$, $660_2$, $660_3$. Additionally, each tray 660 has a driver (not shown) and a communication embedded controller 666, for wireless communication with $CMS_{arrival}$ 92. Alternatively, trays 660 are in communication with $CMS_{arrival}$ 92, only when they are adjacent to reader 665, for example, via a communication device that makes contact with each tray 660, and receive instructions from $CMS_{arrival}$ 92 then.

In accordance with a preferred embodiment of the present invention, after porters 317 load a piece of luggage to tray 660, for example, tray $660_{23}$, tray $660_{23}$ passes by reader 665, which reads luggage code 99 of the piece of luggage. Reader 665 then reports luggage code 99 to $CMS_{arrival}$ 92. If luggage code 99 indicates that there are several pieces of luggage of the same code, for example, if the luggage code is 4444-3, indicating there are three pieces of luggage that belong to the same passenger, $CMS_{arrival}$ 92 checks if another piece of luggage coded 4444-3 has already been unloaded onto any of wagons 10 in loading tracks 615 or 613.

When the first piece of luggage coded 4444-3 passes by reader 665, carried for example, by tray 66023, $CMS_{arrival}$ 92 will direct tray $660_{23}$ to the nearest cell in loading tracks 613 or 615, where an empty wagon 10 is available and ready to be loaded, and where porter 635 is not involved with the loading of another wagon 10, in an adjacent cell of the loading cell pairs. Indexing loading-track cells as 613(i) and 615(i), $CMS_{arrival}$ 92 may instruct tray $660_{23}$ to unload its piece of luggage at cell 615(3). Additionally, by reading code 13 (FIG. 3E) of wagon 10 at cell 615(3), $CMS_{arrival}$ 92 can identify the particular wagon 10 with the pieces of luggage coded 4444-3.

When the second piece of luggage coded 4444-3 passes by reader 665, carried for example, by tray $660_{15}$, $CMS_{arrival}$ 92, will direct tray $660_{15}$ to unload its piece of luggage at cell 615(3).

When the third piece of luggage coded 4444-3 passes by reader 665, carried for example, by tray $660_7$, $CMS_{arrival}$ 92, will direct tray $660_7$ to unload its piece of luggage at cell 615(3).

Preferably, porters 635 in porter areas 631, between slides 633 and wagons 10, are also in communication with $CMS_{arrival}$ 92, for example, via ear phones, or a signal light. Thus when tray $660_7$ unloads the third piece of luggage of the luggage coded 4444-3 onto wagon 10 in cell 615(3), $CMS_{arrival}$ 92 signals porter 635 that all pieces of luggage of the same luggage code, have been unloaded onto wagon 10 at cell 615(3).

Preferably, each slide 633 is equipped with a key 677 which porter 635 presses to inform $CMS_{arrival}$ 92 that all pieces of luggage of a same luggage code have been removed from slide 633, and that both slide 633 and the loading cell pair may receive pieces of luggage of another code.

Additionally, after loading wagon 10 of all the pieces of luggage of the same luggage code, porter 635 presses key 620, adjacent to cell 615(3), to inform $CMS_{arrival}$ 92 that the wagon 10 of cell 615(3) is ready. Control of the wagon is then transferred to $CMS_{arrival}$ 92, which is responsible for the movement and reducing of the wagon from the track-loading cell to passenger pick-up tracks 304.

Thread Th-615-to-618 will reduce loaded wagons 10 in the y direction to tracks 618, and threads Th-612 and Th-612-to-615 will move an empty wagon 10 to cell 615(3).

In accordance with a preferred embodiment of the present invention, the arrangement of track system 610 and of trays 660 is such that no piece of luggage needs to circle around track system 610 more than one complete cycle. Generally, each piece of luggage will make only a portion of a cycle, before being assigned to a specific wagon 10.

Reference is now made to FIGS. 18A-18E, which together, schematically illustrate a tray means 700 for automatically sorting and loading luggage onto wagons 10, located in loading tracks 615 and 613, in accordance with a third embodiment of the present invention.

Figure 18A:
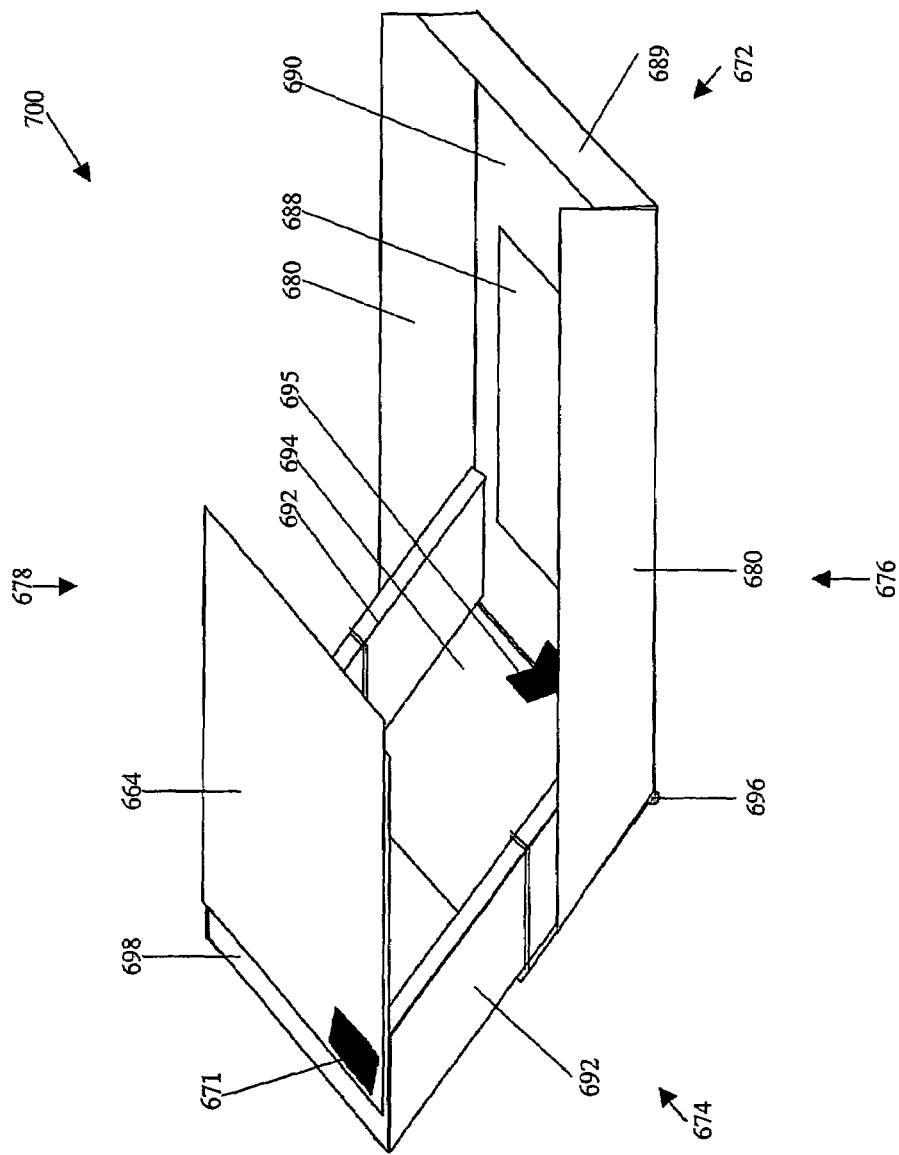

As seen in FIG. 18A, tray 700 is boat-like in shape and includes a bow-like proximal end 674 and a stem-like distal end 672, wherein proximal and distal are described with respect to wagon 10. Tray 700 further includes a bottom side 676 and a top side 678. Additionally, tray 700 includes sides 680, a bottom 690, a back 689 at distal end 672, and a slanted swinging door 694, arranged on hinges 696, at proximal end 674.

Furthermore, tray 700 includes two slanted telescopic bars 692, parallel to slanted swinging door 694, at proximal end 674. Slanted telescopic bars 692 support a top 698 and are arranged for telescopically extending and contracting in length, by a driver 686, preferably located within one of slanted telescopic bars 692, as seen in FIG. 18B. Driver 686 responds to commands of a controller 684, preferably also located within one of slanted telescopic bars 692, adjacent to driver 686. Furthermore, driver 686 is sensitive to resistance, and will stop contracting slanted telescopic bars 692, when it meets with resistance.

Additionally, door 694 includes a drive 695, such as an electric motor, for selectably swinging door 694 open. Drive 695 is in communication with controller 684.

Preferably, top 698 includes a sliding section 664 and a driver 671, wherein driver 671 in communication with controller 684. Sliding section 664 is arranged for extending top 698, by automatically sliding towards distal end 672. Additionally, bottom 690 includes a pressure-sensitive area 688, similar for example, to a supermarket checkout-counter scale, in communication with controller 684. Preferably, pressure-sensitive area 688 generally covers bottom 690 so that when a piece of luggage is placed on bottom 690, it will be sensed by pressure-sensitive area 688.

Figure 18D:
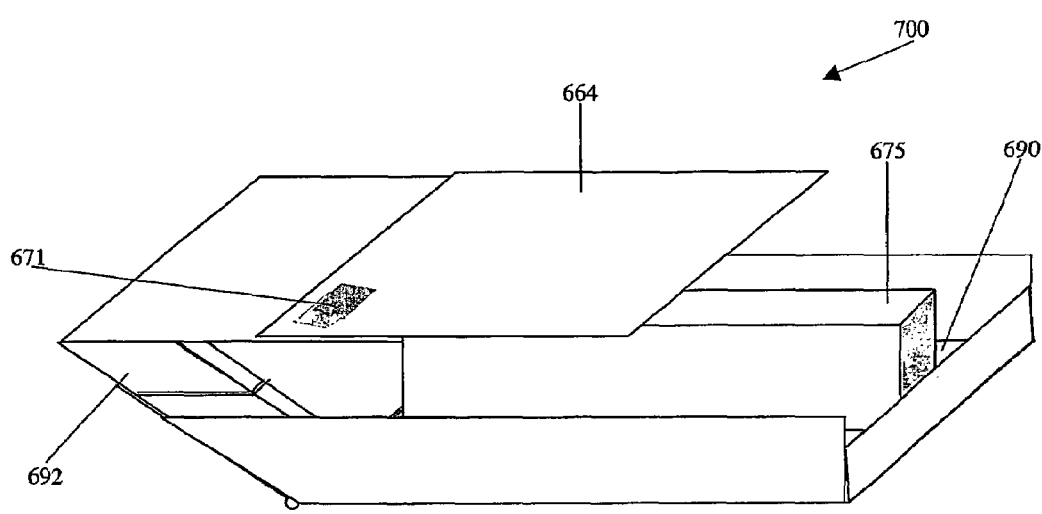
Figure 18E:
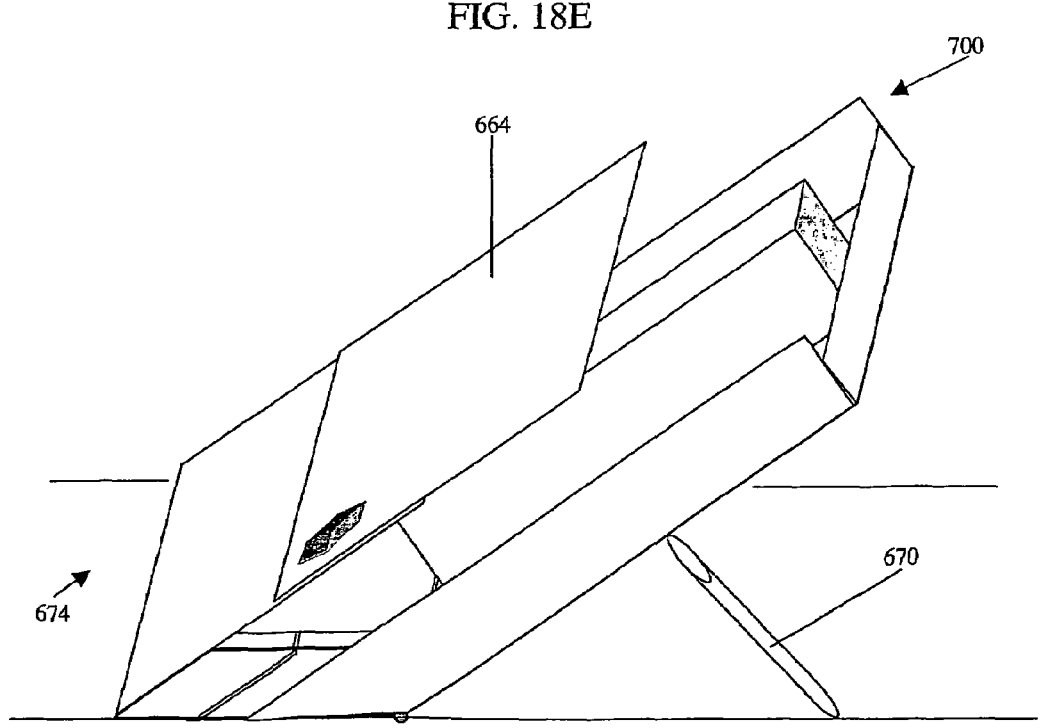

As seen in FIGS. 18C-18E, when a piece of luggage 675 is placed on bottom 690, pressure-sensitive area 688 (FIG. 18A) reports to controller 684 (FIG. 18B). Controller 684 will then take the following steps:

1. activate driver 671, to slide section 664 fully outward to generally cover bottom 690;
2. activate driver 686, to telescopically contract slanted telescopic bars 692, until top 698 or sliding section 664 meets with the resistance of luggage 675, thus holding luggage 675 in place; and
3. activate a driver 670, to tilt tray 700, standing it on its bow at proximal end 674.

Additionally, when piece of luggage 675 is removed from bottom 690, pressure-sensitive area 688 reports to controller 684. Controller 684 then takes the following steps:

1. activates drive 670 to lower tray 700 so that bottom 690 is parallel with the horizontal plane;
2. activates drive 686, to fully extend slanted telescopic bars 692; and
3. activates drive 671, to slide section 664 fully inwards, towards proximal section 674.

Figure 18F:
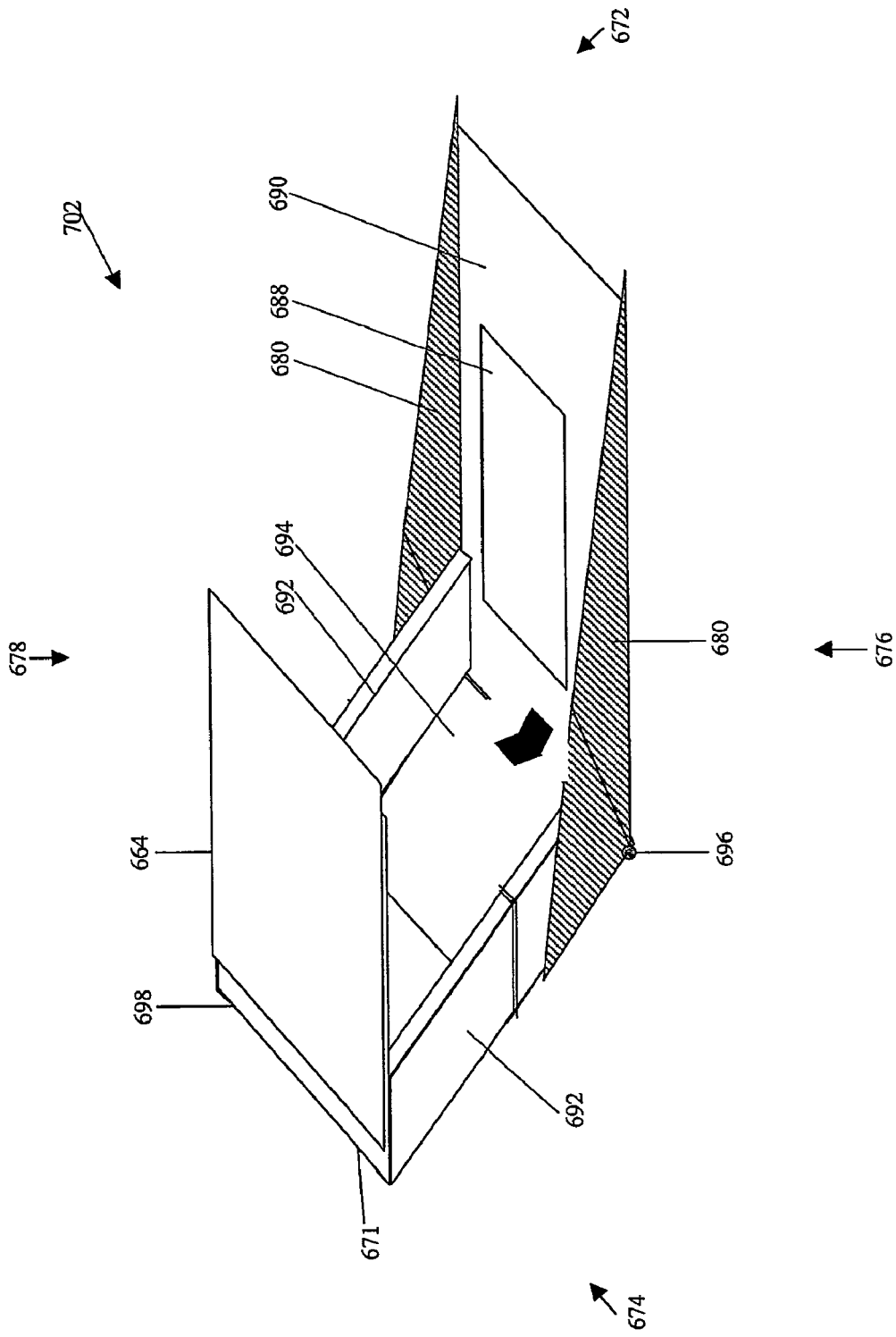
FIG. 18F illustrates a tray which does not include a back and which has triangular-shape sides, in accordance with an alternative embodiment of the invention.

Reference is now made to FIG. 18F, which illustrates a tray 700 which does not include back 689 and which has triangular-shape sides 680, in accordance with an alternative embodiment of the invention.

Figure 19:
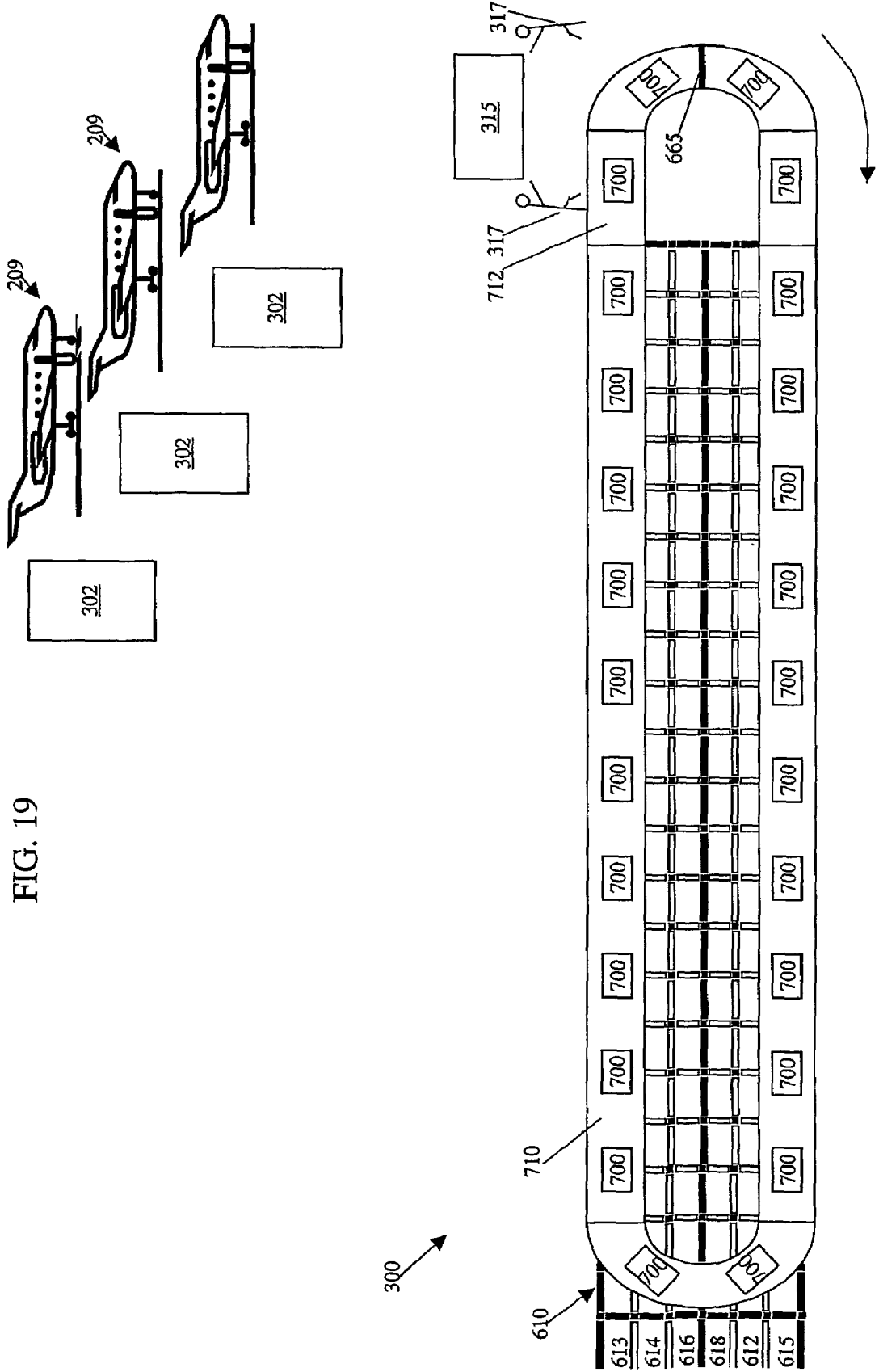
FIG. 19 schematically illustrates a conveyer belt system on which trays are mounted, in accordance with the third embodiment of the present invention.

Reference is now made to FIG. 19, which schematically illustrates a conveyer belt system 710 on which trays 700 are mounted, in accordance with the third embodiment of the present invention. Conveyer belt system 710 moves in a clockwise direction.

Luggage from airplane 209 is unloaded into airplane-unloading zones 302. From there, it is brought, preferably by vehicle, to tray-loading zone 315. Preferably, the luggage is brought in groups of about 40 pieces, representing the contents of a single container, or representing the contents of a single point-of-origin platform, wherein due to the arrangements in the containers, or due to color code, the several pieces of luggage of a single wagon 10 of the point-of-origin airport are generally included in a single group of 40 luggage pieces.

Preferably, porters 317, at tray-loading zone 315, load the luggage onto trays 700, placing a single piece of luggage on each tray 700.

Preferably, conveyer belt system 710 is arranged over track system 610, so that trays 700 are directly over loading tracks 615 and 613. Conveyer belt system 710 further includes a tray loading section 712. Preferably, after a piece of luggage is placed in tray 700, by porter 317, tray 700 passes by reader 665 which reads luggage code 99, and reports the reading to $CMS_{arrival}$ 92. $CMS_{arrival}$ 92 then informs controller 684 (FIG. 18B) at which cell the piece of luggage is to be unloaded, as has been described hereinabove, in conjunction with FIGS. 17A-17B.

Preferably, after passing by reader 665 (FIG. 19), controller 684 (FIG. 18B) activates driver 671 (FIG. 18A), to slide section 664 fully outward to generally cover bottom 690, activates driver 686 (FIG. 18B), to telescopically contract slanted telescopic bars 692 (FIG. 18A), until top 698 (FIG. 18A) of sliding section 664 meets with the resistance of luggage 675 (18C), thus holding luggage 675 in place; and activates drive 670 (FIG. 18E), to tilt tray 700, standing it on its bow at proximal end 674. Thus, loaded tray 700 rotates around track system 610 standing on its bow.

Preferably, the number of cells in loading tracks 613 and 615 is greater than the number of trays 700 on conveyer belt 710, for example, the number of cells may be double the number of trays. Thus, each loaded tray makes no more than one complete revolution on conveyer belt 710, before unloading its contents. Preferably, $CMS_{arrival}$ 92 arranges the loading of wagons 10 in loading tracks 613 and 615, so that loading is evenly distributed amongst the cells of loading tracks 613 and 615.

When a specific tray 700 is over a cell in which it is to unload its piece of luggage, controller 684 commands a drive 695 to gradually open door 694, thus allowing the piece of luggage to slide out gently and smoothly into wagon 10 in the proper cell.

Reference is now made to FIGS. 20A-20E, which together schematically illustrate the procedure of loading wagons 10 by conveyer belt system 710 and trays 700, in accordance with the third embodiment of the present invention.

Figure 20A:
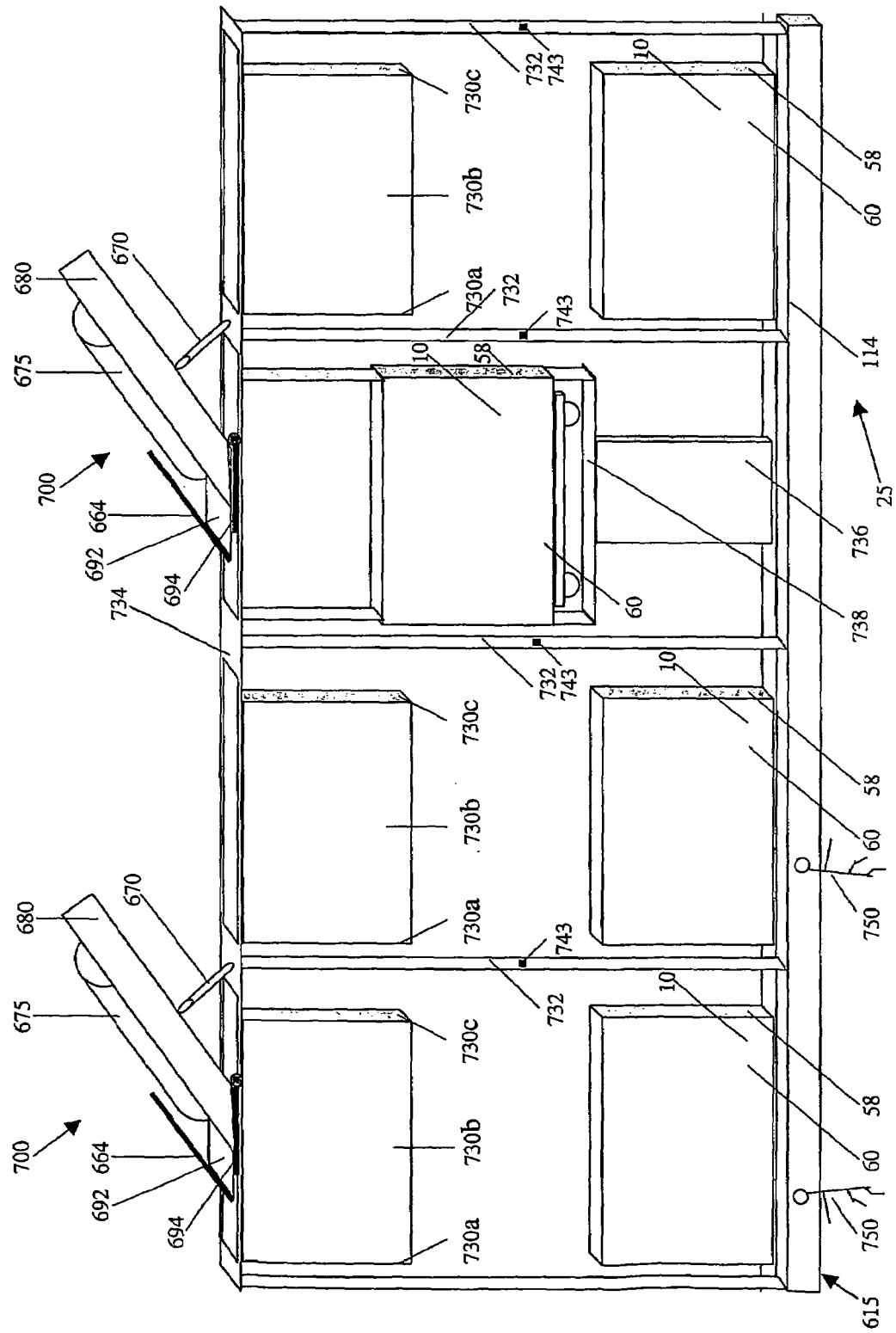

FIG. 20A illustrates a side view of loading track 615, wagons 10, conveyer belt system 710 and trays 700. Pillars 732, standing on floor 25, support a frame 734 of conveyer belt system 710.

Additionally, FIG. 20A illustrates a drive 736 and a platform 738 which raise wagons 10 towards conveyer belt system 710 and trays 700. As wagons 10 are raised, walls 730a, 730b, 730c, and 730d fit inside wagons 10, against wagon walls 58 and 60, protecting wagon walls 58 and 60 from impact from pieces of luggage. Preferably, drive 736 is controlled by $CMS_{arrival}$ 92.

FIG. 20B illustrates four walls 730a, 730b, 730c, and 730d. Preferably, walls 730a, 730b, 730c, and 730d are formed of a sturdy, preferably transparent material, for example, Plexiglas. Preferably, walls 730a and 730c are slightly smaller in dimension than widthwise side walls 58 of wagon 10 (FIGS. 3C and 3D), and walls 730b and 730d are slightly smaller in dimension than lengthwise side walls 60 of wagon 10 (FIGS. 3C and 3D). Thus, four walls 730a, 730b, 730c, and 730d are arranged to fit inside wagon 10.

Additionally, FIG. 20B illustrates a light source 740 and a light detector 742 that are arranged on parallel walls 730a and 730c, or parallel walls 730b and 730d, at a distance d from frame 734. Distance d is a minimum depth that is required for dropping pieces of luggage by tray 700 into wagon 10. Light detector 742 is in communication with $CMS_{arrival}$ 92. When luggage is loaded onto wagon 10 by tray 700, blocking the light path between light source 740 and light detector 742, $CMS_{arrival}$ 92, instructs drive 736 to lower wagon 10 partially, so that the minimum depth that is required for dropping pieces of luggage by tray 700 into wagon 10 is maintained.

FIGS. 20C-20E illustrate the process of dropping piece of luggage 675 from tray 700 into wagon 10. As tray 700 passes over a cell where it is designated to drop its piece of luggage, controller 684 opens swinging door 694, which swings outward, into wagon 10. Piece of luggage 675 begins to slide out, and settles on plate 16 of wagon 10 (FIG. 3A). As conveyer belt system 710 carries tray 700 away, door 694 passes against wagon walls 58 and closes. Drive 736 lowers wagon 10 partially to maintain minimum depth d, and wagon 10 is arranged for receiving another piece of luggage. If all pieces of luggage of a single code have been loaded onto wagon 10, $CMS_{arrival}$ 92 instructs drive 736 to lower wagon 10 to track 615. At the first opportunity, wagon 10 will be transferred to track 618.

Preferably, porters 750, seen in FIG. 20A, maintain watch over conveyer belt system 710 and wagons 10 in loading tracks 615 and 613, to ensure that the loading proceeds smoothly. As an additional safety measure to light detector 742, for guarding against overfilling wagons 10, porters 750, may make a decision that a particular wagon 10 is full, and should be lowered and transferred to track 618 or 616. Thus, a manually operated switch 743 is provided for each loading cell in tracks 615 and 613, for use by porters 750. Switch 743 instructs $CMS_{arrival}$ 92 to lower wagon 10 in that particular cell, and to transfer it to track 618 or 616.

In the aforementioned discussions, track system 610 and its loading tracks 613 and 615 may be used for several flights simultaneously, when desired.

It will be appreciated by persons skilled in the art, that the scope of the present invention is not limited by what has been specifically shown and described hereinabove, merely by way of example. Rather, the scope of the invention is limited solely by the claims, which follow.

APPENDIX A-1

TRACKS CHARACTERIZATION

General
A track system with the following characteristics:
1) A sequence of cells defines a track.
2) An aim of the system is to transfer wagons from one cell to another without interruption or collision.
3) Within each track, wagons are transferred from one cell to another according to a protocol, which will be described later.
4) Wagons are transferred from one track to another, according to the described protocol.
5) Wagons may enter or exit a track.
6) A track may require a 'reduction process' which is initiated either automatically or upon request by another process (thread).

The protocol
1) In tracks where an automatic reduction is required, it should be carried out as soon as it is allowed. All wagons on the track are moved towards the end of the track, so that the section of track which has wagons on it will not have vacant cells between cells occupied by wagons.
2) In tracks where reduction is required by request, the action will be carried out immediately or when possible.
3) When transferring wagons from a first track to a second track which require reduction, the reduction will be requested first and only then will a transfer be attempted. If it is not possible to complete the transfer, then a further reduction along the tracks involved is required afterwhich an attempt will be made to transfer the remaining wagons. This process will continue until all wagons are transferred from the first track to the second track. As the task is completed a reduction of the tracks involved in the process of transfer, is re-notified.
4) When transferring wagons from one track to another track where no reduction is required, the transfer will be carried out according to circumstances and to the algorithm which controls that task.
5) Wagons may be transferred from a track where reduction is required to a track where no reduction is required and vice versa.
6) A wagon may exit a track, when prompted to by means of: 1) A button installed close to a cell containing a wagon, which generally may be operated only by a system operator. 2) A magnetic card which is inserted into a magnetic card reader installed close to a cell containing a wagon. (The passenger is typically given the magnetic card and the reader is typically at the arrival airport.) 3) An instruction given by the operator by means of a control workstation. 4) A button installed on the wagon. 7) A wagon may enter a track, when prompted to by means of: 1) A button installed close to the cell into which the wagon is to enter (usually meant for the workers at the airport). 2) Instructions given by the operator by means of a control workstation. 3) A sensor installed on the floor. (The sensor may be used by workers at arrival and departure airports and passengers at departure airports.) 4) A button installed on the wagon.

The protocol, mentioned above, is implemented according to the following rules, which utilize threads technology taken from the area of object oriented.

A thread is a set of program commands. Threads are independent processes which are able to communicate with one another and which run at the same time.

The implementation
1) Each logical track is controlled by a set of threads. Each set consists of one, two or three threads. Following is an example of three threads. In this example, the track is divided into three sections which do not overlap, and the length of each section may change during the process. The first thread brings wagons into the track. This thread has exclusive control over a track section, which, in this case, extends from the beginning of the track up to the most distal vacant and available cell. The second thread regularly reduces wagons along a track or a section of track. (In our example, the section is somewhere in the middle of a track). The third thread transfers wagons from the track. This thread has exclusive control over a track section, which, in this case, extends from the distal end of to the wagon available for transfer.
2) A thread may control two or more logical tracks or track sections simultaneously; for example, a thread which transfers wagons from one track to another or a thread which sorts wagons to different tracks (multi-tracks).

The following rules govern the operation of threads:
1) All the threads stay active while the server is operative in order to avoid overloading the system. (Usually, it is possible to stop a thread from running and remove it from the system.) The commands <suspend, resume>, <wait, notify> are used as follows:
2) A thread which has completed its task goes into a holding mode (suspend) until it is requested to resume activity (resume) by another thread.
3) A thread which is in the middle of executing its task (for example, taking control over a track or a track section) and cannot continue because the required resources are not available goes into a waiting mode (wait) until it receives a message to continue (notify).
4) Before a thread begins carrying out its task it has to designate which track section or track it will control. Every cell is defined in the system as an object which only one thread can control at any given time. Taking control over a track section means taking control over a number of cells (or number of objects).
5) Once a thread has completed its task, it releases control of the cells it controlled.
6) We take into consideration the dynamic release of cells throughout the operation of process, and the sending of a message to the 'waiting' threads on hold, that the cells have been released.
7) When a thread takes control over a track section or a track, it also takes exclusive control over the wagons on that track section or track in order to send the wagons the appropriate instructions. The wagons' computers are controlled by the threads running on the servers. Control of the wagon's computers passes from one thread to another. Every wagon's computer is defined in the system as an object, which only one thread can control at any given time. Releasing control of a wagon's computer is done dynamically (like cells).

8) When 'notify' or 'resume' appears in the flowcharts it refers to two states, either a 'waiting' or 'suspended' state, or a 'running' state. If a thread is in a 'waiting' or 'suspended' state, it is waiting to renew activity. If a thread is 'running', it has to take into account other activity in the track system while the thread is running.

Utilization of the above protocols is illustrated by the reduction process of a track and the transfer process of wagons from one track to another.

Reduction

This is described in detail in pages 13-17 of the specification and illustrated in FIGS. 5A-5F.

Transfer

This is described in detail in pages 17-20 of the specification and illustrated in FIGS. 6A-6L, and is further described hereinbelow:

Two tracks X and Y are physically close to each other and regularly require a reduction process. They are considered as -two separate tracks, since logically, they should be activated separately, in parallel and independently. For example, when reducing along both tracks, the reduction processes occur simultaneously and without one process interfering with the other.

In the following example, wagons need to be transferred from track X to track Y without causing any disturbance.

The thread that controls X, is P; the thread that controls Y, is Q; and the thread that controls the transfer, is QT. In this example, all three threads operate simultaneously and according to the time available on the server's CPU to run each thread. There may be a situation where the required reduction in track X is completed before any action takes place in track Y.

The scenario

A request is issued, by a thread or by the main program, to transfer all wagons on track X to track Y. QT is activated. QT notifies P to reduce wagons along track X, and at the same time notifies Q to reduce wagons along track Y. (It is possible that Q and/or P are already in the middle of a reduction process.)

When the threads take control over the cells in tracks X and Y, they also take control over the wagons' computers in those cells. Specifically, P takes control over the wagons on the section of track X over which P exerts control. Q takes control over the wagons on the section of track Y over which Q exerts control.

Figure 21:
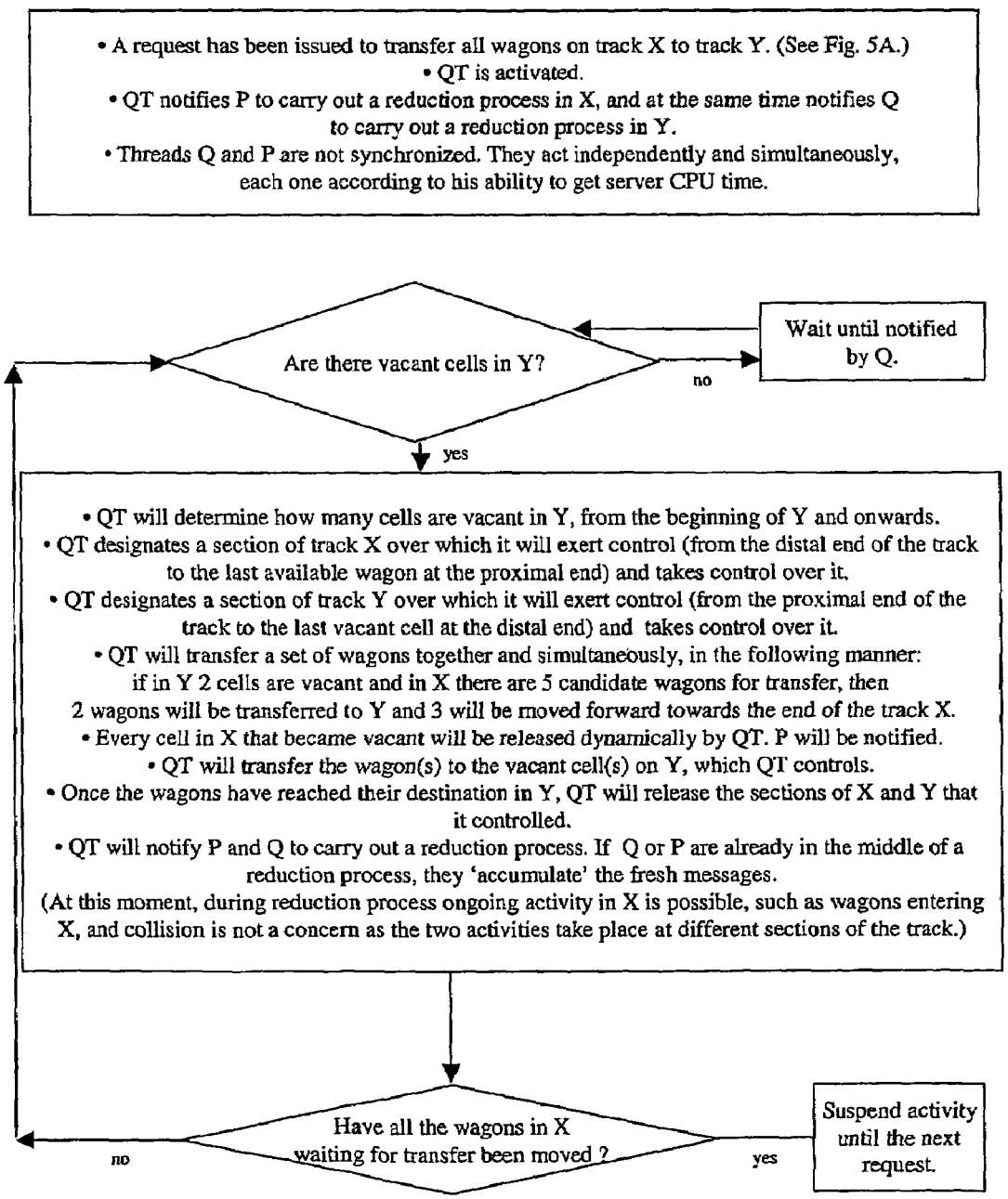
FIG. 21 is a flow chart representation of thread P-Q-QT as described in Appendix A-1.

QT attempts to transfer wagons from track X to track. Y. (See FIG. 21 for the full algorithm.) For further description of this scenario see pages 18 and 19 of the specification.

Both threads P and Q act independently and simultaneously, each one according to its ability to get CPU time.

It is important to note that, in a real time situation, it is impossible to know when the first cell in Y will become vacant in order to commence the transfer. It is possible that a reduction in X has been completed, but the transfer has not yet begun.

The scenario described in FIGS. 6A-6L, is hypothetical and by way of example only. There are many other scenarios in which the timing of wagons' movement along the tracks and from one track to another is different from that in the scenario depicted in FIGS. 6A-6L.

APPENDIX A-2

JUNCTIONS CHARACTERIZATION

A general description of a sorting junction

A sorting junction is a matrix with dimension m×n (m rows and n columns, see FIG. 22A). Each row and each column are tracks.

The motion in each track is one-directional, at any given time.

Each end of the row and each end of the column may function as either an entering point to the junction or as an exiting point from it, but not both simultaneously.

The tracks are programmed so that it is possible to change their direction of movement.

A sorting junction sorts wagons:
1. To tracks which lead to the desired flights,
2. To other junctions,
3. To other tracks which lead to other junctions.

Definitions i=1. . . m: the number of rows.
j=1. . . n: the number of columns.
Axes (x, y): +x is east, −x is west, +y is north, −y is south (see FIG. 22A).
Treatment: a procedure of wagons crossing a junction.
A treatment cycle The treatment of the wagons injunction takes place in two stages, as follows:
1. Treating the north and south ends; and
2. Treating the east and west ends,
wherein the two stages form a cycle.

Possible movements in a junction

A wagon can traverse a junction in three different ways:
1) From one end to the opposite end.
2) From one end to the end on the right.
3) From one end to the end on the left.

The terms 'right' and 'left' are relative depending on the observer's actual position. The possible positions are: 1) standing at the south end, 2) standing at the north end, 4) standing at the east end, 4) standing at the west end.

Restrictions

A wagon is not allowed to enter a junction at a given end, for example, the south end, and to exit the junction from the same end, even though at that given end there are two different tracks, an incoming and an outgoing track. Also, a wagon is not allowed to enter a junction from a given end, for example, the south end, and to exit it from the opposite end, in this example, the north end, on a track which is not a continuation of the incoming track.

A wagon 'path'—The cells through which a wagon passes in a junction-from entering the junction until exiting it—are the wagon's path in a junction (see FIG. 22B). Generally, preventing a collision of wagons along their paths is a main consideration in building the algorithm for the junction system.

When can a collision occur?

Following is a description of the possible ways in which wagons can traverse a junction.

In each stage, two opposite ends of a junction are considered at the same time. In the following example, the south and north ends are considered, however, the same logic applies to the east and west ends.

Wagons coming from the south can go:
1) to the opposite end (north),
2) to the east or to the west (right or left).

Wagons coming from the north can go:
1) to the opposite end (south),
2) to the east or to the west (left or right)

Figure 23A:
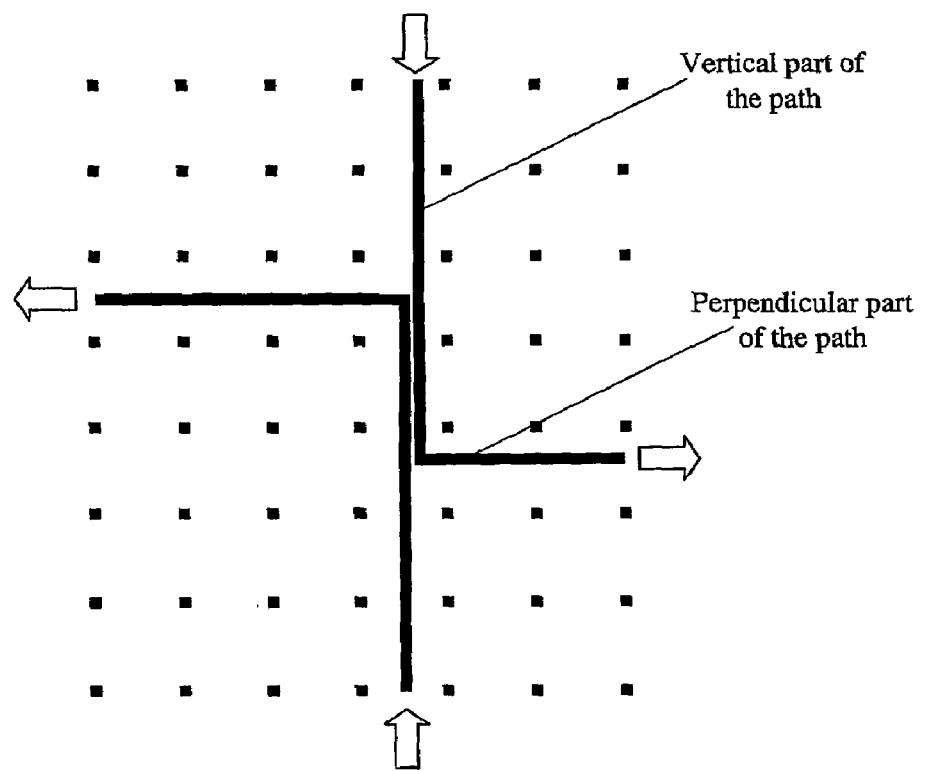

There are two kinds of movements:

1) vertical (from north to south or from south to north, the y axis, see FIG. 23A), 2) vertical+perpendicular (from north to west or east and from south to west or east, the x axis, see FIG. 23A).

At the beginning of a stage, all wagons on the north and south ends complete their vertical movement. Wagons which need to move from north to south and vice versa leave the junction. Wagons, which need to go west or east, wait in their cells, which will lead them to their final destination (the cell which is the intersection of the vertical and horizontal tracks).

A collision could occur in the two following cases:

1) (see FIG. 23A) If two wagons are destined for the same cell on a vertical track before going left or right, or if they are destined for different interim cells on the same vertical track and the vertical path of both wagons overlap (one wagon arriving from the south and the other from the north), only one of the wagons can enter the junction.

Figure 23B:
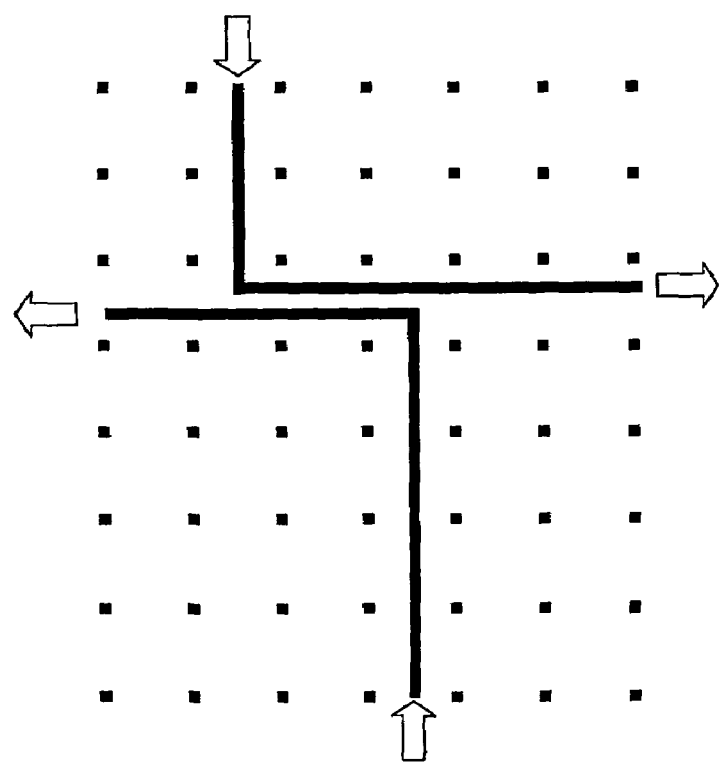

2) (see FIG. 23B) When two or more wagons travel on the same perpendicular track (one wagon traveling east and the other wagon traveling west) and each wagon is moving towards the other, only one of the wagons can enter the junction.

Wagons, which were not allowed to traverse the junction, will be given first priority in the next cycle.

The junction must be completely clear after each stage. In order to ensure that no wagons will be left at the junction, before a wagon is allowed to enter the junction, the server checks that there is a vacant cell in the outgoing track that leads to the wagon's destination. In the case where a number of wagons are heading for the same outgoing track, it will be necessary to calculate the number of vacant cells in the outgoing track, and allow the appropriate number of wagons to enter the track. Transferring a number of wagons simultaneously will take place only with wagons moving to the track opposite (continuation) the one from whence they came.

Junction Management Algorithm

A pair of parallel ends is considered simultaneously.

1. Beginning with the south and north ends, the server checks which wagons can enter the junction without causing a collision. Wagons from the south and north ends complete their vertical path, then, they traverse their perpendicular path. Wagons, which are not allowed to traverse the junction, due to possible collisions, are given first priority in the next cycle. Carry out the move. Pay attention to the fact that after executing the move, there may be new wagons, which took the place of the wagons, which crossed the junction, and it is very likely that they are heading in other directions rather than in the directions where the previous wagons were heading. It is important to note that all wagons are given an equal opportunity to traverse the junction. Once all the wagons that can traverse the junction have arrived at their destination cell in the targeted outgoing track, the current stage is completed. The server notifies ingoing tracks and outgoing tracks involved in this stage to initiate a reduction process.

2. The second stage involves the east and west ends. The server checks which wagons can enter the junction. Wagons from the east and west ends complete their vertical path, then, they traverse their perpendicular path. Wagons, which are not allowed to traverse the junction, are given first priority in the next cycle. The server notifies ingoing tracks and outgoing tracks involved in this stage to initiate a reduction process.

The second stage is now complete. A cycle is finished.

An Example Description

Referring to FIG. 24A, at the four ends of a junction, wagons are waiting to cross the junction.

FIG. 24A illustrates the path that each wagon has to traverse.

Figure 24B:
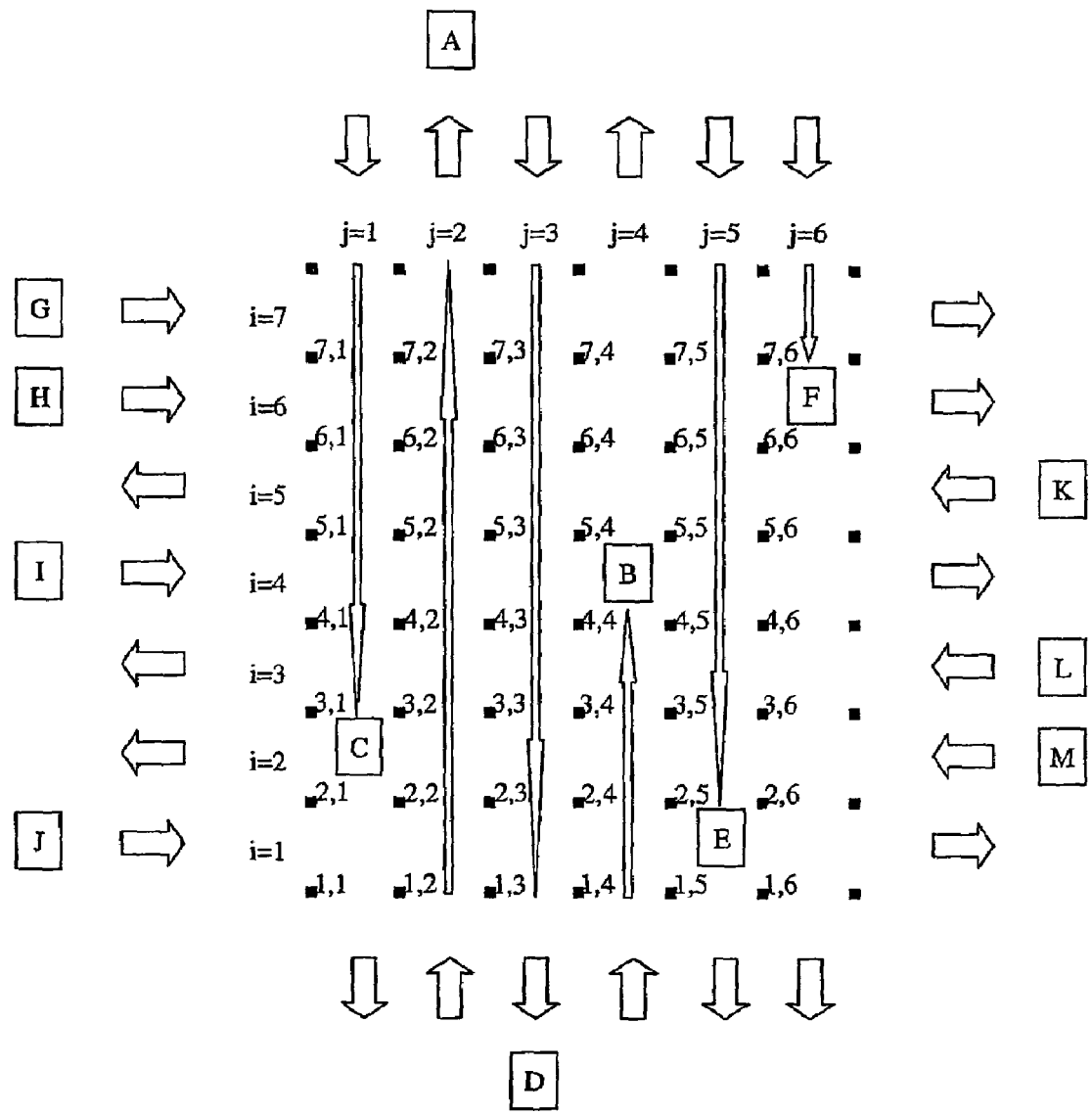

Referring to FIG. 24B, beginning with the south end, wagon A exits the junction and wagon B arrives at cell (4, 4) (FIG. 24B).

At the north end, wagon C arrives at cell (2, 1). Wagon D exits the junction. Wagon E arrives at cell (1, 5). Wagon F arrives at cell (6, 6).

The server notifies ingoing tracks and outgoing tracks involved in this stage to initiate a reduction process.

Referring to FIG. 24C, wagons C, E, B and F exit the junction according to their paths.

A stage is completed. Call for a reduction process of the outgoing tracks.

Referring to FIG. 24D, at the west end, wagon G exits the junction. Wagon H arrives at cell (6, 4). Wagon I arrives at cell (4, 3). Wagon J arrives at cell (1, 4).

At the east end, wagons K and M exit the junction. Wagon L arrives at cell (3, 2).

The server notifies ingoing tracks and outgoing tracks involved in this stage to initiate a reduction process.

Figure 24E:
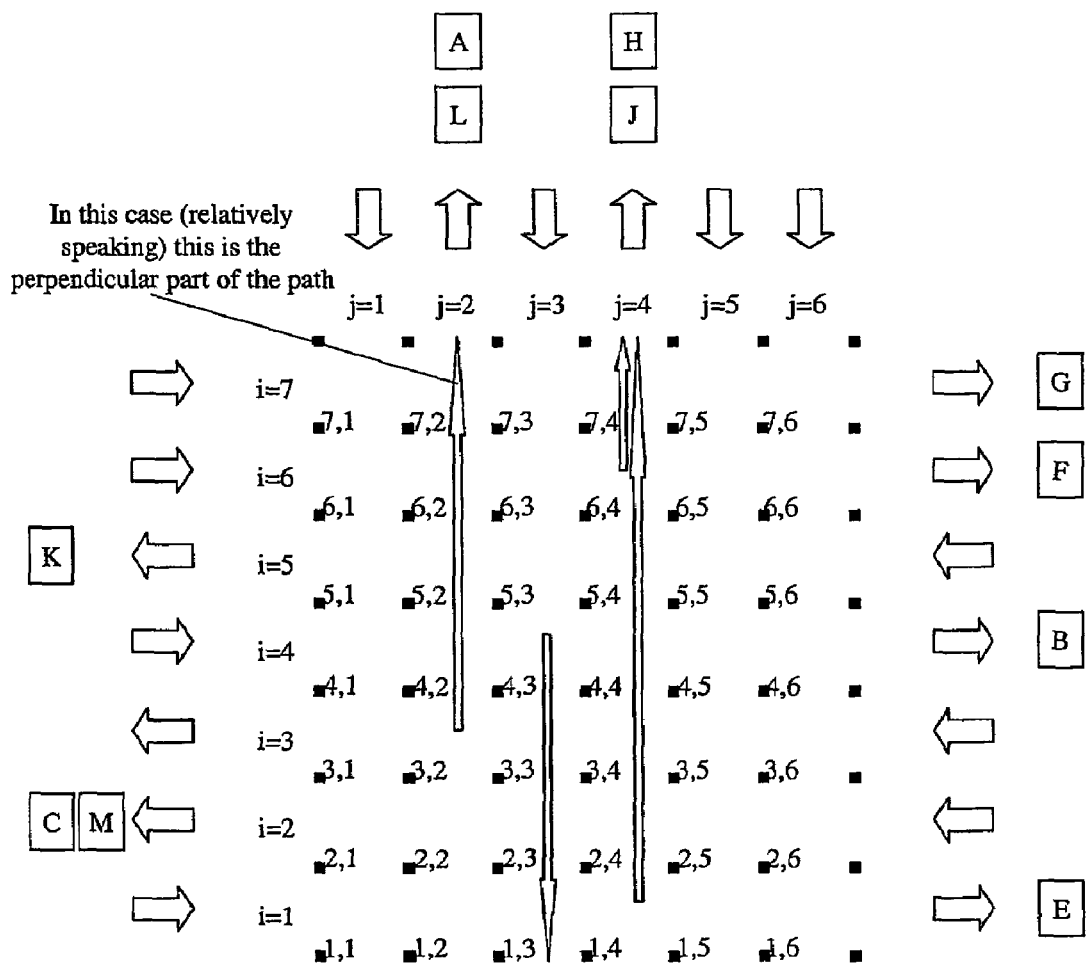

Referring to FIG. 24E, wagons L, H, J and I exit the junction according to their paths.

A stage is completed. A cycle is finished. Call for a reduction process of all tracks.

Figure 25:
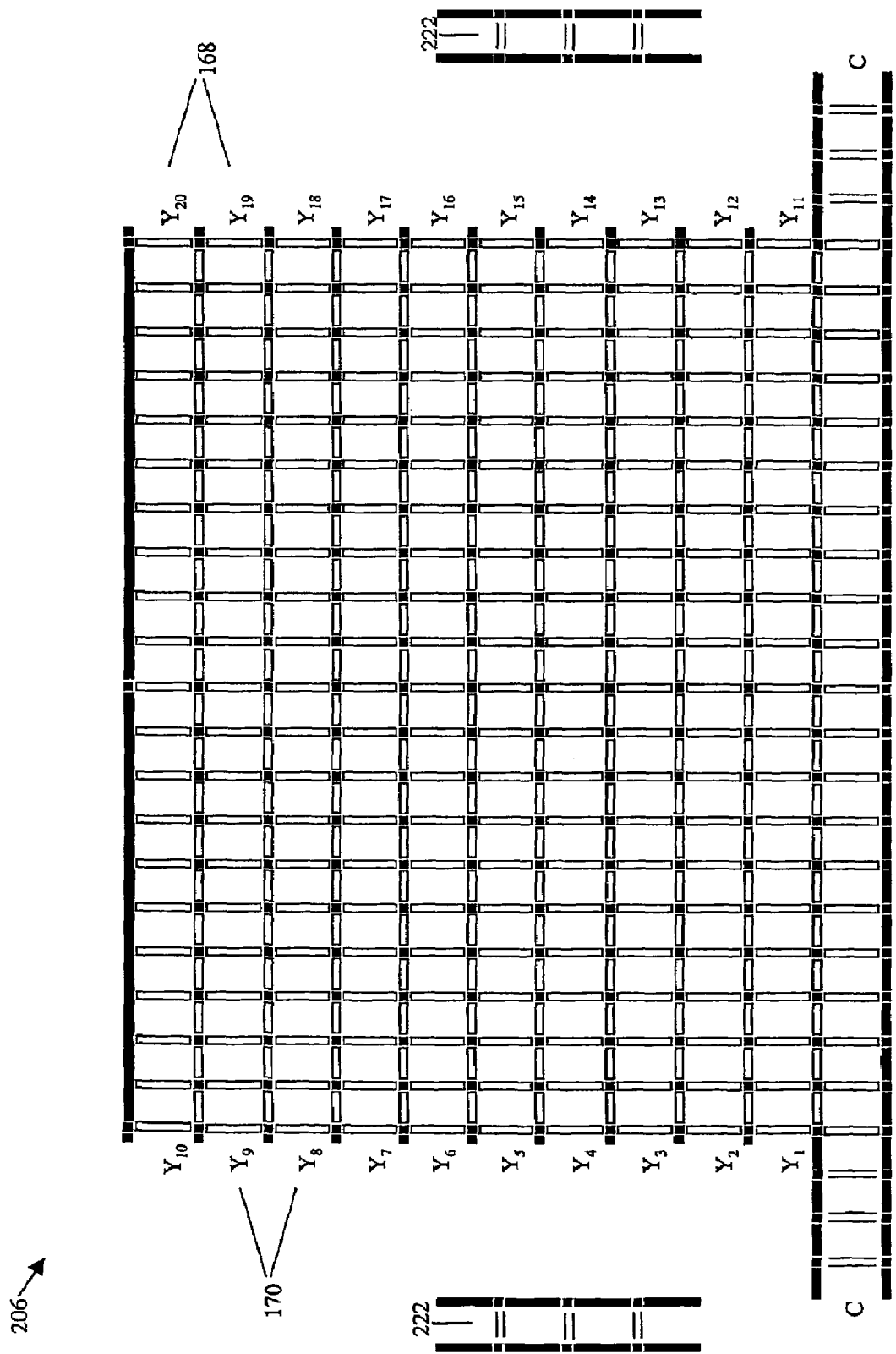

A second example is illustrated in FIG. 25. In this figure, tracks X1 and X2 are not utilized. The wagons are sorted directly to tracks Yi, according to the algorithm described hereinabove. Before processing the wagons, the algorithm has to check which wagons can enter the junction, then, it will let the wagons simultaneously traverse their vertical path. Wagons will be allowed to traverse their perpendicular paths only after the vertical paths of all wagons have been completed.

APPENDIX A-3

Figure 29A:
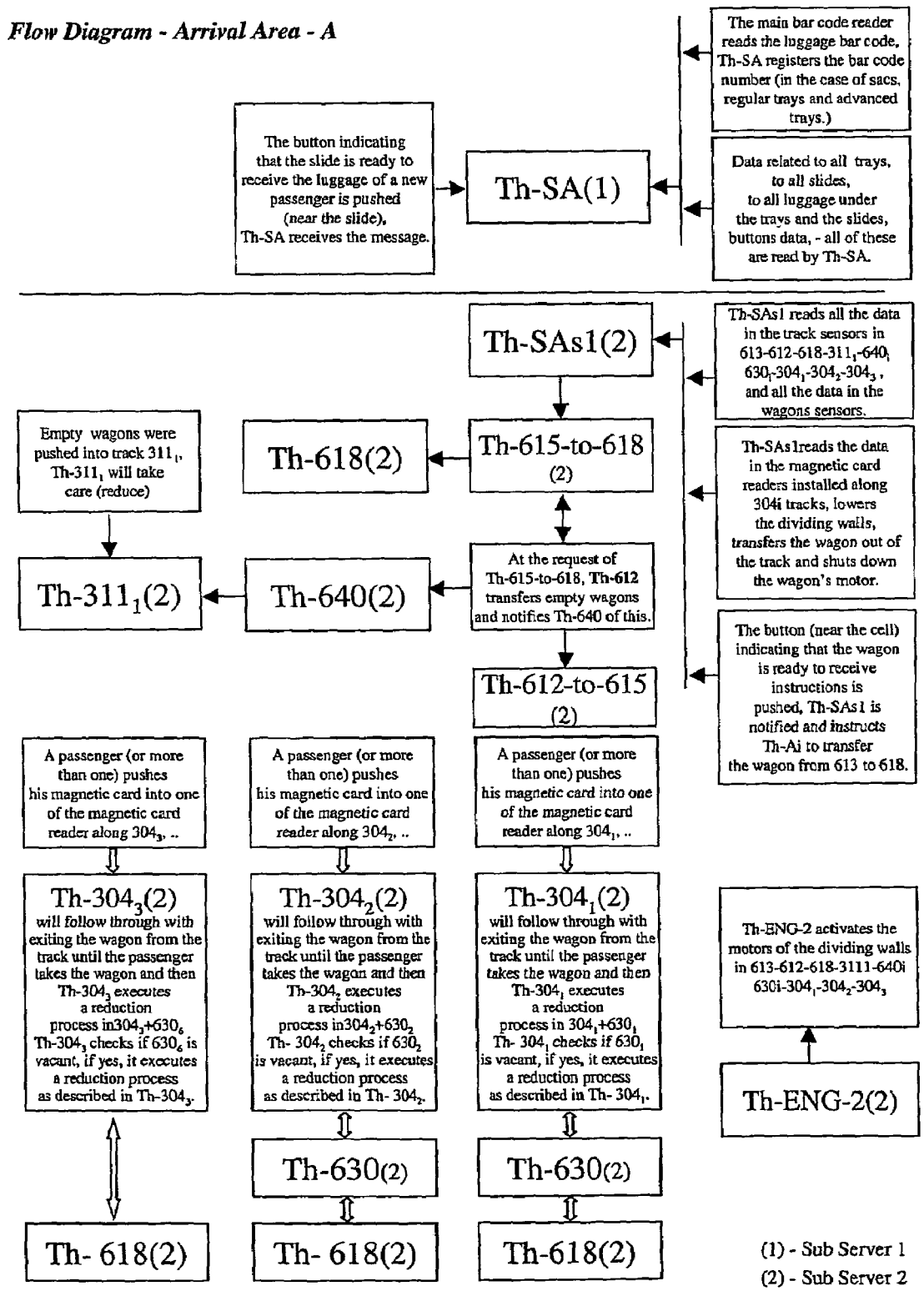
FIGS. 29A and 29B are flow diagram representations of the threads in an arrival area in accordance with a non-limiting preferred embodiment of the present invention, as described in Appendix A-3.
Figure 29B:
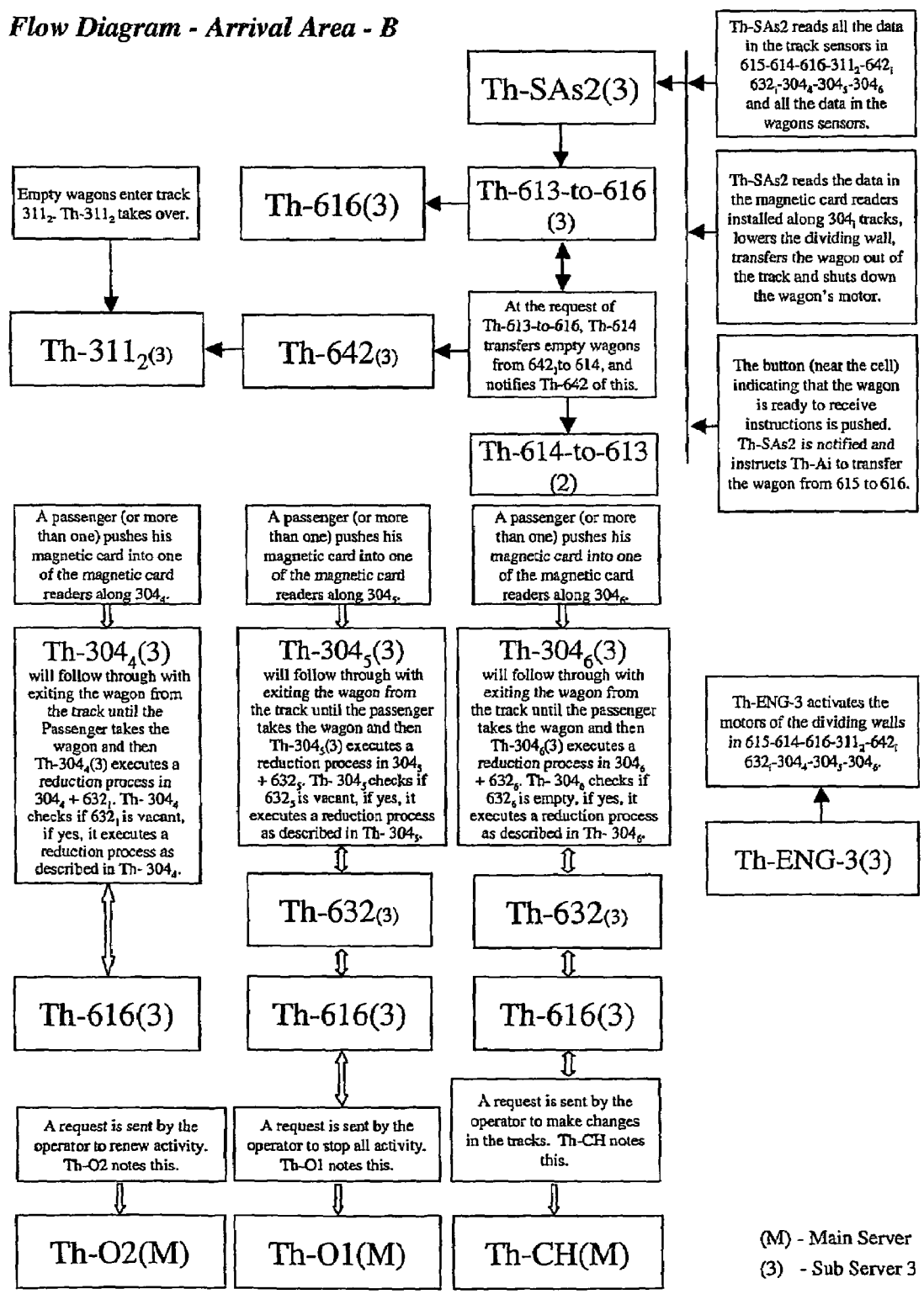

Threads At The Arrival Airport (See Flowcharts of Arrival Airport A&B-FIGS. 29A and 29B)

Thread-Sensors-Arrival (Th-SA) (Running in server 1)

The main bar code reader reads the luggage bar code, Th-SA registers the bar code number (in the case of sacs, regular trays and advanced trays.)

Data related to all trays, to all slides, to all luggage under the trays and the slides, buttons data,—all of these are read by Th-SA.

The button indicating that the slide is ready to receive the luggage of a new passenger is pushed (near the slide). Th-SA receives the message.

Thread-Sensors-Arrival-s1 (Th-SAs1) (Running in server 2)

Th-SAs1 reads all the data in the track sensors in 613-612-618-311$_1$-640$_i$-630$_i$-304$_1$-304$_2$-304$_3$, and all the data in the wagon sensors.

The button (near the cell) indicating that the wagon is ready for transmission is pushed, Th-SAs1 is notified and instructs Th-Ai to transfer the wagon from 615 to 618.

Th-SAs1 reads the data in the magnetic card readers installed along 304$i$ tracks, lowers the dividing wall, transfers the wagon out of the track and shuts down the wagon's motor.

Thread-Sensors-Arrival-s2 (Th-SAs2) (Running in server 3)

Th-SAs2 reads all the data in the track sensors 615-614-616-311$_2$-642$_i$-632$_i$-304$_4$-304$_5$-304$_6$, and all the data in the wagon sensors.

The button (near the cell) indicating that the wagon is ready for transmission is pushed, Th-SAs2 is notified and instructs Th-Ai to transfer the wagon from 613 to 616.

Th-SAs2 reads the data in the magnetic card readers installed along 304$i$ tracks, lowers the dividing wall, transfers the wagon out of the track and shuts down the wagon's motor.

(Th-615-to-618)-Transfers wagons from 615 to 618 (running in server 2)

(Th-613-to-616)-Transfers wagons from 613 to 616 (running in server 3)

(Th-612-to-615)-Transfers wagons from 612 to 615 (running in server 2)

(Th-614-to-613)-Transfers wagons from 614 to 613 (running in server 3)

(Th-618)-Reduces 618 (server 2)

(Th-616)-Reduces 616 (server 3)

(Th-612)-Transfers empty wagons from 6405 to 612 (server 2)

(Th-614)-Transfers empty wagons from 642, to 614 (server 3)

(Th-311$_1$)-Reduces 311$_1$ (running in server 2)

(Th-311$_2$)-Reduces 311$_2$ (running in server 3)

(Th-640)-Reduces 311$_1$, 640$_1$-640$_5$ in the perpendicular direction (running in server 2)

(Th-642)-Reduces 311$_2$, 642$_5$-642$_1$ in the perpendicular direction (running in server 3)

(Th-304i)-See detailed flowcharts.

(Th-R630$_3$630$_5$)-Regularly fills 630$_3$-630$_5$, see flowchart Th-R630$_3$630$_5$ (running in server 2)

(Th-R632$_2$632$_4$)-Regularly fills 632$_2$-632$_4$ (server 3)

Th-ENG-A-Activates engines of the dividing walls in tracks 613-612-618-311$_1$-640$_i$-630$_i$-304$_1$-304$_2$-304$_3$ (server 2)

Th-ENG-B-Activates engines of the dividing walls in tracks 615-614-616-311$_2$-642$_i$632$_i$-304$_4$-304$_5$-304$_6$ (server 3)

Th-O1-Permits the operator to stop the whole system. Sends a message to all threads to complete their activity up to one cell (main server).

Th-O2-Permits the operator to restart the whole system.
1. Reads all of the sensors
2. Performs reduction in all tracks
3. Restarts the entire process Th-CH-Permits the operator to perform desirable changes in the track definitions and to execute other tasks.

The invention claimed is:

1. A wagon for automatically transporting luggage, which includes:
   a rigid frame, for containing the luggage, said frame including:
      sides; and
      a base;
   at least one axle associated with said base and at least one wheel, mounted on said axle, for providing said wagon with linear motion;
   at least two ball-bearings located in said base, said ball bearings arranged for transferring rolling motion to said frame;
   a motor, in communication with said at least one axle, for providing motion to said at least one wheel;
   a controller for controlling the operation of said motor;
   a sensing apparatus associated with said rigid frame, said sensing apparatus positioned on said sides of said frame and operative for sensing an obstacle along a track on which said wagon travels at least part of the time, wherein said sensing apparatus communicates with said controller, and wherein said controller stops said motor when the track is blocked and wherein said controller re-starts said motor when the obstacle is removed; and
   a coded identification for identifying said wagon from amount a plurality of such wagons, wherein said coded identification is operative to be read by track sensors, and wherein said track sensors include apparatus for transmitting said coded identification to a computerized management system.

2. A wagon according to claim 1, and further including a strip of coded gradation marks, extending along a dimension of said wagons, indicative of the fractional dimension of any point along said strip with respect to the dimension of said wagon, said strip of coded gradation marks further arranged to be read by said track sensor and wherein said dimension is selected from the group of dimensions of said wagon consisting of: the length of the wagon and the width of the wagon.

3. A wagon and track system for automatically transporting and sorting luggage, which includes:
   a computerized management system including threads;
   a plurality of wagons each of said wagons including:
      a rigid frame, for containing the luggage, said frame including:
         sides; and
         a base;
      at least on axle associated with said base and at least one wheel, mounted on said axle, for providing said wagon with linear motion;
      at least two ball-bearings located in said base, said ball bearings arranged for transferring rolling motion to said frame;
      a motor, in communication with said at least one axle, for providing motion to said at least one wheel;
      a controller for controlling the operation of said motor; and
      a sensing apparatus associated with said rigid frame, said sensing apparatus positioned on said sides of said frame and operative for sensing an obstacle along a track on which said wagon travels at least part of the time, wherein said sensing apparatus communicates with said controller, and wherein said controller stops said motor when the track is blocked and wherein said controller re-starts said motor when the obstacle is removed;
   a plurality of tracks, wherein each track includes:
      a horizontal track strip, defining an x-axis, along which each of said wagons travels; and
      vertical track walls against which said at least one wheel of each of said wagons rolls, for providing said wagon with linear motion along said x-axis,
   wherein said threads of said computerized management system control the movement of said wagons along said tracks by commanding the stopping and starting of said motor.

4. A wagon and track system according to claim 3, wherein said vertical track walls further include dividing-wall sections along said horizontal track strip and external wall sections bounding said horizontal track strip.

5. A wagon and track system according to claim 3, wherein each of said wagons further includes a coded identification, and wherein each of said tracks further includes a track sensor arranged to read said wagon coded identification and arranged to report its reading to said computerized management system.

6. A wagon and track system according to claim 3, wherein said tracks are interconnected through junctions, said junctions selected from the group which consists of: sorting junctions at which said wagons may be automatically distributed to different locations and merging junctions at which said wagons may be automatically collected from different locations.

7. A wagon and track system according to claim 3, and including means for selectably lowering said external-wall sections for allowing said wagons to be removed from said tracks, and for allowing said wagons to be mounted on said tracks.

8. A wagon and track system according to claim 3, wherein at least one of said tracks is operable as a multi-lane track, having dividing-wall sections, oriented along said x-axis, defining lanes therebetween, and having dividing-wall sections, oriented along a y-axis, so as to cross said lanes, wherein said dividing-wall sections are arranged to be raised and lowered in response to commands from said computerized management system, and wherein when said dividing-wall sections along said x-axis are raised, and said dividing-wall sections along said y-axis are lowered, said wagons are operable to move in either selected one of positive and negative x directions, and wherein when said dividing wall sections along said y-axis are raised, and said dividing wall sections along said x-axis are lowered, said wagons move in either selected one of positive and negative y directions.

9. A wagon and track system according to claim 8, wherein said threads of said computerized management system control the movements of said wagons within said tracks by commanding the stopping and starting of said motor and the raising and lowering of said dividing-wall sections along said x-axis and said y-axis.

10. A wagon and track system according to claim 8, wherein said multi-lane track is operable as a sorting array for automatically sorting said wagons on to different locations.

11. A wagon and track system according to claim 3, further including entry sensors associated with said tracks, wherein each of said entry sensors is operable to lower a single external-wall section associated with a track cell, responsive to an approach of one of said wagons on a pavement, to facilitate the entry of one of said wagons to said track cell, and wherein each of said entry sensors is further operable to activate said motor of one of said wagons, to facilitate the mounting of one of said wagons from said pavement onto said track cell.

12. A wagon and track system according to claim 3, and also including a departure area which includes:
   at least one entry track, associated with a check-in counter, for mounting said wagons onto said track;
   a sorting system for sorting said wagons according to a criterion selected from the group of criteria consisting of: different tracks and different flights.

13. A wagon and track system according to claim 12, and further including an element selected from the group consisting of the following elements: a wagon return track and an empty wagon pick-up station.

14. A wagon and track system according to claim 3, and also including an arrival area which includes:
   at least one loading track at which said wagons are loaded;
   at least one luggage pick-up track, for claiming luggage;
   at least one loaded wagon track, through which load wagons are transferred towards said luggage pick-up track; and
   at least one empty wagon track, through which empty wagons arrive at said loading track.

15. A wagon and track system according to claim 14, further including a tray means for automatically sorting and loading luggage onto said wagons and a conveyor means which includes a means for automatically sorting and loading luggage onto said wagons.

16. A wagon and track system according to claim 14, further including:
   at least on wagon-loading track system for loading luggage onto wagons;
   at least one loaded wagon transfer system for transferring loaded wagons from said wagon-loading track system to said luggage pick-up track;
   at least one empty wagon collection track, for collecting wagons after their luggage has been claimed; and
   at least one empty wagon transfer system for transferring empty wagons from said at least one empty-wagon track to said wagon-loading track system.

\* \* \* \* \*